(12) United States Patent
Aoki et al.

(10) Patent No.: US 8,154,599 B2
(45) Date of Patent: Apr. 10, 2012

(54) IMAGING REGION ADJUSTMENT DEVICE

(75) Inventors: Katsuji Aoki, Nara (JP); Atsushi Yoshida, Osaka (JP); Shoichi Araki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1365 days.

(21) Appl. No.: 11/667,768

(22) PCT Filed: Jun. 13, 2006

(86) PCT No.: PCT/JP2006/311863
§ 371 (c)(1),
(2), (4) Date: May 15, 2007

(87) PCT Pub. No.: WO2007/013231
PCT Pub. Date: Feb. 1, 2007

(65) Prior Publication Data
US 2008/0259162 A1    Oct. 23, 2008

(30) Foreign Application Priority Data
Jul. 29, 2005 (JP) .................................. 2005-219953

(51) Int. Cl.
*G06F 3/033* (2006.01)
*G06T 15/00* (2011.01)
(52) U.S. Cl. .............. 348/159; 348/86; 348/89; 348/92; 348/143; 348/148; 345/157; 345/419
(58) Field of Classification Search .................. None
See application file for complete search history.

(56) References Cited

U.S. PATENT DOCUMENTS

| | | | |
|---|---|---|---|
| 5,808,670 A * | 9/1998 | Oyashiki et al. ............. | 348/143 |
| 5,850,352 A * | 12/1998 | Moezzi et al. ................ | 345/419 |
| 6,341,044 B1 * | 1/2002 | Driscoll et al. ............... | 359/725 |
| 6,434,265 B1 * | 8/2002 | Xiong et al. .................. | 382/154 |
| 6,631,240 B1 * | 10/2003 | Salesin et al. ................ | 386/290 |
| 6,738,059 B1 * | 5/2004 | Yoshinaga et al. ............ | 345/419 |
| 6,867,798 B1 * | 3/2005 | Wada et al. ................... | 348/143 |
| 6,985,178 B1 * | 1/2006 | Morita et al. ............... | 348/211.3 |
| 7,015,954 B1 * | 3/2006 | Foote et al. ................ | 348/218.1 |
| 2002/0063776 A1 * | 5/2002 | Nagayama et al. ............. | 348/51 |

(Continued)

FOREIGN PATENT DOCUMENTS
JP           1-288696           11/1989
(Continued)

*Primary Examiner* — Ario Etienne
*Assistant Examiner* — Ho Shiu
(74) *Attorney, Agent, or Firm* — Wenderoth Lind & Ponack, L.L.P.

(57) ABSTRACT

An imaging region adjustment device includes plural camera terminals, capable of imaging an entire imaging target without blinds spots. Each of the camera terminals includes a camera which images a virtual imaging region obtained while changing the position of an imaging region within a specific region in a specific period of time and an adjusting unit B which adjusts the position of the virtual imaging region by controlling the camera. The adjusting unit B adjusts the position and aspect ratio of the virtual imaging region of one's own camera terminal so that a combined region of the virtual imaging regions of the camera terminals completely covers a specific imaging target region, based on the virtual imaging region of one's own camera terminal and virtual imaging regions of the other camera terminals, and when the virtual imaging regions A of N other camera terminals are contained in the virtual imaging region of one's own camera terminal, divides the virtual imaging region of one's own camera terminal into N+1 regions.

12 Claims, 39 Drawing Sheets

U.S. PATENT DOCUMENTS

| | | | |
|---|---|---|---|
| 2003/0038814 A1* | 2/2003 | Blume | 345/585 |
| 2003/0222983 A1* | 12/2003 | Nobori et al. | 348/148 |
| 2004/0044721 A1* | 3/2004 | Song et al. | 709/202 |
| 2004/0174386 A1* | 9/2004 | Kotake et al. | 345/633 |
| 2004/0183898 A1* | 9/2004 | Endo et al. | 348/36 |
| 2004/0246339 A1 | 12/2004 | Ooshima et al. | |
| 2004/0263476 A1* | 12/2004 | Lim et al. | 345/157 |
| 2005/0157173 A1* | 7/2005 | Kurebayashi et al. | 348/207.11 |
| 2005/0225635 A1* | 10/2005 | Meitzler et al. | 348/148 |
| 2005/0285953 A1* | 12/2005 | Hasegawa et al. | 348/239 |
| 2006/0018509 A1* | 1/2006 | Miyoshi et al. | 382/104 |
| 2006/0197839 A1* | 9/2006 | Senior et al. | 348/169 |
| 2008/0075358 A1* | 3/2008 | Yu et al. | 382/154 |
| 2008/0259179 A1* | 10/2008 | Senior et al. | 348/222.1 |
| 2011/0254973 A1* | 10/2011 | Nishiyama | 348/222.1 |

FOREIGN PATENT DOCUMENTS

| | | |
|---|---|---|
| JP | 7-303207 | 11/1995 |
| JP | 3043925 | 5/2000 |
| JP | 2001-094975 | 4/2001 |
| JP | 3180730 | 6/2001 |
| JP | 2001-245284 | 9/2001 |
| JP | 2004-072628 | 3/2004 |
| JP | 2004-304602 | 10/2004 |

\* cited by examiner

Detection target

● Detection camera

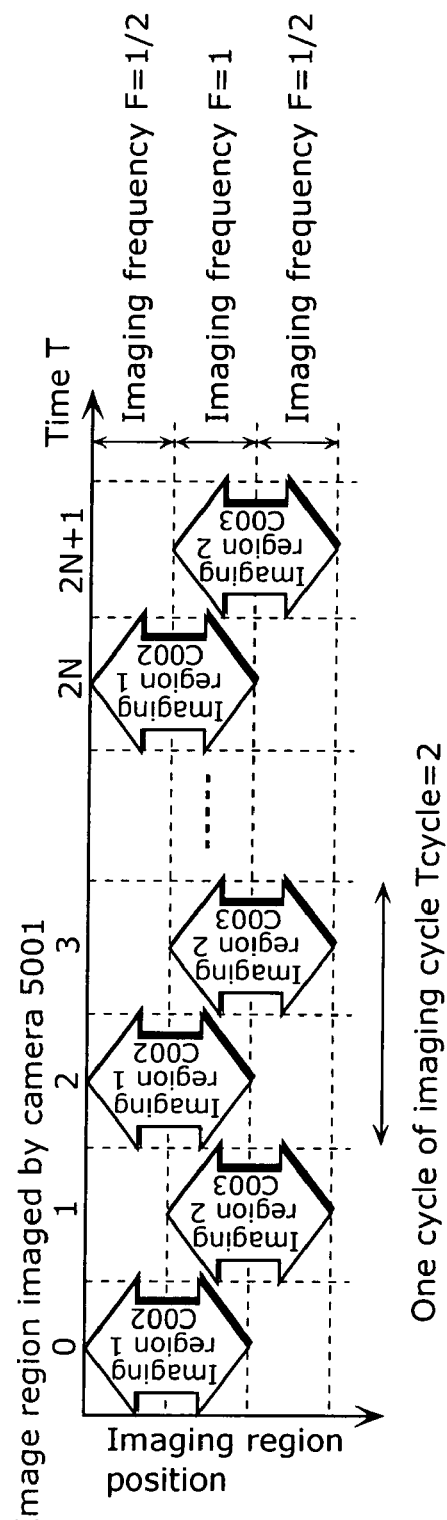

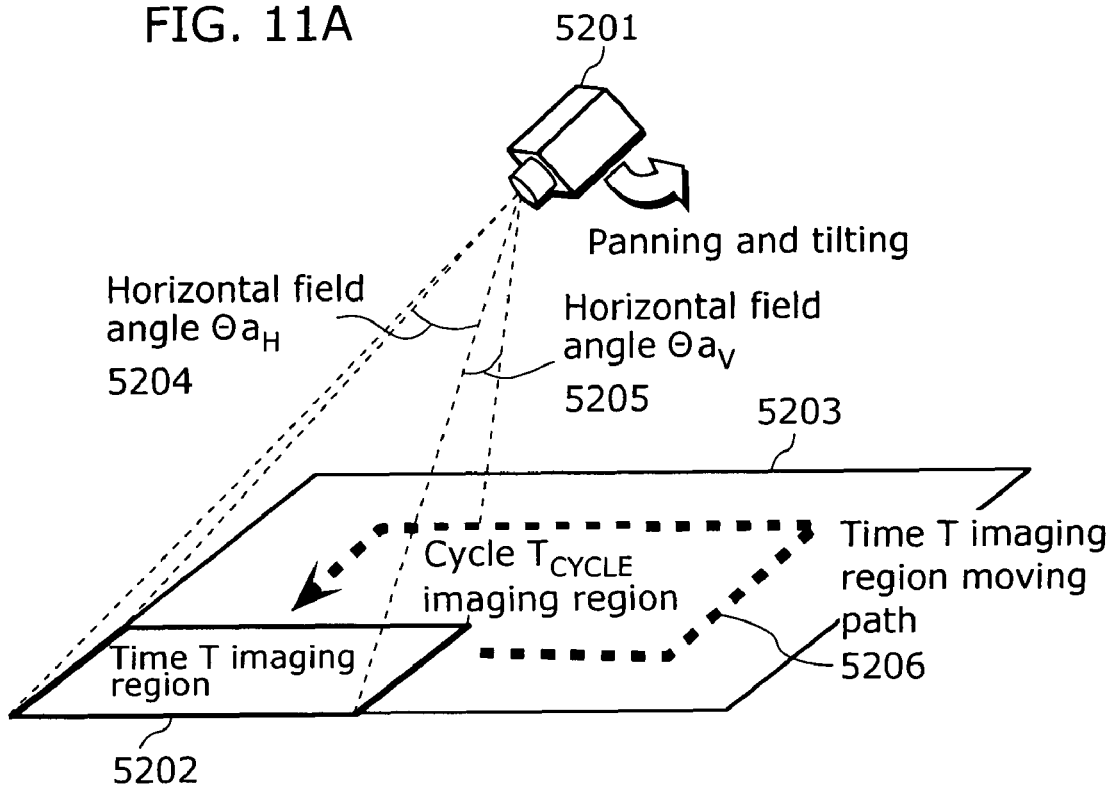
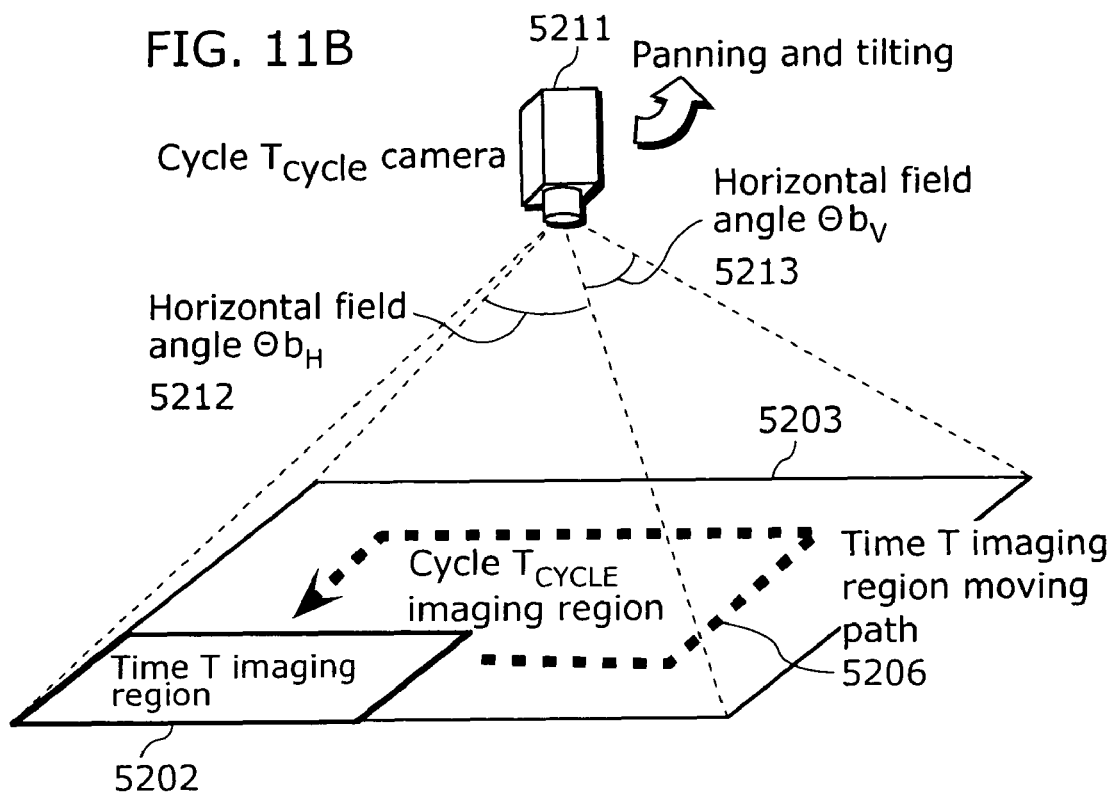

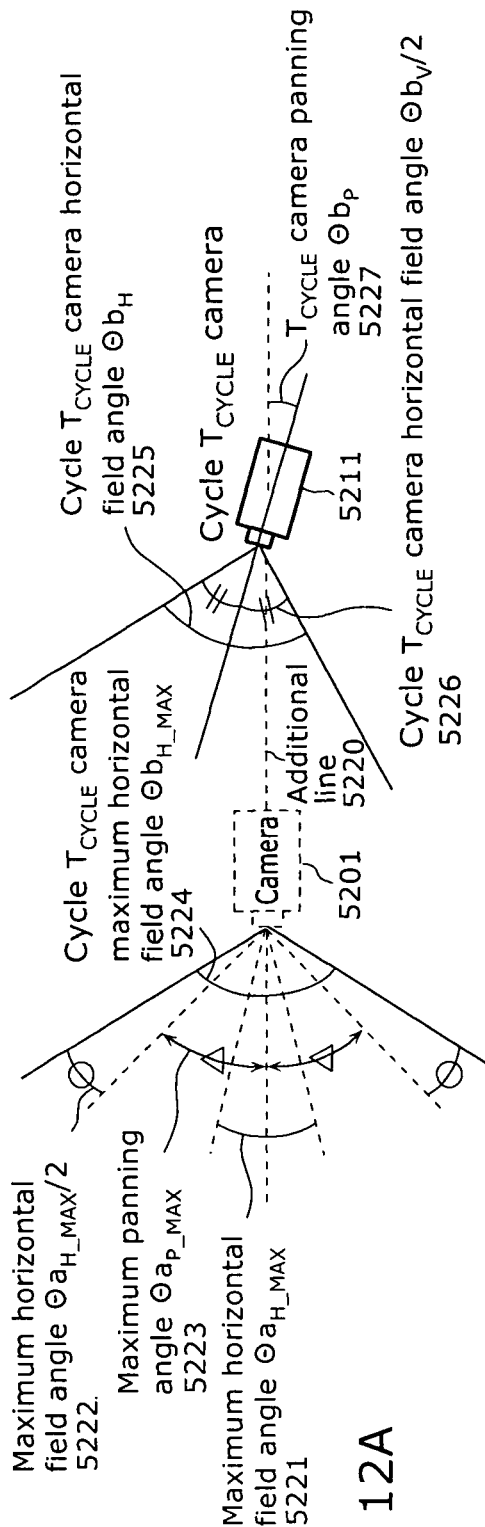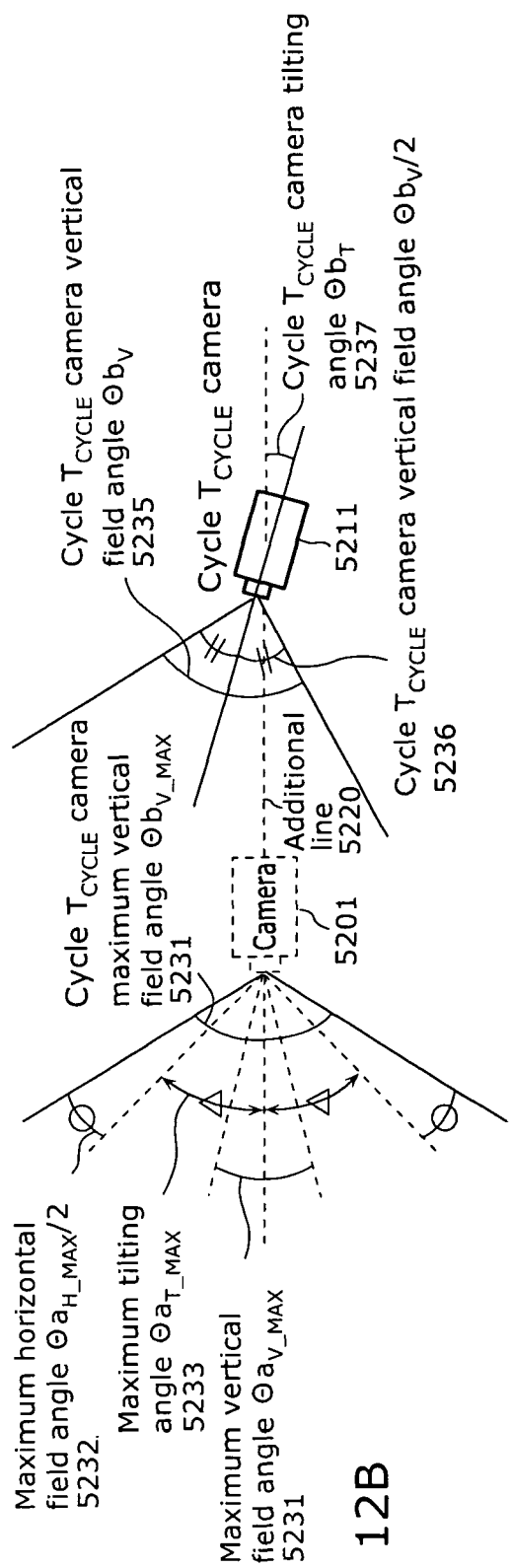
FIG. 12A
FIG. 12B

IMAGING REGION ADJUSTMENT DEVICE

BACKGROUND OF THE INVENTION

TECHNICAL FIELD

The present invention relates to a device which obtains image information of real space using plural camera terminals, and in particular, to an automatic adjustment device which adjusts imaging regions of the respective camera terminals and a method for the same.

BACKGROUND ART

Recently, research and development efforts have been made on a device using plural cameras mainly used for surveillance. For use purposes, the device must meet two requirements for an imaging target region which is a surveillance target region: first, to provide constant surveillance of the imaging target region without blind spots and to detect a target within the region; and second, the requirement is to obtain detailed information on the detection target present within the imaging target region.

The conventional device using plural cameras automatically adjusts the imaging region of each camera to meet the two requirements. Such conventional devices using cameras are represented in Patent References 1 and 2.

First, the conventional device referred to in Patent Reference 1 is described. FIG. 1 illustrates the device described in Patent Reference 1 that automatically adjusts the imaging regions of cameras. With the detection camera device 10010 of FIG. 1, a camera 10011 and a reflection mirror 10012 capture a detection target image throughout an extensive imaging region, a moving object extracting unit 10013 extracts the detection target in the captured image, and a positional information extracting unit 10014 extracts the positional information of the detection target. Thus, the detection camera device 10010 obtains the positional information of the detection target throughout the extensive imaging region. With evaluation camera device 10020, a camera control unit 10022 controls the rotation and depression angles and a zoom ratio of a camera 10021 based on the positional information of the detection target, and the evaluation camera device 10020 captures an enlarged image of the detection target. Thus, the evaluation camera device 10020 obtains detailed information of the detection target.

FIG. 2 is a drawing showing the imaging regions of the detection camera device 10010 and evaluation camera device 10020. In the figure, the black circles indicate the setting positions at which detection camera devices 10110 are fixed, and the circles or hexagons indicate the imaging regions of the respective detection camera devices 10110. In the case where the detection camera devices 10110 are artificially set on a regular basis as shown in the figure, the imaging target region or surveillance target region can be constantly detected without blind spots.

A conventional device referred to in Patent Reference 2 is described hereafter. FIG. 3 illustrates the device described in Patent Reference 2 that automatically adjusts the imaging regions of cameras. In FIG. 3, a moving object detection camera 10211 intended to image a detection target throughout an extensive imaging region changes one's own imaging region using an orientation control unit 10212, and a surveillance camera 10221 intended to capture an enlarged image of the detection target changes one's own imaging region using an orientation control unit 10222. The imaging region of each camera is determined based on information previously stored in a camera field angle storing unit 10231 and a camera field angle storing unit 10232 using the position of a detection target extracted in the image captured by the moving object detection camera 10211 and the imaging region of each camera in an image processing device 10240.

Further, a method of determining an imaging region of each camera is described next. FIGS. 4, 5, and 6 are drawings used for illustrating a method of determining an imaging region of each camera. Each drawing is an image captured by the moving object detection camera 10211 and the image is divided into several blocks. First, the imaging region of the moving object detection camera 10211 is determined as follows. When a detection target is present in the shaded blocks of FIG. 4, the orientation of the moving object detection camera 10211 is changed in the direction of the arrows in each of the blocks of FIG. 5 corresponding to each of the blocks of FIG. 4, thereby the imaging region of the camera is changed. The imaging region of the moving object detection camera 10211 corresponding to each block position is manually predetermined and the information is preset in the camera field angle storing unit 10231. Next, the imaging region of the surveillance camera 10221 is determined as follows. In the case where a detection target is present in the block position shown in FIG. 6, the orientation of the surveillance camera 10221 is changed to have the imaging region indicated by the broken lines, thereby the imaging region of the camera is changed. The imaging region of the surveillance camera 10221 corresponding to each block position is manually predetermined and the information is preset in the camera field angle storing unit 10232.

Characteristics of imaging region automatic adjustment of the conventional device using plural cameras are summarized hereafter. First, each camera has a fixed, predetermined role. Namely, the detection camera device 10010 in the conventional device referred to in Patent Reference 1 and the moving object detection camera 10211 in the conventional device referred to in Patent Reference 2 play the role of detecting a detection target throughout an extensive imaging region, and the evaluation camera device 10020 in the conventional device referred to in Patent Reference 1 and the surveillance camera 10211 in the conventional device referred to in Patent Reference 2 play the role of obtaining detailed information of the detection target, such as an enlarged image of the detection target. Thus, each camera playing one role achieves the first requirement and each camera playing the other role achieves the second requirement (the first characteristic of the conventional art).

In the conventional device referred to in Patent Reference 2, for example, the imaging region of the moving object detection camera 10211 is changed to the detecting region shifted to the top left shown as the top left block of FIG. 5 according to the change in the situation where a detection target is present in the top left block of the FIG. 4. Thus, the imaging region of each camera is determined and adjusted based on information in the form of a table containing situational changes manually predicted and created in advance and imaging regions corresponding thereto on a one-to-one basis (the second characteristic of the conventional art).

As shown in FIG. 2, the conventional device referred to in Patent Reference 1 uses manually preset fixed cameras on a regular basis in order to achieve the first requirement (the third characteristic of the conventional art).

The automatic adjustment of the imaging region of the conventional device using plural cameras is described above. Automatic adjustment of the imaging region of the conventional device using a single camera is described hereafter. A device using a single camera and automatically adjusting an imaging region of the camera is described in Patent Reference 3. Patent Reference 3 discloses two techniques, known as "auto-scanning" and "auto-panning" as a method for automatically adjusting the imaging region of a camera.

First, the "auto-scanning" technique is described. FIG. 8 is a drawing illustrating the "auto-scanning" technique. The "auto-scanning" technique allows a camera 10701 to sequentially automatically image plural imaging regions from a first imaging region 10711 to an n-th imaging region 1071N shown in the figure. Imaging region information of the first imaging region 10711 to the n-th imaging region 1071N is pre-recorded in a storing unit 10703. This technique is realized by an orientation control unit 10702 controlling the orientation of the camera 10701 based on the information recoded in the storing unit 10703 so as to sequentially change the imaging region of the camera 10701 from the first imaging region 10711 to the n-th imaging region 1071N.

The "auto-panning" technique is described hereafter. FIG. 9 is a drawing illustrating the "auto-panning" technique. The "auto-panning" technique allows a camera 10801 to automatically and repeatedly pan from side to side between a first panning angle 10811 and a second panning angle 10812 shown in the figure so as to automatically adjust the imaging region of the camera 10801. Though not shown in FIG. 9, the technique is realized by mechanical switches provided for the first panning angle 10811 and second panning angle 10812 and confirm that the camera 10801 is oriented at either panning angle so that an orientation control unit 10802 controls the orientation of the camera 10801.

Characteristics of imaging region automatic adjustment of the conventional device using plural cameras are summarized hereafter. In the conventional device referred to in Patent Reference 3, for example, the imaging region of the camera 10701 is changed based on the imaging region information of the first imaging region 10711 to the n-th imaging region 1071N recorded in the recoding unit 10703. Similar to the automatic adjustment of the imaging region of the device using plural cameras, the imaging region of the camera is determined and adjusted based on information in the form of a table containing imaging regions manually predicted and created in advance although they do not correspond to situational changes on a one-to-one basis (the second characteristic of the conventional art).

Patent Reference 1: Japanese Patent Publication No. 3043925 (FIGS. 1 and 6)
Patent Reference 2: Japanese Patent Publication No. 3180730 (FIGS. 1 and 7 to 9)
Patent Reference 3: Japanese Laid-Open Patent Application No. H01-288696

However, in the conventional devices described above, the imaging region of each camera is determined and adjusted based on information in the form of a table containing situational changes manually predicted and set up and imaging regions corresponding thereto on a one-to-one basis (the above second characteristic of the conventional art). Therefore, information in the form of a table containing situational changes and imaging regions corresponding thereto on a one-to-one basis need to be manually predicted and created one by one for each camera.

The information depends on the position and size of the imaging region, manually predicted situational changes, locations and the number of cameras. Each time a change occurs in the listed items, the information need to be manually recreated one by one. The work becomes complex as the number of cameras increase and its cost and workload becomes enormous. It is common that a building surveillance system uses over ten cameras.

The conventional devices meet the first requirement by manually setting fixed cameras on a regular basis (the above third characteristic of the conventional art). However, even if a single camera failure occurs, the device fails to achieve the first requirement.

For example, as shown in FIG. 7, an increased number of detection camera devices 10010 can be used to cover the detection target region without blind spots even in the case of a camera failure. However, this is no doubt inefficient.

The present invention has been conceived in order to solve the conventional art problems indicated above, and aims to provide an imaging region adjustment device that eliminates the necessity of manually predicting situational changes and creating a table and that images the imaging target region without blind spots, even if some of the plural cameras are unserviceable.

SUMMARY OF THE INVENTION

In order to achieve the above object, an imaging region adjustment device of the present invention includes camera terminals, each of which has: a camera which images a virtual imaging region obtained while changing the position of an imaging region within a specific region in a specific period of time; and a communication unit which sends and receives virtual imaging region information indicating the virtual imaging region; and an adjusting unit which adjusts the position of the virtual imaging region of one's own camera terminal so that the combined region of the virtual imaging regions of the camera terminals completely covers a specific imaging target region, based on the virtual imaging region of one's own camera terminal and virtual imaging regions of the other camera terminals indicated by the virtual imaging region information received by the communication unit. In this way, with the cooperative operation of the camera terminals, the imaging target region is covered by the virtual imaging regions without any blind spots. Furthermore, since such virtual imaging regions are used, it is possible to arbitrarily set a region allocated to be imaged by a single camera, compared to the method for covering the imaging target region by actual imaging regions. This makes it possible to realize an imaging region adjustment device which can handle imaging target regions having various sizes and shapes.

Note that, in the scope of the Claims, "virtual imaging region" corresponds to, for example, a cycle $T_{CYCLE}$ imaging region, in the embodiments, which is a combined imaging region of imaging regions obtained when a single camera terminal sequentially images the imaging regions while performing scanning operations such as panning and tilting during a predetermined time $T_{CYCLE}$. Likewise, "virtual detecting region" corresponds to, for example, a cycle $T_{CYCLE}$ detecting region, in the embodiments, which is a combined detecting regions (detecting space) of detecting regions obtained when a single sensor terminal sequentially detects the detecting regions while performing scanning operations for changing the orientations of the sensor along the detection direction during a predetermined time $T_{CYCLE}$.

Here, the imaging region adjustment device may be structured to further includes a region dividing unit which divides, into N regions, a region containing virtual imaging regions of N ($\geq 2$) camera terminals among the camera terminals and allocates the respective N divided regions to the N camera terminals, and the adjusting unit which executes the adjustment of the region allocated to one's own camera terminal by the region dividing unit, regarding the allocated region as a new virtual imaging region. At this time, it is preferable that the region dividing unit of the imaging region adjustment device executes the division and allocation in the case where the virtual imaging regions of the N camera terminals are in a containment relationship, and executes the division and allocation in the case where the virtual imaging regions of the N camera terminals are adjacent to one another. In this way, the imaging target region is covered by the virtual imaging regions of the camera terminals efficiently and without any blinds spots. However, the covering is not the optimum covering, even though the entire imaging target region is covered by the virtual imaging regions of the camera terminals. There is a possibility that the optimal solution from a broad view is searched for instead of sticking to the current optimal solution from a local view (in the case where the virtual imaging regions are in a containment relationship, or there is a virtual imaging region requiring extremely long time to be imaged compared to the other virtual imaging regions).

At this time, it is preferable that the region dividing unit of the imaging region adjustment device executes the division and allocation for at least one camera terminal for which the allocation is executed so that time required for the camera to image the virtual imaging region is reduced or the size of a region other than the virtual imaging regions within a region to be actually imaged by the camera is reduced. More specifically, it is preferable that the region dividing unit of the imaging region adjustment device executes the division and allocation so that the aspect ratio of the virtual imaging region of the camera terminal becomes closer to the aspect ratio of the imaging region of the camera. More specifically, it is preferable that the region dividing unit of the imaging region adjustment device executes the division by selecting a division pattern from among predetermined division patterns. By doing so, the possibility that the optimal solution from a broad view is searched for instead of sticking to the optimal solution from a local view increases. This makes it possible to prevent a trouble that, for example, plural camera terminals doubly image the same region, and long time is required for the camera terminals to image the virtual imaging regions.

In addition, the camera of the imaging region adjustment device may repeatedly change the position of the imaging region within the virtual imaging region at a fixed cycle. Further, the region dividing unit of the imaging region adjustment device may be incorporated in at least one camera terminal among the camera terminals.

The present invention can be realized as not only a local control configuration in which each camera terminal constituting the imaging region adjustment device has an adjusting unit, but also as a centralized control configuration in which a common adjusting unit adjusts the detecting regions of all camera terminals, an imaging region adjustment method, and a program causing a computer to execute the method. Further, the present invention can be realized as an imaging region adjustment device (or system) made up of plural camera terminals, and respectively independent camera terminals. Further, the present invention can be realized as a device adjusting the detecting region of a sensor which can detect physical amounts such as a micro-motion sensor in stead of detecting an imaging region which can be imaged by a camera. Needless to say, the program according to the present invention can be distributed by recording media such as CD-ROMs and transmission media such as the Internet.

The imaging region adjustment device according to the present invention automatically adjusts the cycle $T_{CYCLE}$ imaging regions of the cameras of the respective camera terminals so that a combined region of the cycle $T_{CYCLE}$ imaging regions of the cameras of the respective camera terminals completely covers a specific imaging target region. Thus, it is possible to eliminate the necessity of manually predicting and creating cycle $T_{CYCLE}$ imaging region information corresponding to situational changes for each camera as in the conventional art, allowing a specific imaging target region to be efficiently covered without blind spots even if some of cameras are unserviceable.

Therefore, the present invention guarantees that any space can be imaged without blind spots and has a particularly high practical value as a surveillance system for suspicious individuals in schools and buildings.

BRIEF DESCRIPTION OF DRAWINGS

FIG. 10 is a drawing illustrating the imaging region of a camera according to the present invention.

FIG. 11 is a drawing illustrating the relationship between the size of a cycle $T_{CYCLE}$ imaging region and various types of parameters of a camera.

FIG. 12 is a drawing illustrating the relationship between the size of a cycle $T_{CYCLE}$ imaging region and various types of parameters of a camera.

Figure 1:
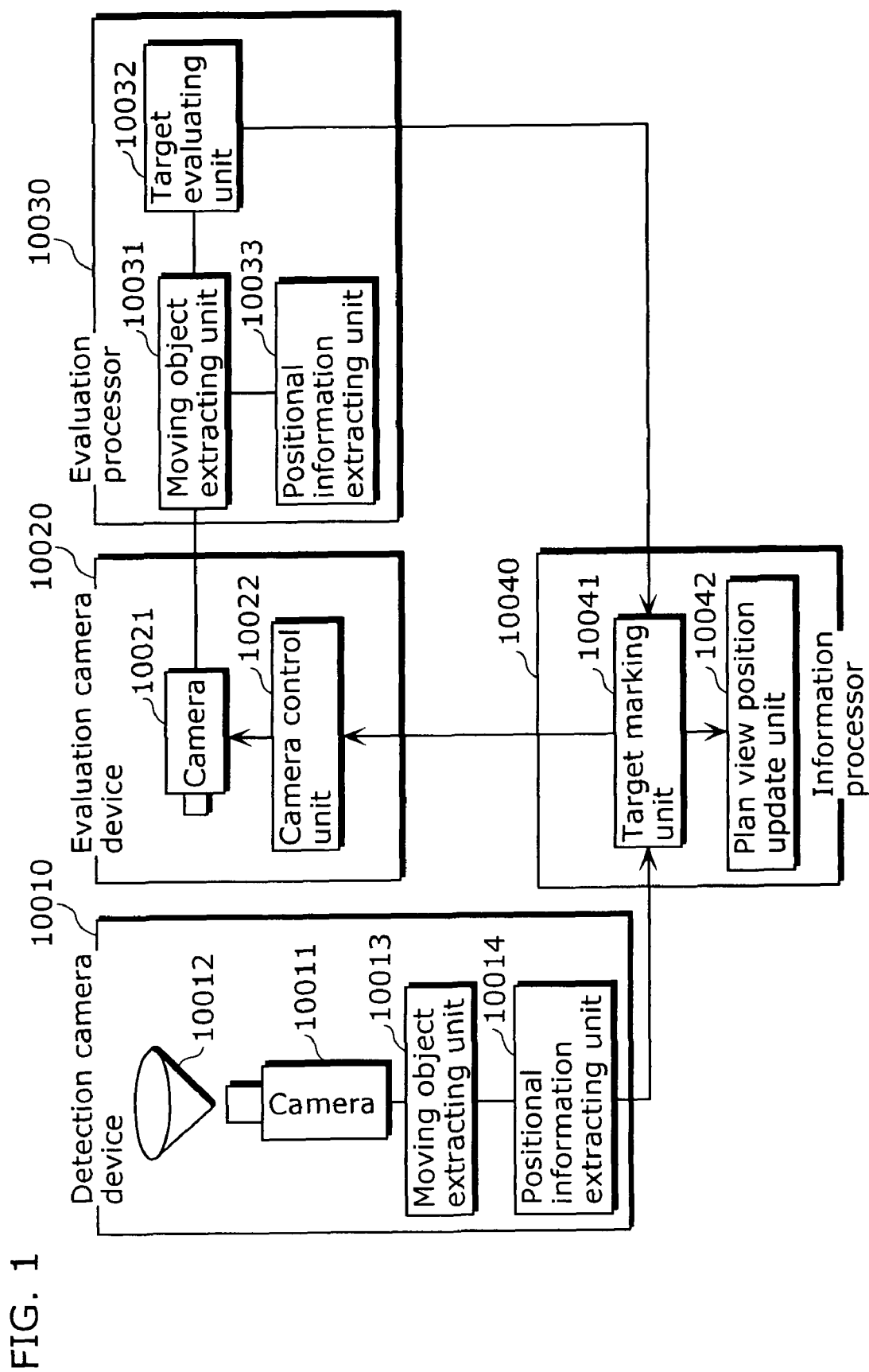
FIG. 1 is a block diagram showing the structure of a first conventional art.
Figure 2:
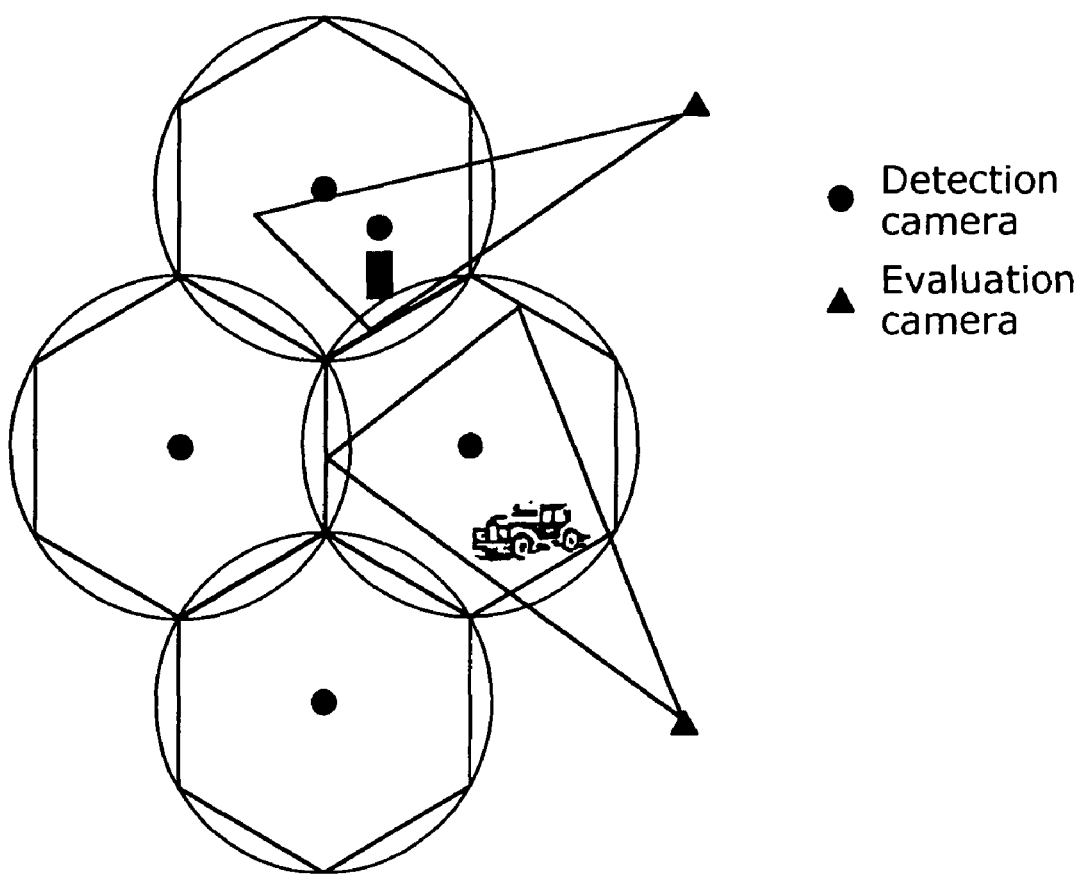
FIG. 2 is a drawing illustrating the fields of vision of cameras in the first conventional art.
Figure 3:
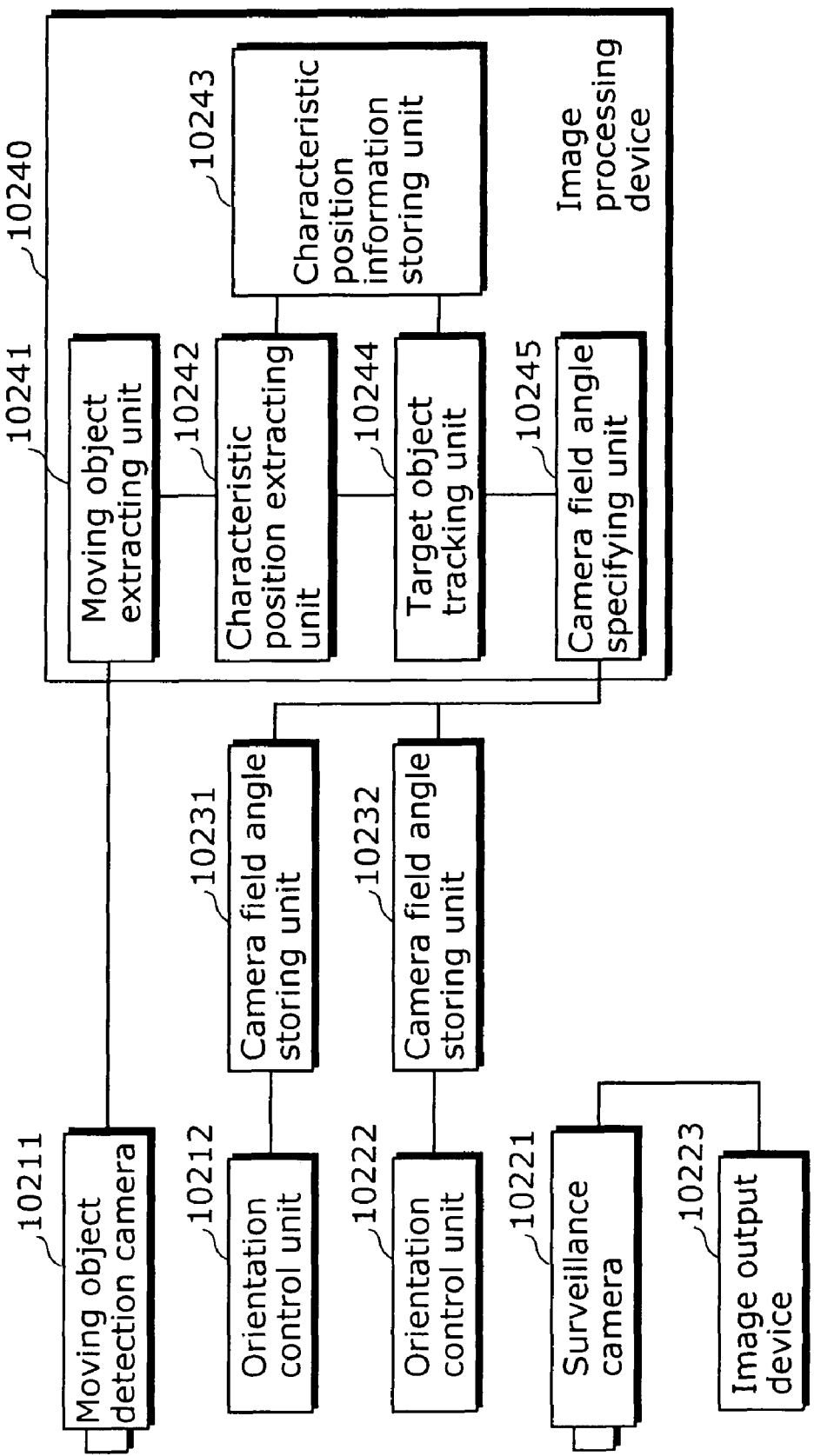
FIG. 3 is a block diagram showing the structure of a second conventional art.
Figure 4:
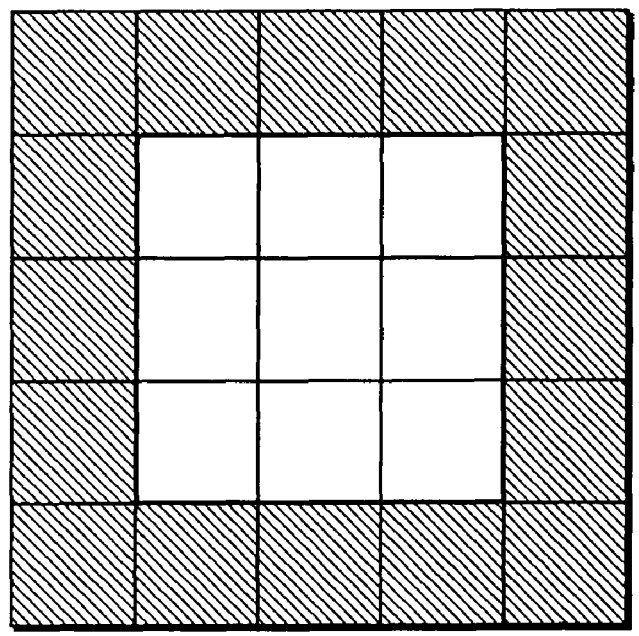
FIG. 4 is a drawing illustrating the operation of the second conventional art.
Figure 5:
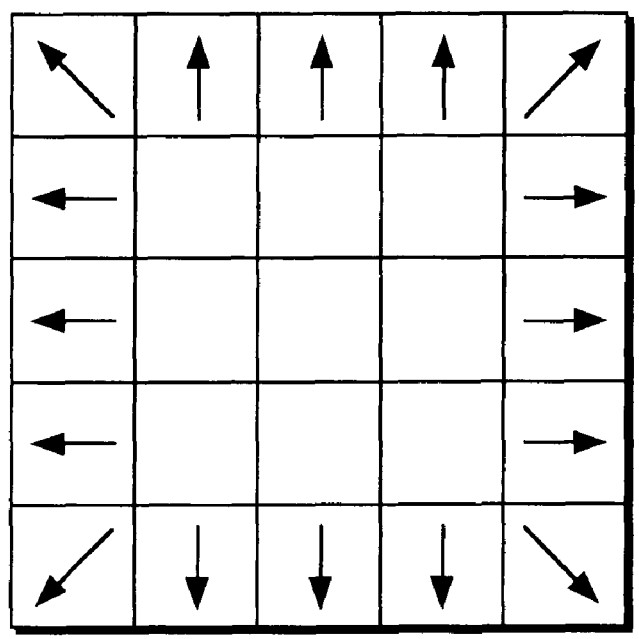
FIG. 5 is a drawing illustrating the operation of the second conventional art.
Figure 6:
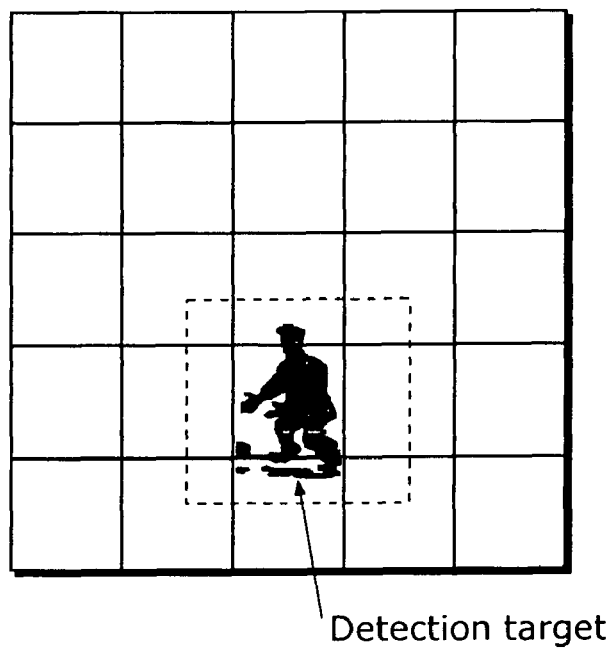
FIG. 6 is a drawing illustrating the operation of the second conventional art.
Figure 7:
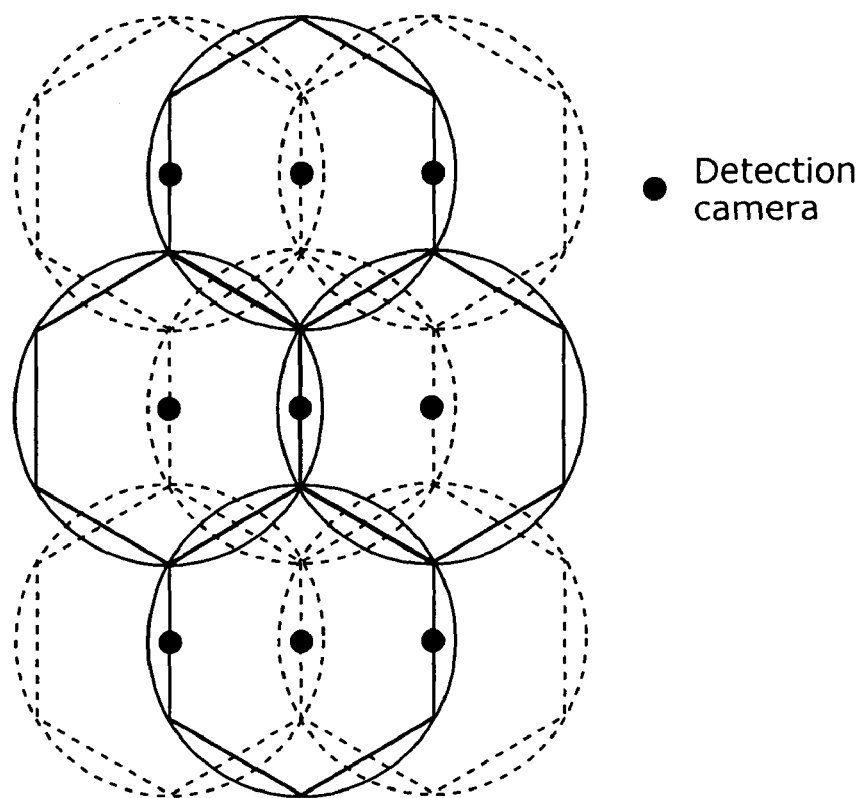
FIG. 7 is a drawing illustrating the operation of the second conventional art.
Figure 8:
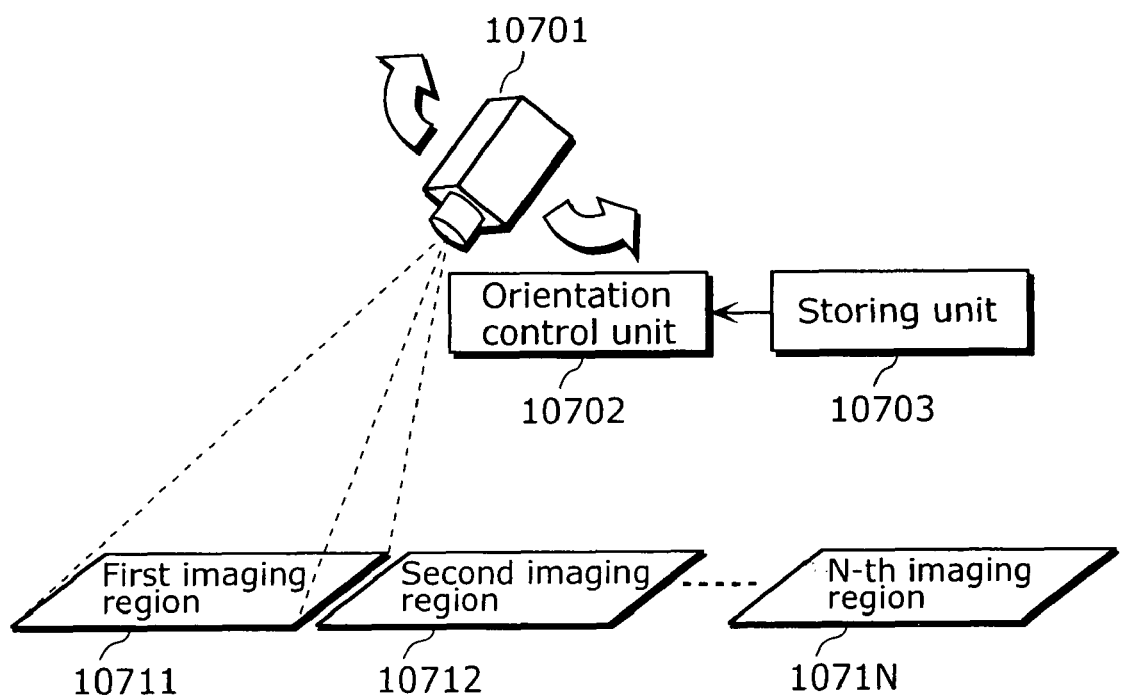
FIG. 8 is a drawing illustrating the operation of a third conventional art.
Figure 9:
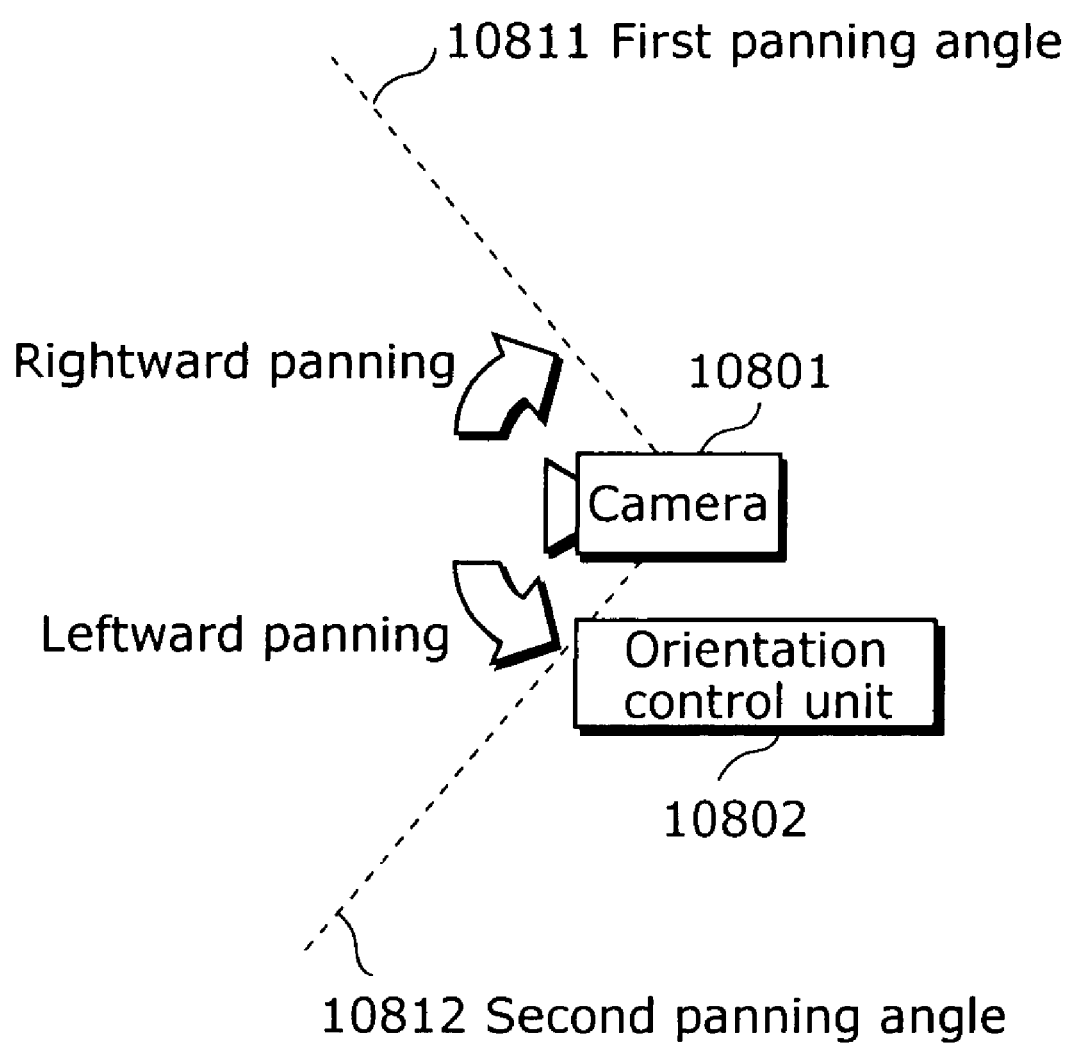
FIG. 9 is a drawing illustrating the operation of the third conventional art.

Numerical References 101A to C camera terminals A to C
102 operation terminal
103 network
201 camera
202 adjusting unit A
203 communication unit
204 adjusting unit B
211 lens
212 image pickup surface
213 image processor
214 orientation control unit
215 cycle imaging control unit
301 input unit
302 storing unit

DETAILED DESCRIPTION OF THE INVENTION

Embodiments of the present invention are described in detail hereafter with reference to the drawings.

Several terms and basic matters are explained before the embodiments are described.

(Camera Imaging Region)

First, the imaging region of a camera is described. A camera in this context is a camera to obtain temporally continuous moving pictures, for example, 30 continuous pictures per second, and is not a camera to obtain a still image of a moment, such as a still photograph.

FIG. 10 is a drawing illustrating the imaging region of a camera. In FIGS. 10A and 10B, number 5001 is a camera, number 5002 is a first imaging region, which is the imaging region imaged by the camera 5001 at time T=0, 2, 4, . . . , 2N, and the number 5003 is a second imaging region, which is the imaging region imaged by the camera 5001 at time T=1, 3, 5, . . . , 2N+1 (where N is a natural number). FIG. 10C is a graphic representation showing the positions of imaging regions of the camera 5001 at the times T shown in FIGS. 10A and 10B.

The term "camera imaging region" is generally interpreted as a region imaged by a camera at a moment of time. If the camera does not change its orientation at each moment, there is no problem with this interpretation. However, if the camera changes its orientation moment by moment, "the camera imaging regions" should be distinguished from each other as follows.

<Time T Imaging Region>

This means a region imaged by a camera at a moment of time T. In this description, the imaging region is denoted as a time T imaging region. In FIGS. 10A and 10B, the first imaging region 5002 is a time 0 imaging region and the second imaging region 5003 is a time 1 imaging region.

<A Time Period $T_A$-$T_B$ Imaging Region or a Time Period T Imaging Region, and a Cycle $T_{CYCLE}$ Imaging Region>

These are examples of "virtual imaging regions". Each means a region imaged by a camera during a period of time from a time $T_A$ to a time $T_B$. In the description, the region is denoted as a time period $T_A$ to $T_B$ imaging region. Alternatively, a region imaged by a camera in a period of time T from a time $T_A$ to a time $T_B$ is denoted as a time period T imaging region. In particular, in the case where regions within an imaging region are periodically imaged, this imaging region is a region imaged in a cycle $T_{CYCLE}$ and denoted as a cycle $T_{CYCLE}$ imaging region. In FIGS. 10A and 10B, the combined region of the first imaging region 5002 and second imaging region 5003 is a time period 0 to 1 imaging region or a time period 2 imaging region. Further, as shown in FIG. 10C, the first imaging region 5002 and second imaging region 5003 in the imaging region are periodically imaged in 2 cycles. Therefore, the imaging region is a 2 cycle imaging region.

(Size of the Cycle $T_{CYCLE}$ Imaging Region of a Camera)

The size of the cycle $T_{CYCLE}$ imaging region of a camera is described hereafter. FIGS. 11A and 11B are drawings illustrating the relationship between the sizes of the cycle $T_{CYCLE}$ imaging region and various types of parameters. In FIG. 11A, number 5201 is a camera. The orientation of the camera 5201 can be changed by panning and tilting operations and the field angles of the camera 5201 can also be changed. The number 5202 is a time T imaging region which is a region imaged by the camera 5201 at a time T, the number 5203 is a cycle $T_{CYCLE}$ imaging region which is a region imaged by the camera 5201 in a cycle $T_{CYCLE}$, the number 5204 is a horizontal field angle $\Theta a_H$ which is a field angle of the camera 5201 in the horizontal direction, the number C205 is a vertical field angle $\Theta a_V$ which is a field angle of the camera 5201 in the vertical direction, and the number 5206 is a moving path of the time T imaging region 5202. The camera 5201 changes one's own orientation by panning and tilting operations over time. The position of the time T imaging region 5202 is shifted along the path indicated by the time T imaging region moving path 5206, whereby the cycle $T_{CYCLE}$ imaging region 5203 is imaged. Therefore, the size of the cycle $T_{CYCLE}$ imaging region 5203 obviously depends on the speed of panning and tilting operations by which the orientation of the camera 5201 is changed, the horizontal field angle $\Theta a_H$ 5204 and vertical field angle $\Theta a_V$ 5205 of the camera that determines the size of the time T imaging region 5202, and the length of time of the cycle $T_{CYCLE}$. The cycle $T_{CYCLE}$ imaging region 5203 is increased in size as the camera 5201 has higher panning and tilting speeds, greater field angles, and a longer length of time of the cycle $T_{CYCLE}$.

(Field Angles and Panning and Tilting of a Camera Imaging a Cycle $T_{CYCLE}$ Imaging Region)

The field angles and panning and tilting of a camera that images a cycle $T_{CYCLE}$ imaging region is described hereafter. FIG. 11B is a drawing showing a cycle $T_{CYCLE}$ camera 5211 equivalent in a cycle $T_{CYCLE}$ to the camera 5201 shown in FIG. 11A. A time T imaging region 5202, a cycle $T_{CYCLE}$ imaging region 5203, and a time T imaging region moving path 5205 in FIG. 11B are the same as those in FIG. 11A. The number 5211 is a camera that images the cycle $T_{CYCLE}$ imaging region 5203. The orientation of the camera 5211 can be changed by panning and tilting operations and the field angles of the camera 5211 can also be changed. Here, the cycle $T_{CYCLE}$ camera 5211 is present in the same spatial position as the camera 5201 although they are oriented differently. The number 5212 is a horizontal field angle $\Theta b_H$ which is a field angle of the cycle $T_{CYCLE}$ camera 5211 in the horizontal direction, the number 5213 is a vertical field angle $\Theta b_V$ which is a field angle of the cycle $T_{CYCLE}$ camera 5211 in the vertical direction. The camera 5201 in FIG. 11A images the cycle $T_{CYCLE}$ imaging region 5203 in a cycle $T_{CYCLE}$. Therefore, the camera 5201 is considered to be the cycle $T_{CYCLE}$ camera 5211 in FIG. 11B that images the cycle $T_{CYCLE}$ imaging region 5203 in a cycle $T_{CYCLE}$. Further in the cycle $T_{CYCLE}$ camera 5211, the horizontal field angle is considered to be the horizontal field angle $\Theta b_H$ 5212 and the vertical field angle is considered to be the vertical field angle $\Theta b_V$ 5212.

In a general camera such as the camera 5201, the field angles depend on the aspect ratio of an image pickup surface of a CCD and the like. Therefore, the horizontal field angle $\Theta a_H$ 5204 and vertical field angle $\Theta a_V$ 5205 cannot be independently controlled. However, in the cycle $T_{CYCLE}$ camera 5211, the cycle $T_{CYCLE}$ imaging region 5203 is determined by the panning and tilting operations of the camera 5201. Therefore, the horizontal field angle $\Theta b_H$ 5212 and vertical field angle $\Theta b_V$ 5212 can be independently controlled irrespective of the aspect ratio of the image pickup surface of a CCD and the like as in a general camera.

FIGS. 12A and 12B are illustrations showing the field angles and panning and tilting angles of the camera 5201 in FIG. 11A and the cycle $T_{CYCLE}$ camera 5211 in FIG. 11B. A camera 5201 and a cycle $T_{CYCLE}$ camera 5211 in FIG. 12A include the same as the camera 5201 in FIG. 11A and the cycle $T_{CYCLE}$ camera 5211 in FIG. 11B, respectively. Here, the camera 5201 and cycle $T_{CYCLE}$ camera 5211 are present in the same spatial position; however, these cameras are intentionally illustrated side by side in FIG. 12A for easier understanding. The number 5220 is an additional line, the number 5221 is the maximum horizontal field angle $\Theta a_{H\_MAX}$ which is the maximum field angle of the camera 5201 in the horizontal direction, the number 5222 is the maximum field angle $\Theta a_{H\_MAX}/2$, and the number 5223 is the maximum panning angle $\Theta a_{P\_MAX}$ which is the maximum displacement angle of the camera 5201 by panning. The camera 5201 can be panned to the maximum panning angle $\Theta a_{P\_MAX}$ 5223, respectively, about the additional line 5220. The number 5224 is the cycle $T_{CYCLE}$ camera maximum horizontal field angle $\Theta b_{H\_MAX}$ which is the maximum field angle of the cycle $T_{CYCLE}$ camera 5211 in the horizontal direction, the number 5225 is the cycle $T_{CYCLE}$ camera horizontal field angle $\Theta b_H$ which is the field angle of the cycle $T_{CYCLE}$ camera 5211 in the horizontal direction, the number 5226 is the cycle $T_{CYCLE}$ camera horizontal field angle $\Theta b_H/2$, and the number 5227 is the cycle $T_{CYCLE}$ camera panning angle $\Theta b_P$ which is the panning angle of the cycle $T_{CYCLE}$ camera 5211. A camera 5201 and a cycle $T_{CYCLE}$ camera 5211 in FIG. 12B include the same as the camera 5201 in FIG. 11A and the cycle $T_{CYCLE}$ camera 5211 in FIG. 11B, respectively. Here, the camera 5201 and cycle $T_{CYCLE}$ camera 5211 are present in the same spatial position; however, these cameras are intentionally illustrated side by side in FIG. 12A for easier understanding. The number 5220 is an additional line, the number 5231 is the maximum vertical field angle $\Theta a_{V\_MAX}$ which is the maximum field angle of the camera 5201 in the vertical direction, the number 5232 is the maximum field angle $\Theta a_{V\_MAX}/2$, and the number 5233 is the maximum tilting angle $\Theta a_{T\_MAX}$ which is the maximum displacement angle of the camera 5201 by tilting. The camera 5201 can be tilted to the maximum tilting angle $\Theta a_{T\_MAX}$ 5223 upward and downward, respectively, about the additional line 5220. The number 5234 is the cycle $T_{CYCLE}$ camera maximum vertical field angle $\Theta b_{V\_MAX}$ which is the maximum field angle of the cycle $T_{CYCLE}$ camera 5211 in the vertical direction, the number 5235 is the cycle $T_{CYCLE}$ camera vertical field angle $\Theta b_V$ which is the field angle of the cycle $T_{CYCLE}$ camera 5211 in the vertical direction, the number 5236 is the cycle $T_{CYCLE}$ camera vertical field angle $\Theta b_V/2$, and the number 5237 is the cycle $T_{CYCLE}$ camera tilting angle $\Theta b_T$ which is the tilting angle of the cycle $T_{CYCLE}$ camera 5211.

As shown in FIGS. 12A and 12B, the maximum horizontal field angle $\Theta b_{H\_MAX}$ 5224 and maximum vertical field angle $\Theta b_{V\_MAX}$ 5234 of the cycle $T_{CYCLE}$ camera 5211 are represented by the Expression 1. The minimum horizontal field angle $\Theta b_{H\_MIN}$ of the cycle $T_{CYCLE}$ camera 5211 in the horizontal direction is equal to the minimum horizontal field angle $\Theta a_{H\_MIN}$ of the camera 5201 in the horizontal direction and the minimum vertical field angle $\Theta b_{V\_MIN}$ of the cycle $T_{CYCLE}$ camera 5211 in the vertical direction is equal to the minimum vertical field angle $\Theta a_{V\_MIN}$ of the camera 5201 in the vertical direction. However, when the cycle $T_{CYCLE}$ camera 5211 is panned or tilted by the panning angle $\Theta b_P$ 5227 or by the tilting angle $\Theta b_T$ 5237, the maximum vertical field angle $\Theta b_{H\_MAX}$ 5224 and maximum vertical field angle $\Theta b_{V\_MAX}$ 5234 of the cycle $T_{CYCLE}$ camera 5221 are restricted as indicated by the Expression 2. Therefore, the horizontal field angle $\Theta b_H$ 5225 and horizontal field angle $\Theta b_V$ 5235 of the cycle $T_{CYCLE}$ camera 5211 are variables within the range indicated by the Expression 3. Further, as shown in FIGS. 12A and 12B, the maximum panning angle $\Theta b_{P\_MAX}$ and maximum panning angle $\Theta b_{T\_MAX}$ of the cycle $T_{CYCLE}$ camera 5211 are equal to the maximum panning angle $\Theta a_{P\_MAX}$ 5223 and maximum panning angle $\Theta a_{T\_MAX}$ 5233 of the camera 5201. Subsequently, the panning angle $\Theta b_P$ 5227 and tilting angle $\Theta b_T$ 5237 of the cycle $T_{CYCLE}$ camera 5211 are variables within the range indicated by the Expression 4.

[Math 1]

$$\left.\begin{aligned}\theta b_{H\_MAX}(0) &= \theta a_{P\_MAX} + \frac{\theta a_{H\_MAX}}{2} \\ \theta b_{V\_MAX}(0) &= \theta a_{T\_MAX} + \frac{\theta a_{V\_MAX}}{2} \\ \theta b_{H\_MIN} &= \theta a_{H\_MIN} \\ \theta b_{V\_MIN} &= \theta a_{V\_MIN}\end{aligned}\right\}$$ (Expression 1)

-continued

[Math 2]

$$\begin{aligned}\theta b_{H\_MAX}(\theta b_P) \le \theta b_{H\_MAX}(0) - 2\times|\theta b_P| \\ \theta b_{V\_MAX}(\theta b_T) \le \theta b_{V\_MAX}(0) - 2\times|\theta b_T|\end{aligned}\Bigg\}$$ (Expression 2)

[Math 3]

$$\begin{aligned}\theta a_{H\_MIN} \le \theta b_H(\theta b_P) \le \theta b_{H\_MAX}(\theta b_P) \\ \theta a_{V\_MIN} \le \theta b_V(\theta b_T) \le \theta b_{V\_MAX}(\theta b_T)\end{aligned}\Bigg\}$$ (Expression 3)

[Math 4]

$$\begin{aligned}0 \le \theta b_P \le \theta a_{P\_MAX} \\ 0 \le \theta b_T \le \theta a_{T\_MAX}\end{aligned}\Bigg\}$$ (Expression 4)

(Imaging Region Position and View Point of a Camera)

Figure 13:
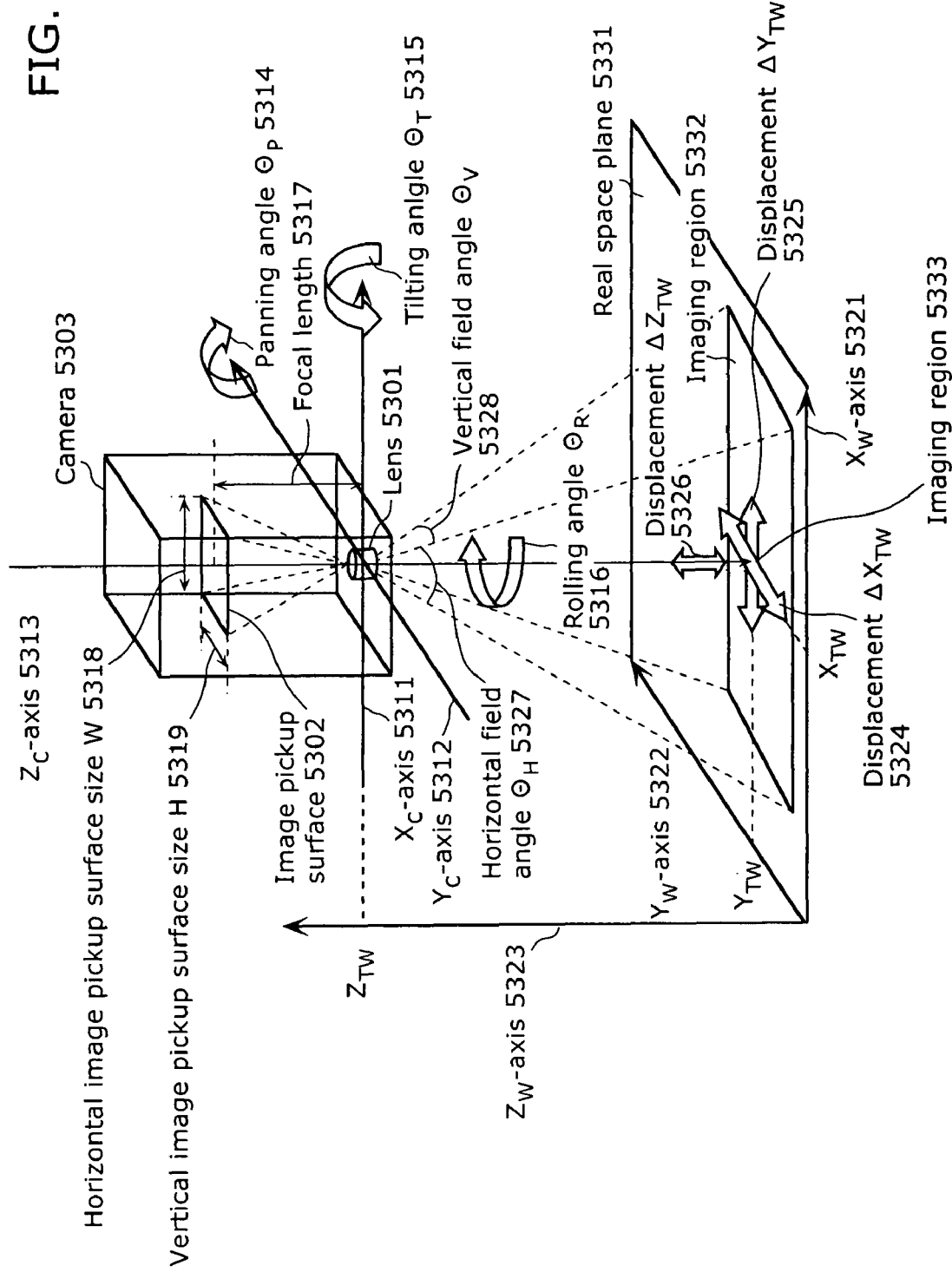
FIG. 13 is a drawing illustrating the position of an imaging region of a camera.

A method of calculating a position of imaging region and a view point of a camera is described hereafter. FIG. 13 is a drawing illustrating the position of an imaging region of a camera. In FIG. 13, the number 5301 is a lens for forming an image, the number 5302 is an image pickup surface of a CCD and the like for capturing the image formed by the lens 5301, and the number 5303 is a camera made up of the lens 5301 and image pickup surface 5302. The number 5311 is an $X_C$-axis, the number 5312 is a $Y_C$-axis, and the number 5313 is a $Z_C$-axis; these axes are orthogonal to one another and constitute a camera coordinates system having the origin at the lens 5301. Particularly, the $Z_C$-axis 5313 coincides with the sight line (imaging direction) of the camera 5303. The number 5314 is the panning angle $\Theta_P$ which is a rotation angle of the camera 5303 about the $Y_C$-axis 5312, the number 5315 is the tilting angle $\Theta_T$ which is a rotation angle of the camera 5303 about the $X_C$-axis 5311, and the number 5316 is the rolling angle $\Theta_R$ which is a rotation angle of the camera 5303 about the $Z_C$-axis 5313. The camera 5303 rotates by these rotation angles for orientation. The number 5317 is the focal length f which is the distance from the lens 5301 to the image pickup surface 5302, the number 5318 is a horizontal image pickup surface size W which is the size of the image pickup surface 5302 in the horizontal direction, and the number 5319 is a vertical image pickup surface size H which is the size of the image pickup surface 5302 in the vertical direction. The number 5321 is an $X_W$-axis, the number 5322 is a $Y_W$-axis, and the number 5323 is a $Z_W$-axis; these axes are orthogonal to one another and constitute a world coordinates system. The number 5324 is a displacement $\Delta X_{TW}$ which is a displacement of the camera 5303 in the $X_W$-axis 5321 direction, the number 5325 is a displacement $\Delta Y_{TW}$ which is a displacement of the camera 5303 in the $Y_W$-axis 5322 direction, and the number 5326 is a displacement $Z_{TW}$ which is a displacement of the camera 5303 in the $Z_W$-axis 5323 direction. The camera 5303 is present at a position $(X_{TW}, Y_{TW}, Z_{TW})$ on the world coordinates system and moves, by $(\Delta X_{TW}, \Delta Y_{TW}, \Delta Z_{TW})$, from this position regarded as the reference. The number 5327 is a horizontal field angle $\Theta_H$ which is a field angle of the camera 5303 in the horizontal direction and the number 5328 is a vertical field angle $\Theta_V$ which is a field angle of the camera 5303 in the vertical direction. The number 5331 is a real space plane where $Z_W = Z_{CONST}$, the number 5332 is an imaging region, on the real space plane 5331, where images are captured by the camera 5303, the number 5333 is a view point where the $Z_C$-axis 5313 intersects with the real space plane 5331 on which the imaging region 5332 is present and also the position of the sight line of the camera 5303 represented by the $Z_C$-axis 5313 on the real space plane.

A point $(X_{PC}, Y_{PC}, X_{PC})$ on the camera coordinates system made up of the $X_C$-axis 5321, $Y_C$-axis 5322, and $Z_C$-axis 5323 can be converted to a point $(X_{PC}, Y_{PC}, X_{PW})$ on the world coordinates system made up of the $X_W$-axis 5321, $Y_C$-axis 5322, and $Z_W$-axis 5323 using the Expression 5. In this Expression, a 3×3 matrix value having elements $M_{00}$ to $M_{22}$ is a matrix value for the orientation reference of the camera 5303 (the orientation of the camera 5303 when the rotation angles $(\Theta_P, \Theta_T, \Theta_R) = (0, 0, 0)$), a 3×3 matrix value having elements $R_{00}$ to $R_{22}$ is a matrix value for the orientation displacement of the camera 5303 from the orientation reference, $(X_{TW}, Y_{TW}, X_{TW})$ is the positional reference of the camera 5303 (the position of the camera 5303 when the positional displacement $(\Delta X_{TW}, \Delta Y_{TW}, \Delta X_{TW}) = (0, 0, 0)$), and $(\Delta X_{TW}, \Delta Y_{TW}, \Delta X_{TW})$ is a positional displacement of the camera 5303 from the positional reference.

[Math 5]

$$\begin{pmatrix}X_{PW}\\Y_{PW}\\Z_{PW}\end{pmatrix}=\begin{pmatrix}R_{00}&R_{01}&R_{02}\\R_{10}&R_{11}&R_{12}\\R_{20}&R_{21}&R_{22}\end{pmatrix}\begin{pmatrix}M_{00}&M_{01}&M_{02}\\M_{10}&M_{11}&M_{12}\\M_{20}&M_{21}&M_{22}\end{pmatrix}\begin{pmatrix}X_{PC}\\Y_{PC}\\Z_{PC}\end{pmatrix}+$$ (Expression 5)

$$\begin{pmatrix}X_{TW}\\Y_{TW}\\Z_{TW}\end{pmatrix}+\begin{pmatrix}\Delta X_{TW}\\\Delta Y_{TW}\\\Delta Z_{TW}\end{pmatrix}$$

The 3×3 matrix value having elements $M_{00}$ to $M_{22}$ and $(X_{TW}, Y_{TW}, X_{TW})$ can be calculated by placing the camera 5303 at the orientation reference and at the positional reference or by conducting the following well-known calibration using the current orientation and position of the camera 5303 as the orientation reference and the positional reference, respectively. These values are calculated before the imaging region adjustment device of the present invention starts operating.

Non-Patent Reference 1: A Versatile Camera Calibration Technique for High-Accuracy 3D Machine Vision Metrology Using Off-the-Shelf TV Cameras and Lenses. IEEE journal of Robotics and Automation, Vol. RA-3, No. 4, pp. 323-344, 1987.

The 3×3 matrix value having elements $R_{00}$ to $R_{22}$ representing the orientation displacement of the camera 5303 from the orientation reference can be calculated as indicated by the Expression 6 using rotation angles $(\Theta_P, \Theta_T, \Theta_R)$ that reflect the orientation of the camera 5303. The rotation angles $(\Theta_P, \Theta_T, \Theta_R)$ or the orientation of the camera 5303 and the positional displacement $(\Delta X_{TW}, \Delta Y_{TW}, \Delta X_{TW})$ of the camera 5303 from the positional reference can be obtained by reading the displacement in the stepping motor in the case where the position of the camera 5303 is changed by a stepping motor.

[Math 6]

$$\begin{pmatrix}R_{00}&R_{01}&R_{02}\\R_{10}&R_{11}&R_{12}\\R_{20}&R_{21}&R_{22}\end{pmatrix}=\begin{pmatrix}\cos\Theta_R&\sin\Theta_R&0\\-\sin\Theta_R&\cos\Theta_R&0\\0&0&1\end{pmatrix}$$ (Expression 6)

$$\begin{pmatrix}1&0&0\\0&\cos\Theta_T&\sin\Theta_{TC}\\0&-\sin\Theta_T&\cos\Theta_{TC}\end{pmatrix}\begin{pmatrix}\cos\Theta_P&0&-\sin\Theta_P\\0&1&0\\\sin\Theta_P&0&\cos\Theta_P\end{pmatrix}$$

Points $(X_{PC}, Y_{PC}, f)$ on the image pickup surface 5302 can be projected on the real space plane 5331 where $Z_W = Z_{CONST}$ according to the Expression 7. Points in the four corners of the image pickup surface, (−W/2, −H/2, f), (W/2, −H/2, f), (−W/2, H/2, f), and (W/2, H/2, f), are projected on the real space plane 5331 in the four corners of the imaging region 5332 of the camera 5303. The $Z_C$-axis 5313 passes through a point (0, 0, f) on the image pickup surface 5302. A projected point of the point (0, 0, f) on the real space plane 5331 where $Z_W = Z_{CONST}$ is the view point 5333 of the camera 5303. Therefore, the positions (points ($X_{PW0}$, $Y_{PW0}$, $Z_{PW0}$) to ($X_{PW3}$, $Y_{PW3}$, $Z_{PW3}$)) and view point 5333 (a point ($X_{PW4}$, $Y_{PW4}$, $Z_{PW4}$)) of the imaging region 5332 of the camera 5303 on the real space plane 5331 where $Z_W = Z_{CONST}$ can be calculated according to the Expressions 8 to 12.

[Math 7]

$$\begin{pmatrix} X_{PW} \\ Y_{PW} \\ Z_{PW} \end{pmatrix} = \begin{pmatrix} X_O + \dfrac{(Z_O - Z_{CONST})X_D}{Z_D} \\ Y_O + \dfrac{(Z_O - Z_{CONST})Y_D}{Z_D} \\ Z_{CONST} \end{pmatrix} \quad \text{(Expression 7)}$$

$$\begin{pmatrix} X_O \\ Y_O \\ Z_O \end{pmatrix} = \begin{pmatrix} X_{TW} \\ Y_{TW} \\ Z_{TW} \end{pmatrix} + \begin{pmatrix} \Delta X_{TW} \\ \Delta Y_{TW} \\ \Delta Z_{TW} \end{pmatrix}$$

$$\begin{pmatrix} X_D \\ Y_D \\ Z_D \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} X_{PC} \\ Y_{PC} \\ f \end{pmatrix}$$

[Math 8]

$$\begin{pmatrix} X_{PW0} \\ Y_{PW0} \\ Z_{PW0} \end{pmatrix} = \begin{pmatrix} X_O + \dfrac{(Z_O - Z_{CONST})X_{D0}}{Z_{D0}} \\ Y_O + \dfrac{(Z_O - Z_{CONST})Y_{D0}}{Z_{D0}} \\ Z_{CONST} \end{pmatrix} \quad \text{(Expression 8)}$$

$$\begin{pmatrix} X_{D0} \\ Y_{D0} \\ Z_{D0} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} -\dfrac{W}{2} \\ -\dfrac{H}{2} \\ f \end{pmatrix}$$

[Math 9]

$$\begin{pmatrix} X_{PW1} \\ Y_{PW1} \\ Z_{PW1} \end{pmatrix} = \begin{pmatrix} X_O + \dfrac{(Z_O - Z_{CONST})X_{D1}}{Z_{D1}} \\ Y_O + \dfrac{(Z_O - Z_{CONST})Y_{D1}}{Z_{D1}} \\ Z_{CONST} \end{pmatrix} \quad \text{(Expression 9)}$$

$$\begin{pmatrix} X_{D1} \\ Y_{D1} \\ Z_{D1} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} \dfrac{W}{2} \\ -\dfrac{H}{2} \\ f \end{pmatrix}$$

-continued

[Math 10]

$$\begin{pmatrix} X_{PW2} \\ Y_{PW2} \\ Z_{PW2} \end{pmatrix} = \begin{pmatrix} X_O + \dfrac{(Z_O - Z_{CONST})X_{D2}}{Z_{D2}} \\ Y_O + \dfrac{(Z_O - Z_{CONST})Y_{D2}}{Z_{D2}} \\ Z_{CONST} \end{pmatrix} \quad \text{(Expression 10)}$$

$$\begin{pmatrix} X_{D2} \\ Y_{D2} \\ Z_{D2} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} -\dfrac{W}{2} \\ \dfrac{H}{2} \\ f \end{pmatrix}$$

[Math 11]

$$\begin{pmatrix} X_{PW3} \\ Y_{PW3} \\ Z_{PW3} \end{pmatrix} = \begin{pmatrix} X_O + \dfrac{(Z_O - Z_{CONST})X_{D3}}{Z_{D3}} \\ Y_O + \dfrac{(Z_O - Z_{CONST})Y_{D3}}{Z_{D3}} \\ Z_{CONST} \end{pmatrix} \quad \text{(Expression 11)}$$

$$\begin{pmatrix} X_{D3} \\ Y_{D3} \\ Z_{D3} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} \dfrac{W}{2} \\ \dfrac{H}{2} \\ f \end{pmatrix}$$

[Math 12]

$$\begin{pmatrix} X_{PW4} \\ Y_{PW4} \\ Z_{PW4} \end{pmatrix} = \begin{pmatrix} X_O + \dfrac{(Z_O - Z_{CONST})X_{D4}}{Z_{D4}} \\ Y_O + \dfrac{(Z_O - Z_{CONST})Y_{D4}}{Z_{D4}} \\ Z_{CONST} \end{pmatrix} \quad \text{(Expression 12)}$$

$$\begin{pmatrix} X_{D4} \\ Y_{D4} \\ Z_{D4} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} 0 \\ 0 \\ f \end{pmatrix}$$

The horizontal field angle $\Theta_H$ 5327 and vertical field angle $\Theta_V$ 5328 have the relationship with the focal length f 5317, horizontal image pickup surface size W 5318, and vertical image pickup surface size W 5319 as indicated by Expression 13. Therefore, the position and view point 5333 of the imaging region 5232 of the camera 5303 on the real space plane 5331 where $Z_W = Z_{CONST}$ can be calculated also according to the Expressions 14 to 17.

[Math 13]

$$\begin{aligned} \dfrac{W}{2f} &= \tan\left(\dfrac{\theta_H}{2}\right) \\ \dfrac{H}{2f} &= \tan\left(\dfrac{\theta_V}{2}\right) \end{aligned} \quad \text{(Expression 13)}$$

-continued

[Math 14]

$$\begin{pmatrix} X_{PW0} \\ Y_{PW0} \\ Z_{PW0} \end{pmatrix} = \begin{pmatrix} X_O + \dfrac{(Z_O - Z_{CONST})X_{D0}}{Z_{D0}} \\ Y_O + \dfrac{(Z_O - Z_{CONST})Y_{D0}}{Z_{D0}} \\ Z_{CONST} \end{pmatrix}$$

$$\begin{pmatrix} X_{D0} \\ Y_{D0} \\ Z_{D0} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} -\tan\left(\dfrac{\theta_H}{2}\right) \\ -\tan\left(\dfrac{\theta_V}{2}\right) \\ 1 \end{pmatrix}$$

(Expression 14)

[Math 15]

$$\begin{pmatrix} X_{PW1} \\ Y_{PW1} \\ Z_{PW1} \end{pmatrix} = \begin{pmatrix} X_O + \dfrac{(Z_O - Z_{CONST})X_{D1}}{Z_{D1}} \\ Y_O + \dfrac{(Z_O - Z_{CONST})Y_{D1}}{Z_{D1}} \\ Z_{CONST} \end{pmatrix}$$

$$\begin{pmatrix} X_{D1} \\ Y_{D1} \\ Z_{D1} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} \tan\left(\dfrac{\theta_H}{2}\right) \\ -\tan\left(\dfrac{\theta_V}{2}\right) \\ 1 \end{pmatrix}$$

(Expression 15)

[Math 16]

$$\begin{pmatrix} X_{PW2} \\ Y_{PW2} \\ Z_{PW2} \end{pmatrix} = \begin{pmatrix} X_O + \dfrac{(Z_O - Z_{CONST})X_{D2}}{Z_{D2}} \\ Y_O + \dfrac{(Z_O - Z_{CONST})Y_{D2}}{Z_{D2}} \\ Z_{CONST} \end{pmatrix}$$

$$\begin{pmatrix} X_{D2} \\ Y_{D2} \\ Z_{D2} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} -\tan\left(\dfrac{\theta_H}{2}\right) \\ \tan\left(\dfrac{\theta_V}{2}\right) \\ 1 \end{pmatrix}$$

(Expression 16)

[Math 17]

$$\begin{pmatrix} X_{PW3} \\ Y_{PW3} \\ Z_{PW3} \end{pmatrix} = \begin{pmatrix} X_O + \dfrac{(Z_O - Z_{CONST})X_{D3}}{Z_{D3}} \\ Y_O + \dfrac{(Z_O - Z_{CONST})Y_{D3}}{Z_{D3}} \\ Z_{CONST} \end{pmatrix}$$

$$\begin{pmatrix} X_{D3} \\ Y_{D3} \\ Z_{D3} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} \tan\left(\dfrac{\theta_H}{2}\right) \\ \tan\left(\dfrac{\theta_V}{2}\right) \\ 1 \end{pmatrix}$$

(Expression 17)

The above method of calculating the position of the imaging region of a camera can be applied not only to the calculation of the position and view point of a time T imaging region but also to the calculation of the position and view point of a cycle $T_{CYCLE}$ imaging region. For calculating the position and view point of a cycle $T_{CYCLE}$ imaging region, the panning angle $\Theta_P$ 5314, tilting angle $\Theta_T$ 5315, rolling angle $\Theta_R$ 5316, horizontal field angle $\Theta_H$ 5327, and vertical field angle $\Theta_V$ 5328 in the Expressions 6 and 13 to 17 may be replaced by the panning angle $\Theta b_P$ 5227, tilting angle $\Theta b_T$ 5228, rolling angle $\Theta b_R$, horizontal field angle $\Theta b_H$ 5225, and vertical field angle $\Theta b_V$ 5335 shown in FIGS. 12A and 12B, respectively (the rolling angle $\Theta b_R$ is not shown in FIGS. 12A and 12B; however, it is equal to the rolling angle $\Theta a_R$ of the camera 5201). The 3×3 matrix value having elements $M_{00}$ to $M_{22}$ which is the matrix value of the orientation reference of the camera 5303, the positional reference ($X_{TW}$, $Y_{TW}$, $Z_{TW}$) of the camera 5303, and the positional displacement ($\Delta X_{TW}$, $\Delta Y_{TW}$, $\Delta Z_{TW}$) of the camera 5303 from the positional reference are obtained by using those of the camera imaging the time T imaging region because the position and orientation reference of the cycle $T_{CYCLE}$ camera imaging the cycle $T_{CYCLE}$ imaging region are the same as those of the camera imaging the time T imaging region.

(Imaging Method of a Cycle $T_{CYCLE}$ Imaging Region)

Figure 14A:
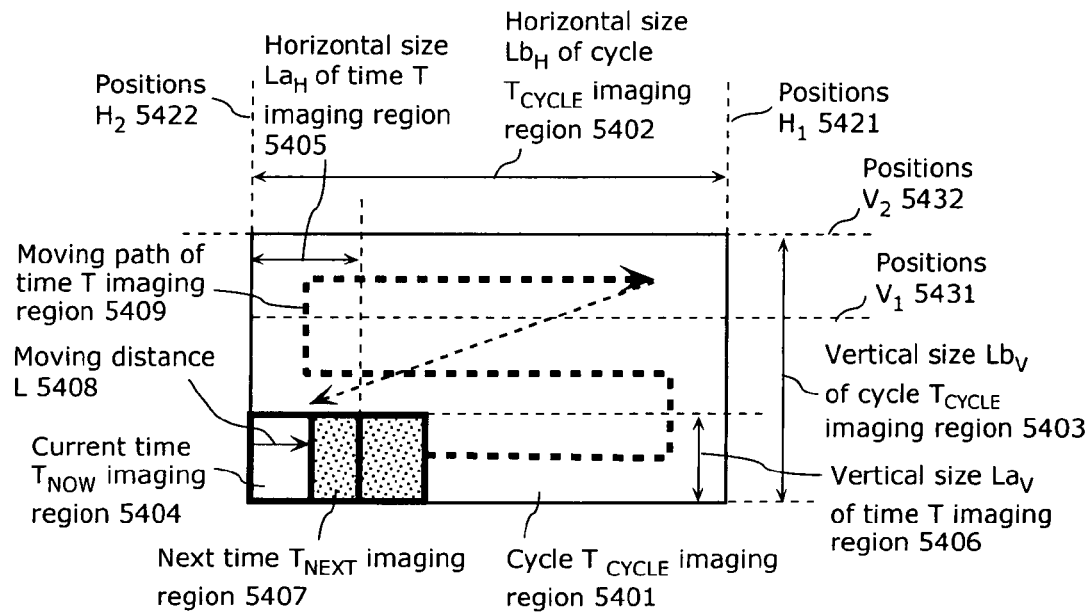
FIG. 14 is a drawing illustrating the imaging method of a cycle $T_{CYCLE}$ imaging region.
Figure 14B:
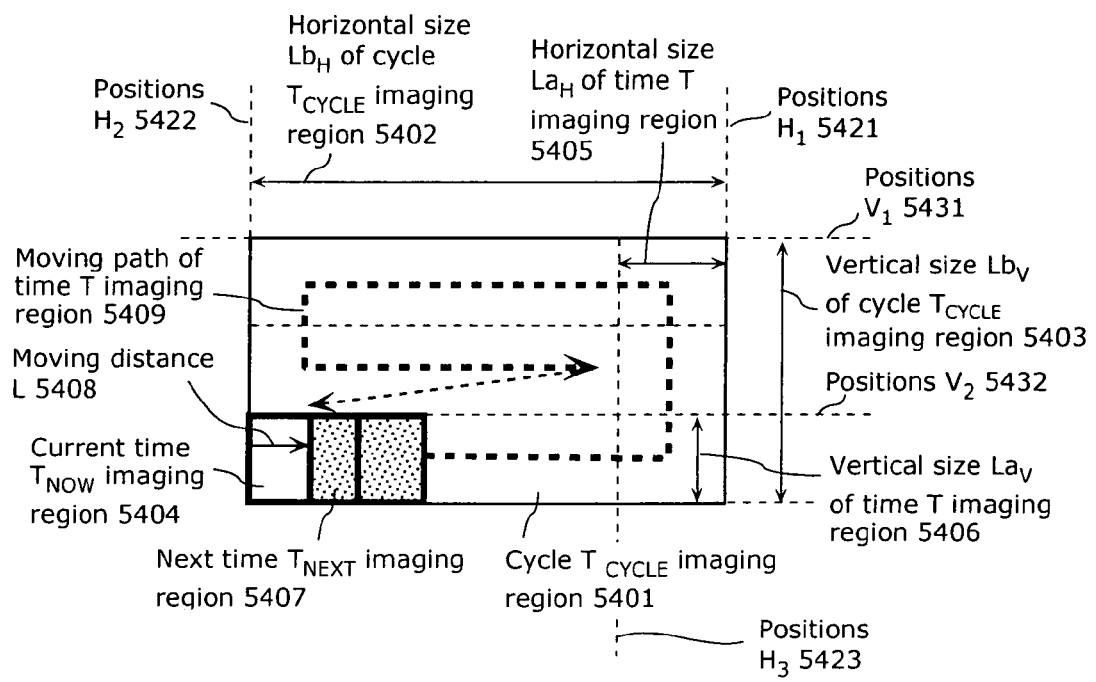
Figure 15:
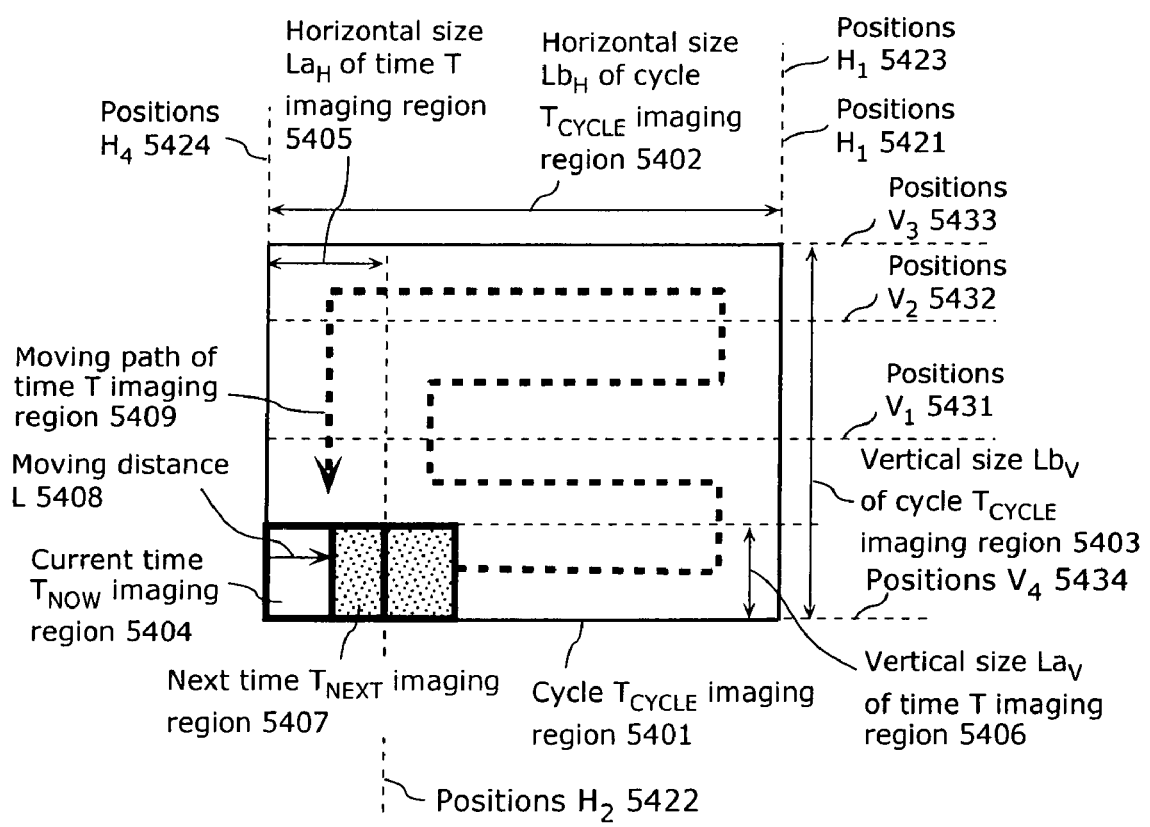
FIG. 15 is a drawing illustrating the imaging method of a cycle $T_{CYCLE}$ imaging region.

A method for imaging a cycle $T_{CYCLE}$ imaging region is described hereafter. FIGS. 14 and 15 are drawings illustrating the imaging method of a cycle $T_{CYCLE}$ imaging region. In FIGS. 14A and 14B and 15, the number 5401 is a cycle $T_{CYCLE}$ imaging region, the number 5402 is the horizontal size $Lb_H$ of the cycle $T_{CYCLE}$ imaging region 5401, the number 5403 is the vertical size $Lb_V$ of the cycle $T_{CYCLE}$ imaging region 5401, the number 5404 is a current time $T_{NOW}$ imaging region which is an imaging region at a current time $T_{NOW}$, the number 5405 is the horizontal size $La_H$ of the current time $T_{NOW}$ imaging region 5404, the number 5406 is the vertical size $La_V$ of the current time $T_{NOW}$ imaging region 5404, the number 5407 is a current time $T_{NEXT}$ imaging region which is an imaging region at a time $T_{NEXT}$ next to the current time $T_{NOW}$, the number 5408 is the moving distance L from the current time $T_{NOW}$ imaging region 5404 to the next time $T_{NEXT}$ imaging region 5407, the number 5409 is the moving path of the time T imaging region, the numbers 5421 to 5423 are horizontal positions $H_1$ to $H_3$, respectively, and the numbers 5431 to 5434 are vertical positions $V_1$ to $V_4$, respectively.

Figure 16A:
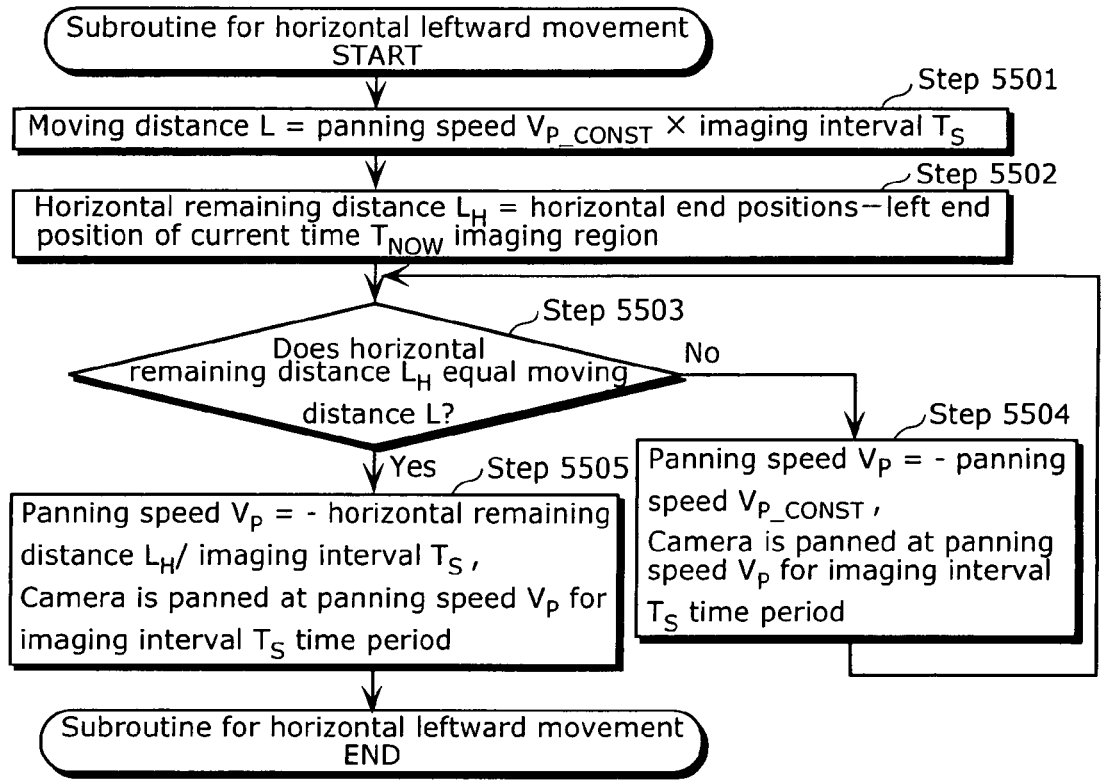
FIG. 16 is a flowchart indicating the procedure of the imaging method of a cycle $T_{CYCLE}$ imaging region.
Figure 16B:
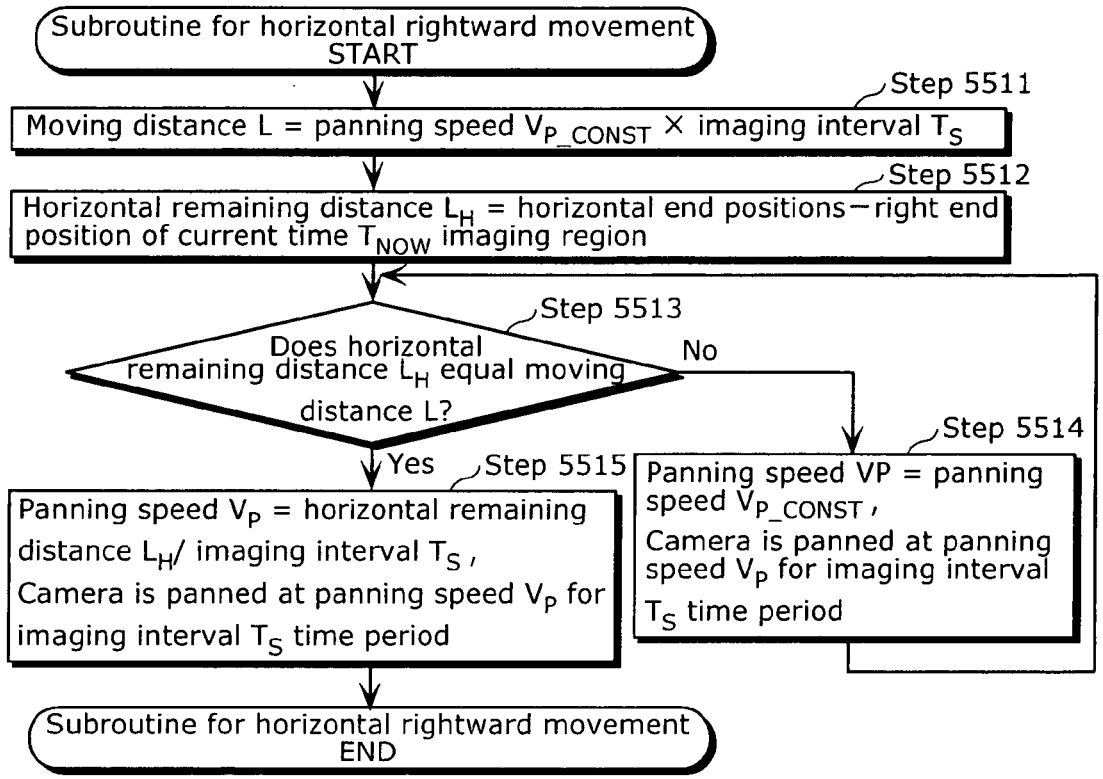
Figure 17A:
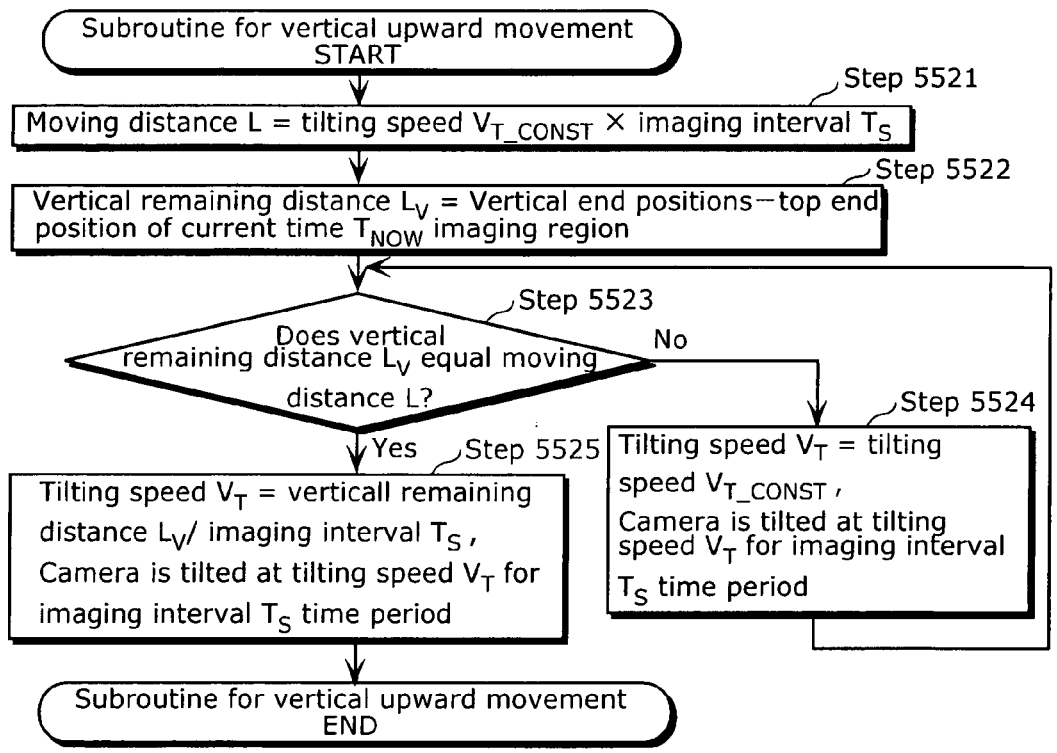
FIG. 17 is a flowchart indicating the procedure of the imaging method of a cycle $T_{CYCLE}$ imaging region.
Figure 17B:
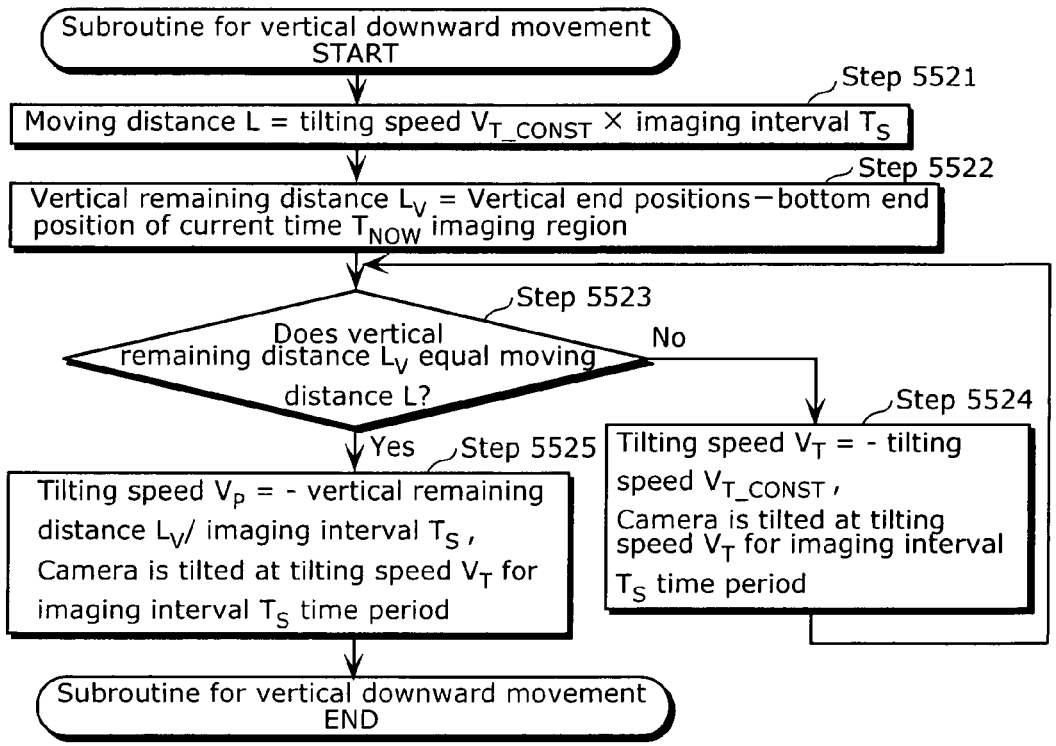
Figure 18:
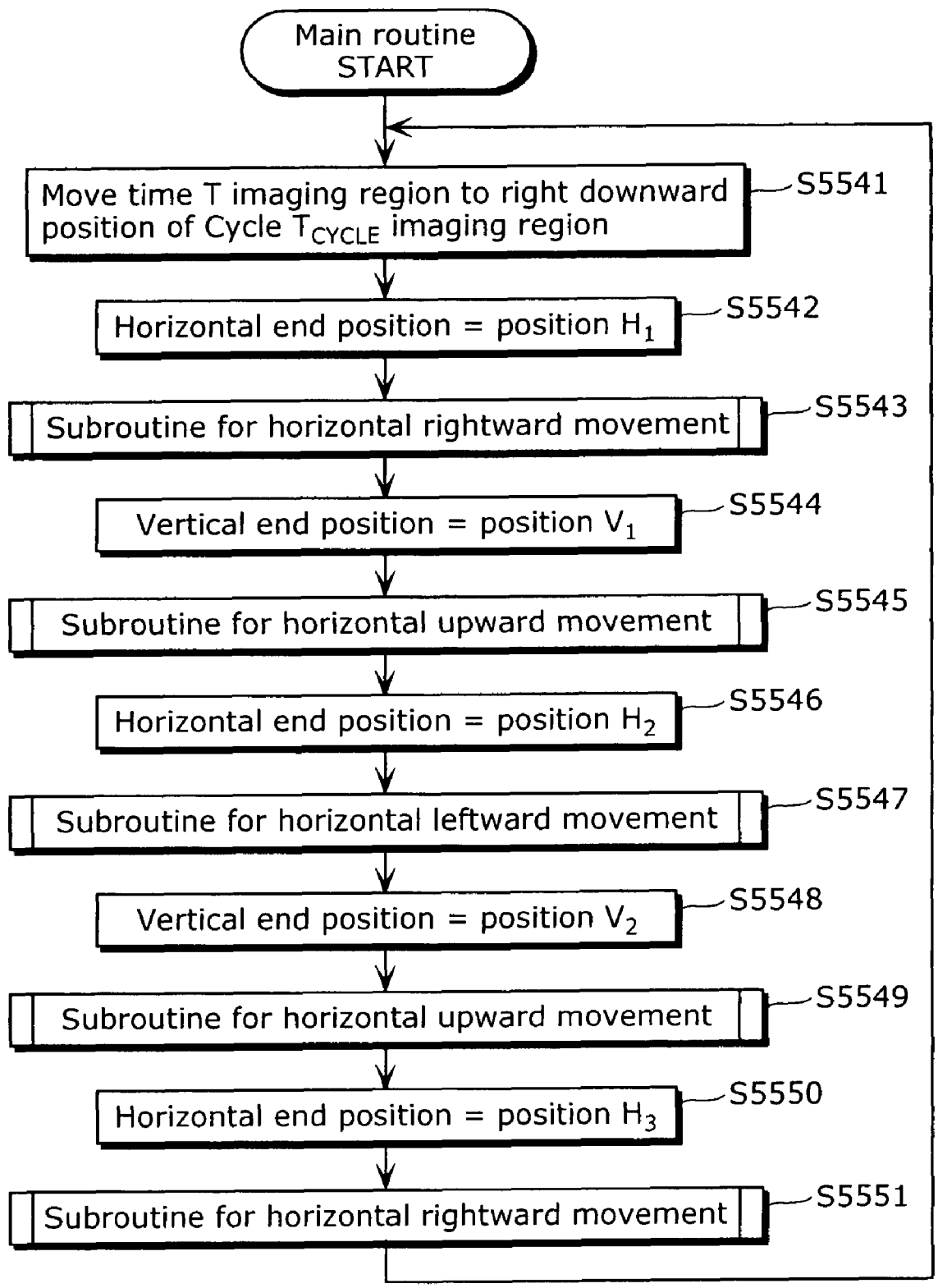
FIG. 18 is a flowchart indicating the procedure of the imaging method of a cycle $T_{CYCLE}$ imaging region.

FIGS. 16, 17, and 18 are flowcharts each showing the procedures of the method for imaging a cycle $T_{CYCLE}$ imaging region. The flowcharts shown in FIGS. 16A, 16B, 17A, and 17B are for subroutines to move the time T imaging region leftward, rightward, upward and downward to the horizontal and vertical end positions. First, the subroutine for leftward movement in the horizontal direction shown in FIG. 16A is described. The subroutine starts with calculating a moving distance L 5408 in FIGS. 14 and 15 in Step 5501. The moving distance L 5408 is calculated according to the Expression 18. In this Expression, $V_{P\_CONST}$ is a predetermined panning speed and $T_S$ is a predetermined imaging interval of the camera. Subsequently, in Step 5502, a horizontal remaining distance $L_H$ which is the distance between the left end position and the horizontally opposite end position of the current time $T_{NOW}$ imaging region 5404 is calculated. Subsequently, in Step 5503, a determination is made as to whether the horizontal remaining distance $L_H$ calculated in Step 5502 is equal to or less than the moving distance L 5408 calculated in Step 5501. In the case where the horizontal remaining distance $L_H$ is greater than the moving distance L 5408, the panning speed $V_P$ is set for the value indicated by the Expression 19 and the camera is panned to the left at the panning speed $V_P$ for an imaging time period $T_S$ (the camera is panned to the right when the panning speed is positive and to the left when the panning speed is negative) in Step 5504, and there is a return to Step 5503. On the other hand, when the horizontal remaining distance $L_H$ is equal to or less than the moving distance L 5408, the panning speed $V_P$ is set for the value indicated by the Expression 20 and the camera is panned to the left at the panning speed $V_P$ for an imaging time period $T_S$. Consequently, in Step 5504, the camera is continuously panned to the left at the panning speed $V_P$ indicated by the Expression 19 until the horizontal remaining distance $L_H$ becomes equal to or less than the moving distance L 5408. Further, in Step 5505, the camera is panned to the left at the panning speed $V_P$ indicated by the Expression 20 for an imaging time period $T_S$. Thus, the camera is panned to the left by the horizontal remaining distance $L_H$, and the time T imagining region of the camera reaches the horizontal end position.

[Math 18]

$$L = V_{P\_CONST} \times T_S \quad \text{(Expression 18)}$$

[Math 19]

$$V_P = -V_{P\_CONST} \quad \text{(Expression 19)}$$

[Math 20]

$$V_P = -\frac{L_H}{T_S} \quad \text{(Expression 20)}$$

The subroutine for leftward movement in the horizontal direction shown in FIG. 16B is described hereafter. The subroutine provides approximately the same operation as the subroutine for rightward movement shown in FIG. 16A. The subroutine starts with calculating a moving distance L 5408 in FIGS. 14 and 15 in Step 5511. The moving distance L 5408 is calculated according to the Expression 18. Subsequently, in Step 5512, a horizontal remaining distance $L_H$ corresponding to the distance between the right end position and the horizontally opposite end position of the current time $T_{NOW}$ imaging region 5404 is calculated. Subsequently, in Step 5513, a determination is made as to whether the horizontal remaining distance $L_H$ calculated in Step 5512 is equal to or less than the moving distance L 5408 calculated in Step 5511. When the horizontal remaining distance $L_H$ is greater than the moving distance L 5408, the panning speed $V_P$ is set for the value indicated by the Expression 21, and the camera is panned to the right at the panning speed $V_P$ for an imaging time period $T_S$ in Step 5514, and there is a return to Step 5513. On the other hand, when the horizontal remaining distance $L_H$ is equal to or less than 1 the moving distance L 5408, the panning speed $V_P$ is set for the value indicated by the Expression 22 and the camera is panned to the right at the panning speed $V_P$ for an imaging time period $T_S$. Consequently, in Step 5514, the camera is continuously panned to the right at the panning speed $V_P$ indicated by the Expression 21 until the horizontal remaining distance $L_H$ becomes equal to or less than the moving distance L is 5408. Further, in Step 5515, the camera is panned to the right at the panning sped $V_P$ indicated by the Expression 22 for an imaging time period $T_S$. Thus, the camera is panned to the right by the horizontal remaining distance $L_H$, and the time T imagining region of the camera reaches the horizontal end position.

[Math 21]

$$V_P = V_{P\_CONST} \quad \text{(Expression 21)}$$

[Math 22]

$$V_P = \frac{L_H}{T_S} \quad \text{(Expression 22)}$$

The subroutine for upward movement in the vertical direction shown in FIG. 17A is described hereafter. The operation of the subroutine is approximately the same as the operation executed in the subroutine for rightward movement in the horizontal direction shown in FIG. 16A. The subroutine starts with calculating the moving distance L 5408 in FIGS. 14 and 15 in Step 5521. The moving distance L 5408 is calculated according to the Expression 23. Subsequently, in Step 5522, a vertical remaining distance $L_V$ which is the distance between the top end position and the vertically opposite end position of the current time $T_{NOW}$ imaging region 5404 is calculated. Subsequently, in Step 5523, a determination is made as to whether the vertical remaining distance $L_V$ calculated in Step 5522 is equal to or less than the moving distance L 5408 calculated in Step 5521. When the vertical remaining distance $L_V$ is greater than the moving distance L 5408, the tilting speed $V_T$ is set for the value indicated by the Expression 24, and the camera is panned upward at the tilting speed $V_T$ for an imaging time period $T_S$ (the camera is tilted upward when the tilting speed is positive and downward when the tilting speed is negative) in Step 5524, and there is a return to Step 5523. On the other hand, when the vertical remaining distance $L_V$ is equal to or less than the moving distance L 5408, the tilting speed $V_T$ is set for the value indicated by the Expression 25, and the camera is tilted upward at the tilting speed $V_T$ for an imaging time period $T_S$. Consequently, in Step 5524, the camera is continuously tilted upward at the tilting speed $V_T$ indicated by the Expression 24 until the vertical remaining distance $L_V$ becomes equal to or less than the moving distance L 5408. Further, in Step 5525, the camera is tilted upward at the tilting speed $V_T$ indicated by the Expression 25 for an imaging time period $T_S$. Thus, the camera is tilted upward by the vertical remaining distance $L_V$ and the time T imagining region of the camera reaches the vertical end position.

[Math 23]

$$L = V_{T\_CONST} \times T_S \quad \text{(Expression 23)}$$

[Math 24]

$$V_T = -V_{T\_CONST} \quad \text{(Expression 24)}$$

[Math 25]

$$V_T = -\frac{L_H}{T_S} \quad \text{(Expression 25)}$$

Finally, the subroutine for downward movement in the vertical direction shown in FIG. 17B is described hereafter. The operation of the subroutine is approximately the same as the operation executed in the subroutine for rightward movement shown in FIG. 16A. The subroutine starts with calculating a moving distance L 5408 in FIGS. 14 and 15 in Step 5531. The moving distance L 5408 is calculated according to the Expression 23. Subsequently, in Step 5532, a vertical remaining distance $L_V$ which is the distance between the bottom end position and the vertically opposite end position of the current time $T_{NOW}$ imaging region 5404 is calculated. Subsequently, in Step 5533, a determination is made as to whether the vertical remaining distance $L_V$ calculated in Step 5532 is equal to or less than the moving distance L 5408 calculated in Step 5531. When the vertical remaining distance $L_V$ is greater than the moving distance L 5408, the tilting speed $V_T$ is set for the value indicated by the Expression 26, and the camera is panned downward at the tilting speed $V_T$ for an imaging time period $T_S$ in Step 5534, and there is a return to Step 5533. On the other hand, when the vertical remaining distance $L_V$ is equal to or less than the moving distance L 5408, the tilting speed $V_T$ is set for the value indicated by the Expression 27, and the camera is tilted downward at the tilting speed $V_T$ for an imaging time period $T_S$. Consequently, in Step 5534, the camera is continuously tilted downward at the tilting speed $V_T$ indicated by the Expression 26 until the vertical remaining distance $L_V$ becomes equal to or less than the moving distance L 5408. Further, in Step 5535, the camera is tilted downward at the tilting speed $V_T$ indicated by the Expression 27 for an imaging time period T. Thus, the camera is tilted downward by the vertical remaining distance $L_T$, and the time T imagining region of the camera reaches the vertical end position.

[Math 26]

$$V_T = V_{T\_CONST} \quad \text{(Expression 26)}$$

[Math 27]

$$V_T = \frac{L_V}{T_S} \quad \text{(Expression 27)}$$

As described above, according to the flowcharts of the subroutines shown in FIGS. 16A, 16B, 17A, and 17B, the time T imaging region can be shifted leftward, rightward, upward and downward to the horizontal and vertical end positions. The predetermined panning and tilting speeds $V_{P\_CONST}$ and $V_{T\_CONST}$ and imaging interval $T_S$ have the relationship with the horizontal time T imaging region size $La_H$ 5405 and vertical time T imaging region size $La_V$ 5406 as indicated by the Expression 28.

[Math 28]

$$\left. \begin{array}{l} La_H \geq V_{P\_CONST} \times T_S \\ La_Y \geq V_{T\_CONST} \times T_S \end{array} \right\} \quad \text{(Expression 28)}$$

The flowchart indicated in FIG. 18 is for a main routine to move the time T imaging region along the time T imaging region moving path 5409 in FIG. 14A using the subroutines shown in FIGS. 16A, 16B/17A, and 17B, thereby imaging the cycle $T_{CYCLE}$ imaging region 5401. First, in Step C541, the time T imaging region of the camera is moved to the bottom right position of the cycle $T_{CYCLE}$ imaging region 5401 as the current time $T_{NOW}$ imaging region 5404 in FIG. 14A. Subsequently, in Steps 5542 and 5543, with the horizontal end position at the position $H_1$ 5421, the camera is panned to the right up to the position $H_1$ 5421 using the subroutine shown in FIG. 16B. Subsequently, in Steps 5544 and 5545, with the vertical end position at the position $V_1$ 5431, the camera is tilted upward up to the position $V_1$ 5431 using the subroutine shown in FIG. 17A. Subsequently, in Steps 5546 and 5547, with the horizontal end position at the position $H_2$ 5422, the camera is panned to the left up to the position $H_2$ 5422 using the subroutine shown in FIG. 16A. Subsequently, in Steps 5548 and 5549, with the vertical end position at the position $V_2$ 5432, the camera is tilted upward up to the position $V_2$ 5432 using the subroutine shown in FIG. 17A. Subsequently, in Steps 5550 and 5551, with the horizontal end position at the position $H_3$ 5423, the camera is panned to the right up to the position $H_3$ 5423 using the subroutine shown in FIG. 16B, and there is a return to Step 541. According to the flowchart, the time T imaging region is moved along the time T imaging region moving path 5409 of FIG. 14A so as to image the cycle $T_{CYCLE}$ imaging region 5401.

In FIG. 18 shown is the flowchart to move the time T imaging region along the time T imaging region moving path 5409 in FIG. 14A, thereby imaging the cycle $T_{CYCLE}$ imaging region 5401. It is obvious and, therefore, not described here that the horizontal and vertical end positions can be set and subroutines can be read out in imaging orders different from those indicated in FIGS. 16A, 16B, 17A, and 17B when the time T imaging region is moved along the time T imaging region moving path 5409 in FIG. 14B or the time T imaging region is moved along the time T imaging region moving path 5409 in FIG. 15, thereby imaging in the cycle $T_{CYCLE}$ imaging region 5401.

The positions $H_1$ 5421 to $H_3$ 5423 used as the horizontal end positions and the positions $V_1$ 5431 to $V_4$ 5434 used as the vertical end positions can be respectively calculated using the relationship of the horizontal cycle $T_{CYCLE}$ imaging region size $Lb_H$ 5402, vertical cycle $T_{CYCLE}$ imaging region size $Lb_V$ 5403, horizontal time T imaging region size $La_H$ 5405, and vertical time T imaging region size $La_V$ 5406. For example, when the vertical cycle $T_{CYCLE}$ imaging region size $Lb_V$ 5403 may be 2.8 times greater than the vertical time T imaging region size $La_V$ 5406, the position $V_1$ 5431 in FIG. 14A may be double the vertical imaging region size $La_V$ 5406, and the position $V_2$ 5432 in FIG. 14A may be 2.8 times greater than the vertical imaging region size $La_V$ 5406. The position $V_2$ 5432 in FIG. 14A may be 3 times greater than the vertical imaging region size $La_V$ 5406. When the position $V_2$ 5432 in FIG. 14A is 3 times greater than the vertical imaging region size $La_V$ 5406, the time T imaging region runs off the edge of the cycle $T_{CYCLE}$ imaging region 5401; however, the entire cycle $T_{CYCLE}$ imaging region 5401 is imaged and no problems occur.

The horizontal cycle $T_{CYCLE}$ imaging region size $Lb_H$ 5402, vertical cycle $T_{CYCLE}$ imaging region size $Lb_V$ 5403, horizontal time T imaging region size $La_H$ 5405, and vertical time T imaging region size $La_V$ 5406 can be obtained by the above-described method for calculating the position of an imaging region of a camera based on the four corner positions of the cycle $T_{CYCLE}$ imaging region and time T imaging region calculated from the panning angle $\Theta_P$, tilting angle $\Theta_T$, rolling angle $\Theta_R$, horizontal field angle $\Theta_H$, and vertical field angle $\Theta_V$.

FIGS. 14A, 14B, and 15 show three examples of the time T imaging region moving path 5409. However, the time T imaging region moving path 5409 is not restricted thereto. Any path that allows the cycle $T_{CYCLE}$ imaging region 5401 to be thoroughly imaged, with a single stroke if possible, may be used.

The time T imaging region moving path 5409 may be selected from the time T imaging region moving path 5409 shown in FIGS. 14A, 14B and 15 depending on the horizontal cycle $T_{CYCLE}$ imaging region size $Lb_H$ 5402, vertical cycle $T_{CYCLE}$ imaging region size $Lb_V$ 5403, horizontal time T imaging region size $La_H$ 5405, and vertical time T imaging region size $La_V$ 5406.

The above explanation is made on the assumption that the cycle $T_{CYCLE}$ imaging region is greater than the time T imaging region. According to FIGS. 11A and 11B, when the cycle $T_{CYCLE}$ imaging region is equal to or smaller than the time T imaging region such as the time T camera horizontal field angle $\Theta a_H \geq$ the cycle $T_{CYCLE}$ camera horizontal field angle $\Theta b_H$, the time T camera vertical field angle $\Theta a_V \geq$ the cycle $T_{CYCLE}$ camera vertical field angle $\Theta b_V$, and the horizontal and vertical field angles of the cycle $T_{CYCLE}$ imaging region 5203 are equal to or less than those of the time T imaging region 5302, the entire cycle $T_{CYCLE}$ imaging region can be imaged at a time with the time T imaging region. In such a case, the time T imaging region position is not sequentially moved according to the technique described above. Instead, the position (panning/tilting/rolling angles) and size (zoom ratio) of the time T imaging region may be adjusted to image the entire cycle $T_{CYCLE}$ imaging region. In such a case, the cycle $T_{CYCLE}$ imaging region has a cycle of 0 and the entire cycle $T_{CYCLE}$ imaging region is constantly imaged. The position and size of the time T imaging region should be adjusted so that the entire cycle $T_{CYCLE}$ imaging region is imaged with the time T imaging region and the area within the time T imaging region where the cycle $T_{CYCLE}$ imaging region is not imaged is minimized.

(Shape of the Imaging Region)

Figure 19:
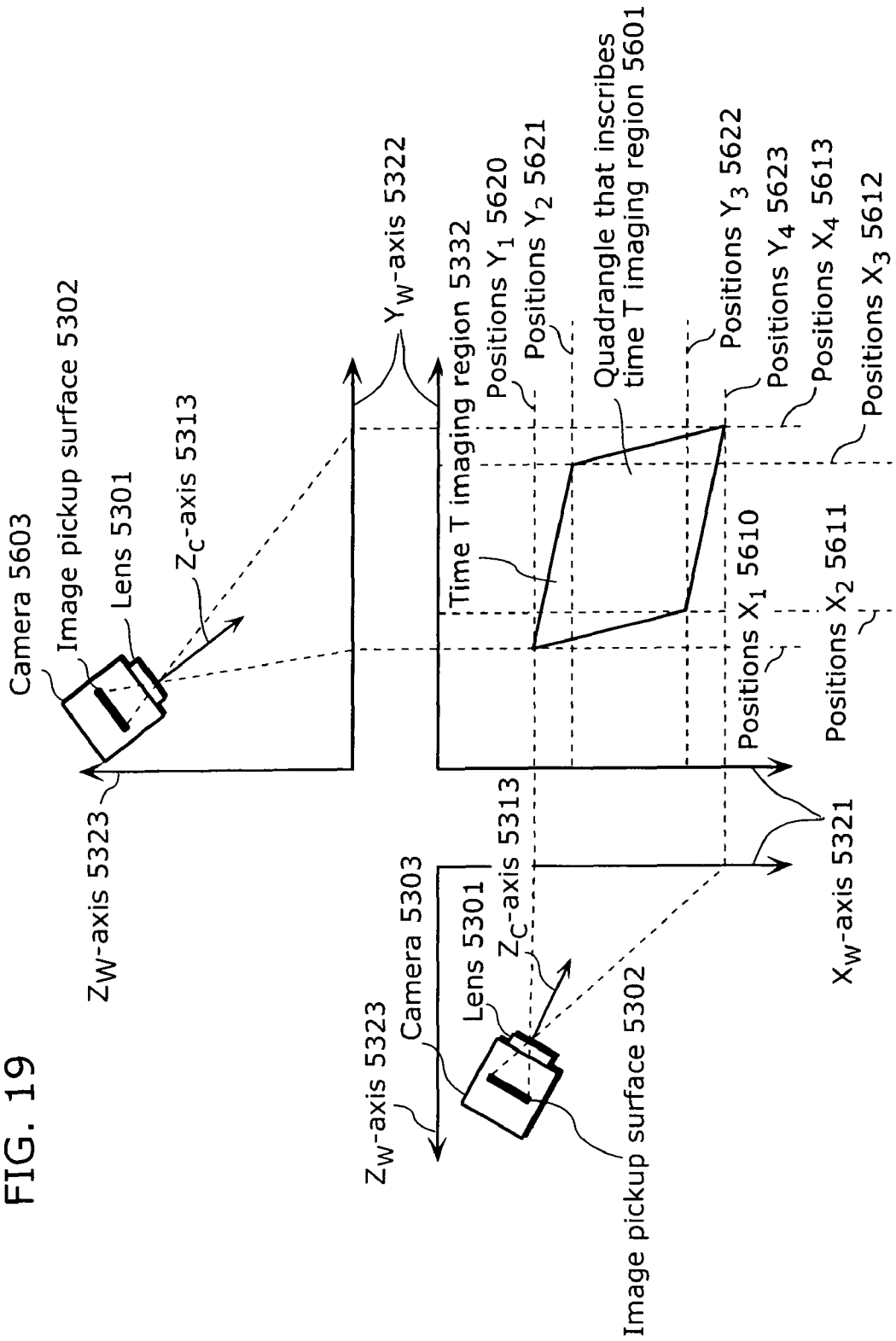
FIG. 19 is a drawing illustrating the shape of an imaging region.

The shape of the time T imaging region and cycle $T_{CYCLE}$ imaging region is described hereafter. FIG. 19 is a drawing illustrating the shape of the time T imaging region. In FIG. 19, the number 5301 is a lens, the number 5302 is an image pickup surface, the number 5303 is a camera, the number 5313 is a $Z_C$-axis, the number 5321 is an $X_W$-axis, the number 5322 is a $Y_W$-axis, the number 5323 is a $Z_W$-axis, and the number 5332 is a time T imaging region. The elements are the same as those in FIG. 13. The number 5601 is a quadrangle that inscribes the time T imaging region 5332 and has sides parallel to the $X_W$-axis 5321 and $Y_W$-axis 5322. The numbers 5610 to 5613 are positions $X_1$ to $X_4$ including four corner positions of the time T imaging region 5332 on the $X_W$-axis 5321. The numbers 5620 to 5623 are positions $Y_1$ to $Y_4$ including four corner positions of the time T imaging region 5332 on the $Y_W$-axis 5322.

In the embodiment, the time T imaging region and cycle $T_{CYCLE}$ imaging region are quadrangles having sides parallel to the $X_W$-axis 5321 and $Y_W$-axis 5322, for simplified explanation. However, as shown in FIG. 19, the time T imaging region 5332 of the camera 5303 is a rectangular having sides not parallel to the $X_W$-axis 5321 and $Y_W$-axis 5322 when the $Z_C$-axis 5313 that coincides with the imaging direction of the camera 5303 is not parallel to the $Z_W$-axis 5323. In such a case, the time T imaging region is assumed to be a quadrangle inscribing the time T imaging region 5323 and having sides parallel to the $X_W$-axis 5321 and $Y_W$-axis 5322 shown as the time T imaging region-inscribed quadrangle 5601. The four corner positions of the time T imaging region-inscribed quadrangle 5601 can be obtained based on a size relationship between the positions $X_1$ 5620 to $X_3$ 5623 which is the four corner positions of the time T imaging region 5332 on the $X_W$-axis 5321 and the positions $Y_1$ 5630 to $Y_3$ 5633 which is the four corner positions of the time T imaging region 5332 on the $Y_W$-axis 5322, as shown in FIG. 19. The second and third largest positions among the positions $X_1$ 5620 to $X_3$ 5623 and the second and third largest positions among the positions $Y_1$ 5630 to $Y_3$ 5633 include the four corner positions of the time T imaging region-inscribed quadrangle 5601. Here, the time T imaging region-inscribed quadrangle 5601 is not necessarily a quadrangle calculated as described above, but may be any rectangular that inscribes the time T imaging region 5332 and has sides parallel to the $X_W$-axis 5321 and $Y_W$-axis 5322. The positions $X_1$ 5620 to $X_3$ 5623 and positions $Y_1$ 5630 to $Y_3$ 5633 can be calculated by the above-described method for calculating the position of an imaging region of a camera using the panning angle $\Theta_P$, tilting angle $\Theta_T$, rolling angle $\Theta_R$, horizontal field angle $\Theta_H$, and vertical field angle $\Theta_V$.

Figure 20:
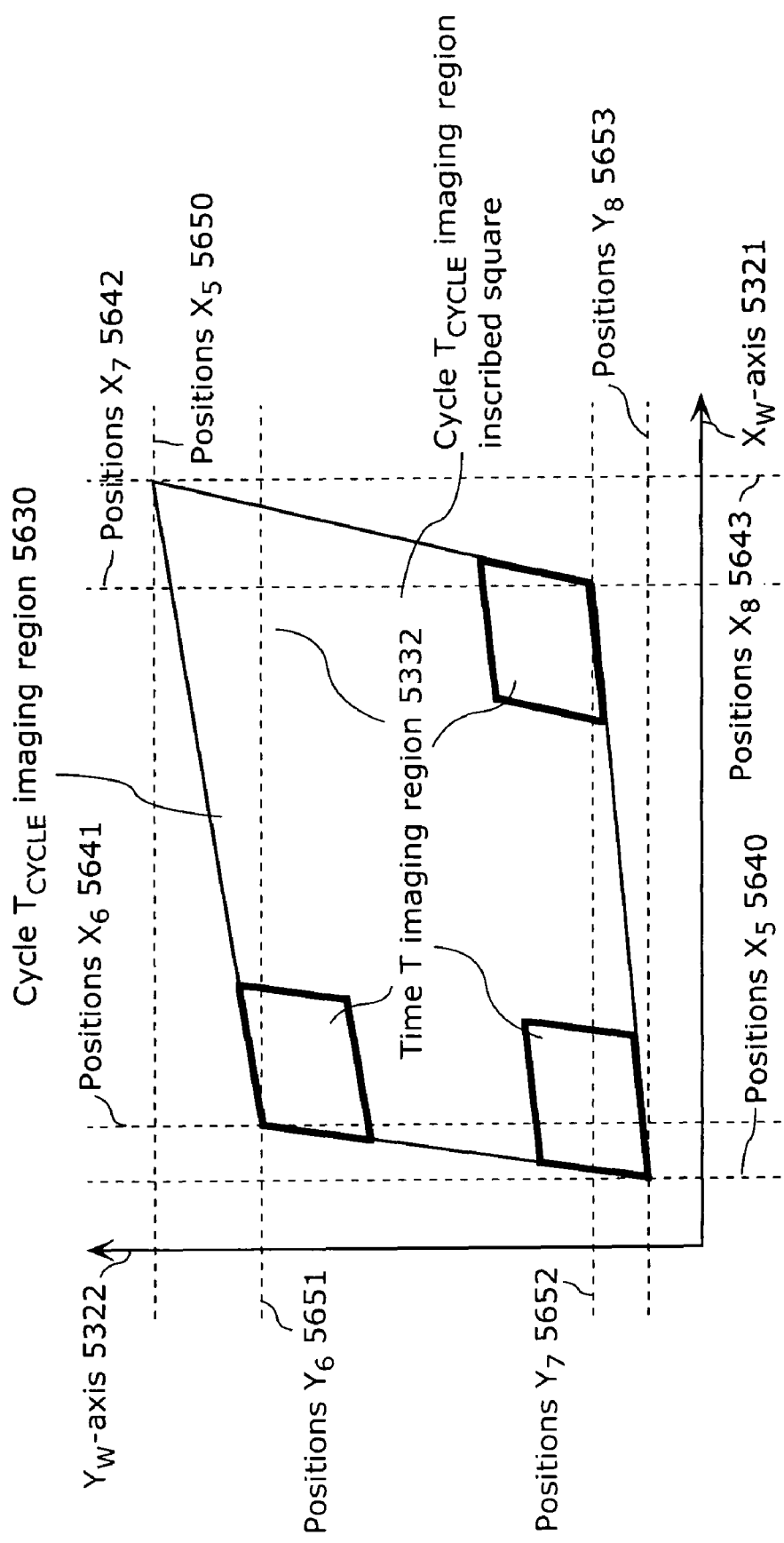
FIG. 20 is a drawing illustrating the shape of an imaging region.

FIG. 20 is a drawing illustrating the shape of the cycle $T_{CYCLE}$ imaging region. In FIG. 20, the number 5321 is an $X_W$-axis, the number 5322 is a $Y_W$-axis, and the number 5332 is a time T imaging region. These elements are the same as those in FIG. 13. The number 5630 is a cycle $T_{CYCLE}$ imaging region, the number 5631 is a quadrangle that inscribes the cycle $T_{CYCLE}$ imaging region 5630 and has sides parallel to the $X_W$-axis 5321 and $Y_W$-axis 5322, the numbers 5640 to 5643 are positions $X_4$ to $X_7$ including four corner positions of the cycle $T_{CYCLE}$ imaging region 5630 on the $X_W$-axis 5321, and the numbers 5650 to 5653 are positions $Y_4$ to $Y_7$ including four corner positions of the cycle $T_{CYCLE}$ imaging region 5630 on the $Y_W$-axis 5322. As shown in FIG. 20, similar to the time T imaging region 5332, the cycle $T_{CYCLE}$ imaging region 5630 may be a rectangular having sides not parallel to the $X_W$-axis 5321 and $Y_W$-axis 5322. In such a case, the cycle $T_{CYCLE}$ imaging region is assumed to be a quadrangle inscribing the cycle $T_{CYCLE}$ imaging region 5630 and having sides parallel to the $X_W$-axis 5321 and $Y_W$-axis 5322 shown as the cycle $T_{CYCLE}$ imaging region-inscribed quadrangle 5631.

The four corner positions of the cycle $T_{CYCLE}$ imaging region-inscribed quadrangle 5631 can be calculated based on a size relationship between the positions $X_5$ 5640 to $X_8$ 5643 including the four corner positions of the cycle $T_{CYCLE}$ imaging region 5630 on the $X_W$-axis 5321 and the positions $Y_5$ 5650 to $Y_8$ 5653 including the four corner positions of the cycle $T_{CYCLE}$ imaging region 5630 on the $Y_W$-axis 5322, as shown in FIG. 20. The second and third largest positions among the positions $X_5$ 5640 to $X_8$ 5643 and the second and third largest positions among the positions $Y_5$ 5650 to $Y_8$ 5653 include the four corner positions of the cycle $T_{CYCLE}$ imaging region-inscribed quadrangle 5631. Here, the cycle $T_{CYCLE}$ imaging region-inscribed quadrangle 5631 is not necessarily a quadrangle obtained as described above, but can be any quadrangle that inscribes the cycle $T_{CYCLE}$ imaging region 5630 and has sides parallel to the $X_W$-axis 5321 and $Y_W$-axis 5322. The positions $X_5$ 5640 to $X_8$ 5643 and positions $Y_5$ 5650 to $Y_8$ 5653 can be calculated by the above-described method for calculating the position of an imaging region of a camera using the panning angle $\Theta_P$, tilting angle $\Theta_T$, rolling angle $\Theta_R$, horizontal field angle $\Theta_H$, and vertical field angle $\Theta_V$.

(Adjacent Imaging Regions)

Next, adjacent imaging regions are described. Adjacent imaging regions are other imaging regions nearest to a current imaging region in the horizontal and vertical directions such as upward, downward, leftward and rightward. The procedure to obtain imaging regions adjacent to a current imaging region is described hereafter.

Figure 21:
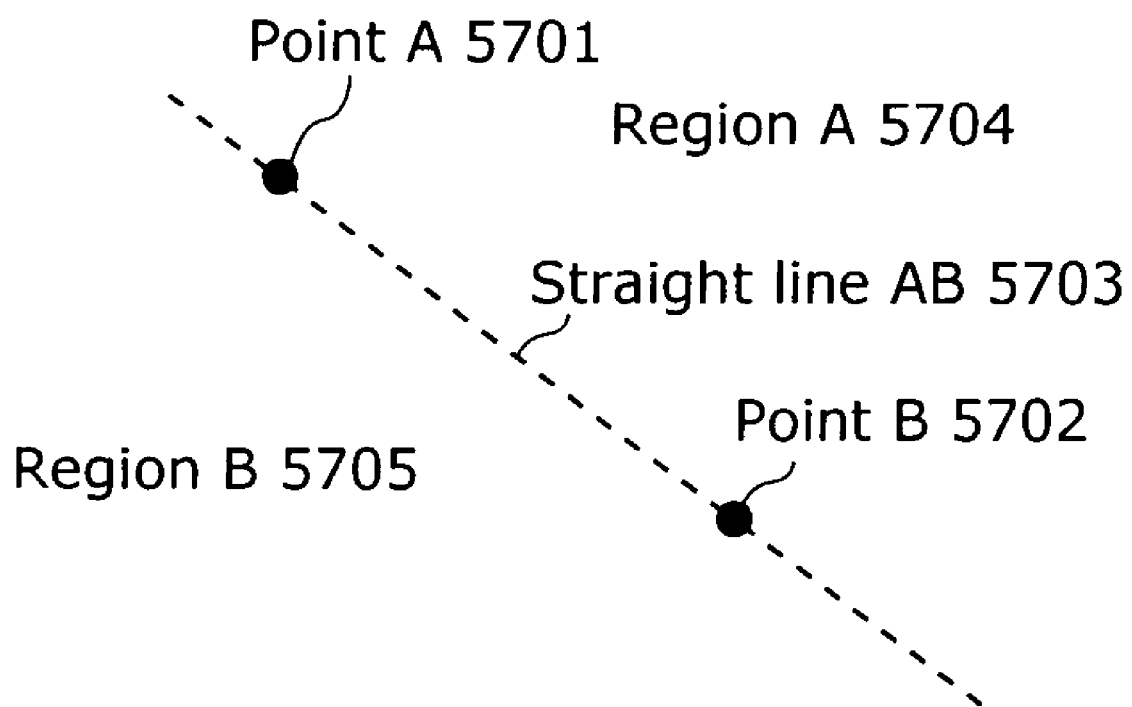
FIG. 21 is a drawing illustrating a method of determining a region.

First, the direction in which other imaging regions are present is determined for the current imaging region. The determination method indicated in FIG. 21 is used for this determination. FIG. 21 is a drawing illustrating the region determination method. In FIG. 21, the number 5701 is a point A at coordinates $(X_A, Y_A)$, the number 5702 is a point B at coordinates $(X_B, Y_B)$, the number 5703 is a straight line AB passing through the points A 5701 and B 5702, the number 5704 is the top right region A divided by the straight line AB 5703, and the number 5705 is the top right region B divided by the straight line AB 5703. In FIG. 21, the Expression 29 is satisfied when a point Z at coordinates $(X_Z, Y_Z)$ is present in the region A 5704. When point Z is present in the region B 5705, the Expression 30 is satisfied (when the point Z is present on the straight line AB 5703, it is assumed that the point Z is present in the region B 5705). With the Expressions being evaluated, the region in which the point Z is present is determined from among the region A 5704 and the region B 5705.

Using the above-described method and assuming that the point Z is the gravity center of another imaging region (the average of vertexes of the imaging region), it is determined in which direction the imaging region is present. FIGS. 22A, 22B, 22C, and 22D are drawings illustrating in which direction another imaging region is present for the current imaging region. In FIG. 22, the number 5801 is a cycle $T_{CYCLE}$ imaging region, which corresponds to the current imaging region. The number 5802 is a first vertex A of the cycle $T_{CYCLE}$ imaging region 5801 at coordinates $(X_A, X_A)$, the number 5803 is a second vertex B of the cycle $T_{CYCLE}$ imaging region 5801 at coordinates $(X_B, X_B)$, the number 5804 is a third vertex C of the cycle $T_{CYCLE}$ imaging region 5801 at coordinates $(X_C, X_C)$, the number 5805 is a fourth vertex D of the cycle $T_{CYCLE}$ imaging region 5801 at coordinates $(X_D, X_D)$, the number 5806 is a region A above the cycle $T_{CYCLE}$ imaging region 5801 corresponding to the current imaging region, the number 5807 is a region B to the right of the cycle $T_{CYCLE}$ imaging region 5801 corresponding to the current imaging region, the number 5808 is a region C below the cycle $T_{CYCLE}$ imaging region 5801 corresponding to the current imaging region, and the number 5809 is a region D to the left of the cycle $T_{CYCLE}$ imaging region 5801 corresponding to the current imaging region.

[Math 29]

$$(Y_Z - Y_A) < \frac{(Y_B - Y_A)}{(X_B - X_A)}(X_Z - X_A) \quad \text{(Expression 29)}$$

[Math 30]

$$(Y_Z - Y_A) \geq \frac{(Y_B - Y_A)}{(X_B - X_A)}(X_Z - X_A) \quad \text{(Expression 30)}$$

Figure 22B:
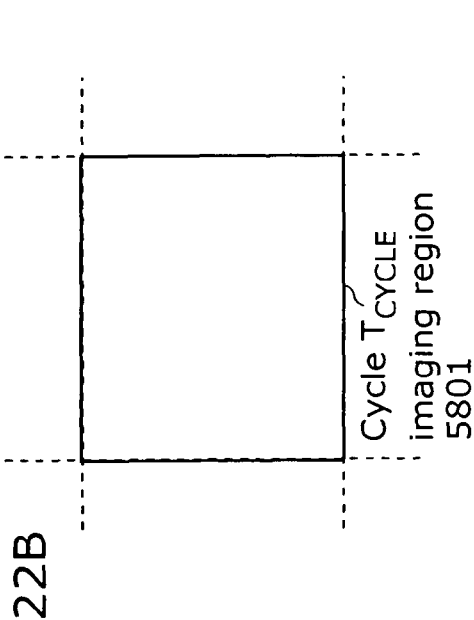
FIG. 22 is a drawing illustrating how to determine in which direction another imaging region is present in relation to the current imaging region.
Figure 22A:
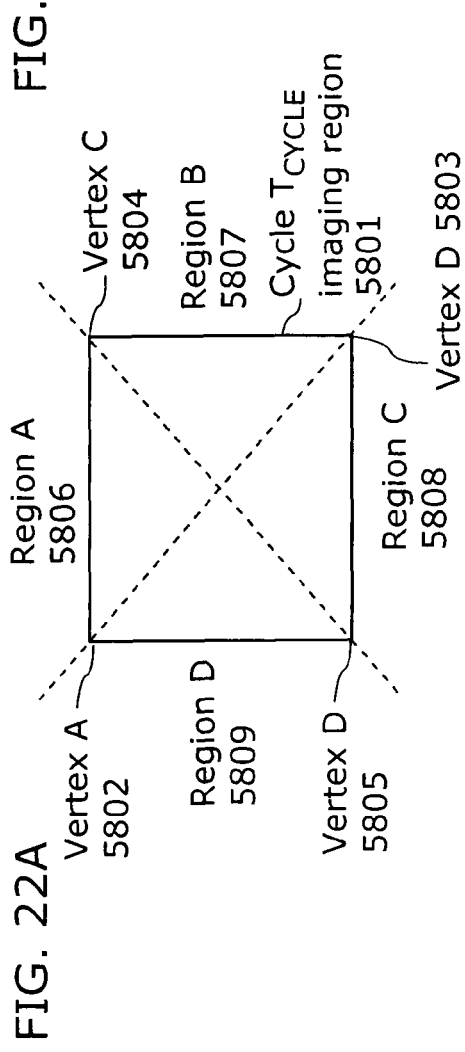

Using the determination method shown in FIG. 21, when the Expressions 29 and 31 are satisfied in FIG. 22A, it is determined that the point Z which is the gravity center of another imaging region is present in the region A 5806 and the other imaging region is above the current imaging region. When the Expressions 29 and 32 are satisfied, it is determined that the point Z which is the gravity center of another imaging region is present in the region B 5807 and the other imaging region is to the right of the current imaging region. When the Expressions 30 and 32 are satisfied, it is determined that the point Z which is the gravity center of another imaging region is present in the region C 5808 and the other imaging region is below the current imaging region. Finally, when the Expressions 30 and 31 are satisfied, it is determined that the point Z which is the gravity center of another imaging region is present in the region D 5809 and the other imaging region is to the left of the current imaging region.

[Math 31]

$$(Y_Z - Y_C) < \frac{(Y_D - Y_C)}{(X_D - X_C)}(X_Z - X_C) \quad \text{(Expression 31)}$$

[Math 32]

$$(Y_Z - Y_C) \geq \frac{(Y_D - Y_C)}{(X_D - X_C)}(X_Z - X_C) \quad \text{(Expression 32)}$$

Next, among the other imaging regions, the nearest one in each direction is assumed to be the adjacent imaging region in that direction. If only one other imaging region is found in a certain direction through determination made according to the above-described procedure, the region is assumed to be the adjacent imaging region in that direction. If plural regions are found, the region of which the gravity center is the nearest to the gravity center of the current imaging region is assumed to be the adjacent imaging region.

The procedure to obtain the imaging region adjacent to a current imaging region has been described above. In the procedure, the point Z used for the determination is the gravity center of another imaging region. However, the point Z may be the view point of another imaging region. Similarly, the distance between the gravity centers of a current imaging region and another imaging region may be the distance between the view points of the current imaging region and another imaging region.

Figure 22D:
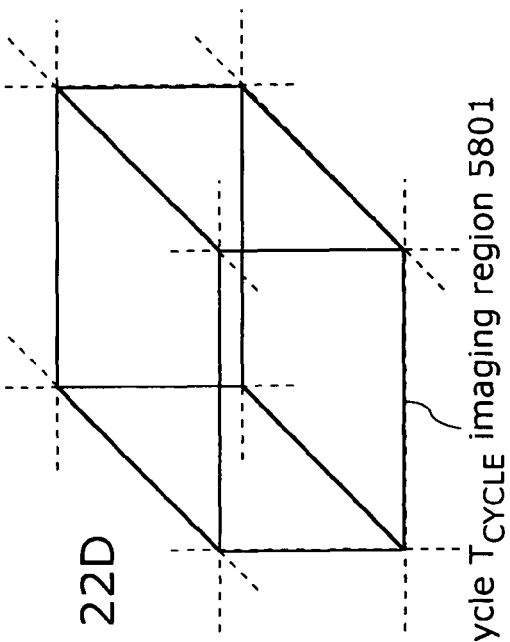
Figure 22C:
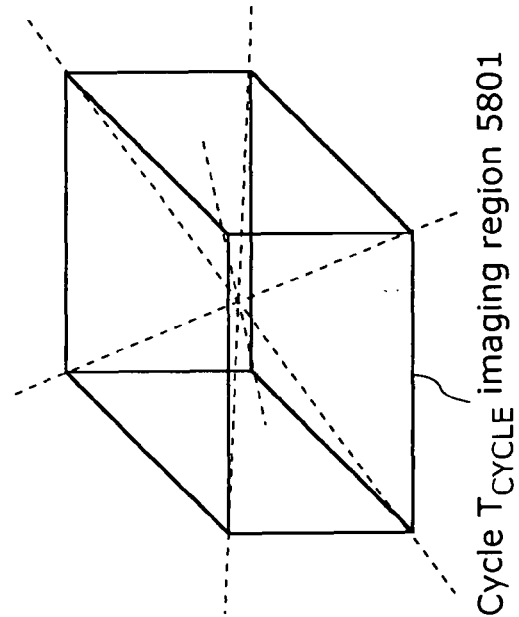
Figure 23:
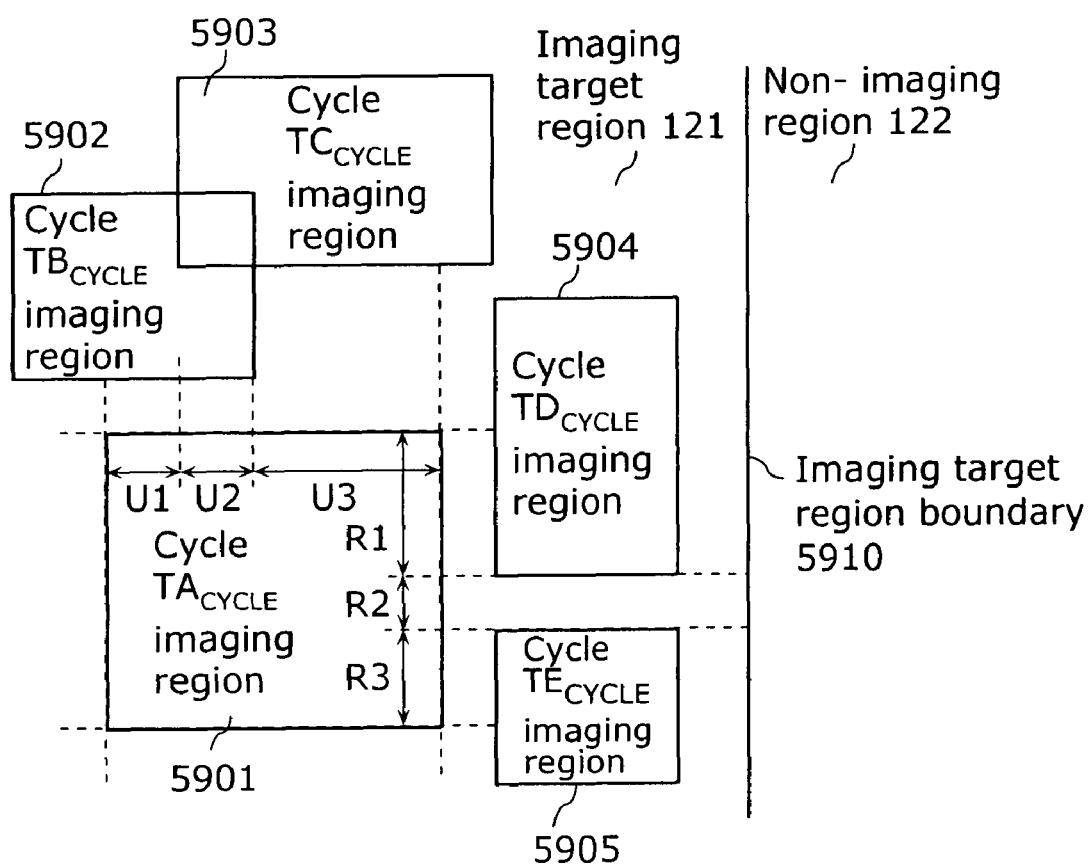
FIG. 23 is a drawing illustrating how to determine an imaging region adjacent to the current imaging region.

In the above-described procedure, as shown in FIG. 22A, the region is divided into top, bottom, right, and left regions so as to obtain the adjacent imaging region in each region. Alternatively, the region can be divided into top, bottom, right, left, top right, top left, bottom right, and bottom left regions by the lines passing through the vertexes of the cycle $T_{CYCLE}$ imaging region 5801 (indicated by the broken lines in FIG. 22) so as to obtain the adjacent imaging region in each region as shown in FIG. 22B. In the above explanation of the procedure, the cycle $T_{CYCLE}$ imaging region 5801 is two-dimensional as shown in FIG. 22A. Needless to say, the adjacent imaging region may be similarly obtained for a three-dimensional cycle $T_{CYCLE}$ imaging region 5801 as shown in FIGS. 22C and 22D.

It has been described in the above-described procedure that adjacent imaging regions are other imaging regions nearest to a current imaging region in each direction such as upward, downward, leftward and rightward. However, it should be noted that determination of the nearest imaging region should be made on a per partial area basis, and each partial area is located near one of the sides of the current imaging region. Furthermore, the most distant other imaging region among other adjacent imaging regions selected for each partial area near one of the sides should be determined as the final adjacent imaging region. This is described below taking examples of the top side and right side of the imaging region 5901. In the top side (upward direction) of the cycle $TA_{CYCLE}$ imaging region 5901, the followings are determined as the adjacent imaging regions: the cycle $TB_{CYCLE}$ imaging region 5902 in the partial area U1; the cycle $TB_{CYCLE}$ imaging region 5902 in the partial area U2; the cycle $TB_{CYCLE}$ imaging region 5902 in the partial area U2 (the cycle $TB_{CYCLE}$ imaging region 5902 is nearer than the cycle $TC_{CYCLE}$ imaging region 5903); and the cycle $TC_{CYCLE}$ imaging region 5903 in the partial area U3. Here, the most distant other imaging region among the respective partial areas U1 to U3 is the cycle $TC_{CYCLE}$ imaging region 5903, and thus the cycle $TC_{CYCLE}$ imaging region 5903 is determined as the final adjacent imaging region. The reason for this is that, when the positions of the top side of the cycle $TA_{CYCLE}$ imaging region 5901 and the bottom side of the cycle $TC_{CYCLE}$ imaging region 5903 are adjusted so as to be overlapped with each other, it is possible to image the image target region 121 without blind spots in relation to the top side of the cycle $TA_{CYCLE}$ imaging region 5901. On the other hand, in the right side (rightward direction) of the cycle $TA_{CYCLE}$ imaging region 5901, the followings are determined as the adjacent imaging regions according to the above-described procedure: the cycle $TD_{CYCLE}$ imaging region 5904 in the partial area R1; the imaging target region 122 in the partial area R2 (The reason for this will be described in detail in the following first embodiment. An imaging target region is selected when there is no adjacent region in the present invention.); the cycle $TE_{CYCLE}$ imaging region 5905 in the partial area R3. Here, the most distant other imaging region among the respective partial areas R1 to R3 is the imaging target region 122, and thus the imaging target region 122 is determined as the final adjacent imaging region. The reason for this is that, when the positions of the right side of the cycle $TA_{CYCLE}$ imaging region 5901 and an imaging target region boundary 5910 are adjusted so as to be overlapped with each other, it is possible to image the image target region 121 without blind spots in relation to the right side of the cycle $TA_{CYCLE}$ imaging region 5901.

The followings have been described up to this point: the imaging region of a camera, the relationship between a detection target and a cycle $T_{CYCLE}$ imaging region, the size of a cycle $T_{CYCLE}$ imaging region of a camera, the field angles and panning and tilting of a camera imaging a cycle $T_{CYCLE}$ imaging region, the position of the imaging region of a camera, the method for imaging a cycle $T_{CYCLE}$ imaging region, the shape of an imaging region, the adjacent imaging regions, and the division of a region. On the premises of these, embodiments of the present invention will be described hereafter with reference to the drawings.

(First Embodiment)

A first embodiment of the present invention is described hereafter with reference to FIGS. 24 to 29. The embodiment relates to an imaging region adjustment device in which the cycle $T_{CYCLE}$ imaging regions of the cameras of the camera terminals are automatically adjusted so that a combined region of the cycle $T_{CYCLE}$ imaging regions of the cameras of the camera terminals completely covers a specific imaging target region.

Figure 24A:
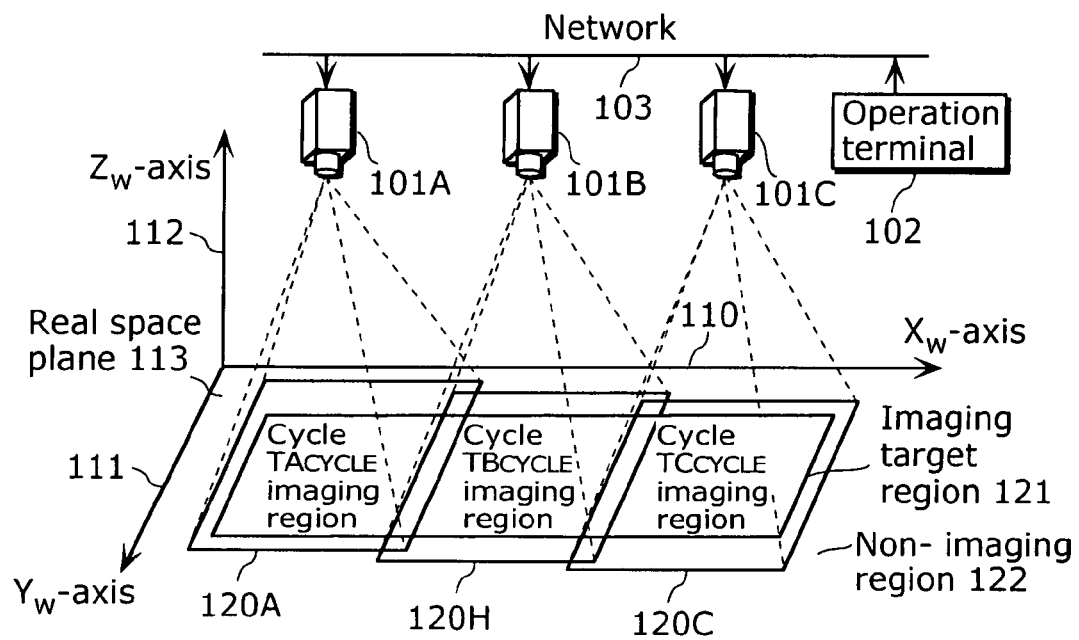
FIG. 24 is a block diagram showing the structure of an imaging region adjustment device in the first embodiment of the present invention.

First, the structural elements of the imaging region adjustment device in this embodiment are described. FIG. 24A is a block diagram showing the structure of the imaging region adjustment device in this the embodiment. The imaging region adjustment device includes camera terminals A101A to C101C, an operation terminal 102, and a network 103 used for communication among the camera terminals 101A to C101C. In FIG. 24, an $X_W$-axis 110, a $Y_W$-axis 111, and a $Z_W$-axis 112, which are orthogonal to each other, are defined for indicating regions and the positions of the regions. The number 113 is a plane in the real space in which the camera terminals 101A to 101C are present; for example, it is a floor surface when the camera terminals 101A to 101C are suspended from the ceiling downward. In the embodiment, a plane where the $Z_W$-axis 112=0 is used. Various types of regions and the positions of the regions are represented based on the plane. On the real space plane 113, a cycle $TA_{CYCLE}$ imaging region A120A is a region that is periodically imaged by the camera terminal 101A in a cycle $TA_{CYCLE}$, a cycle $TB_{CYCLE}$ imaging region B120B is a region that is periodically imaged by the camera terminal 101B in a cycle $TB_{CYCLE}$, a cycle $TC_{CYCLE}$ imaging region C120C is a region that is periodically imaged by the camera terminal 101C in a cycle $TC_{CYCLE}$, an imaging target region 121 is a target region to be imaged in the present invention, and a non-imaging region 122 is a region excluded from the image target region 121.

Figure 24B:
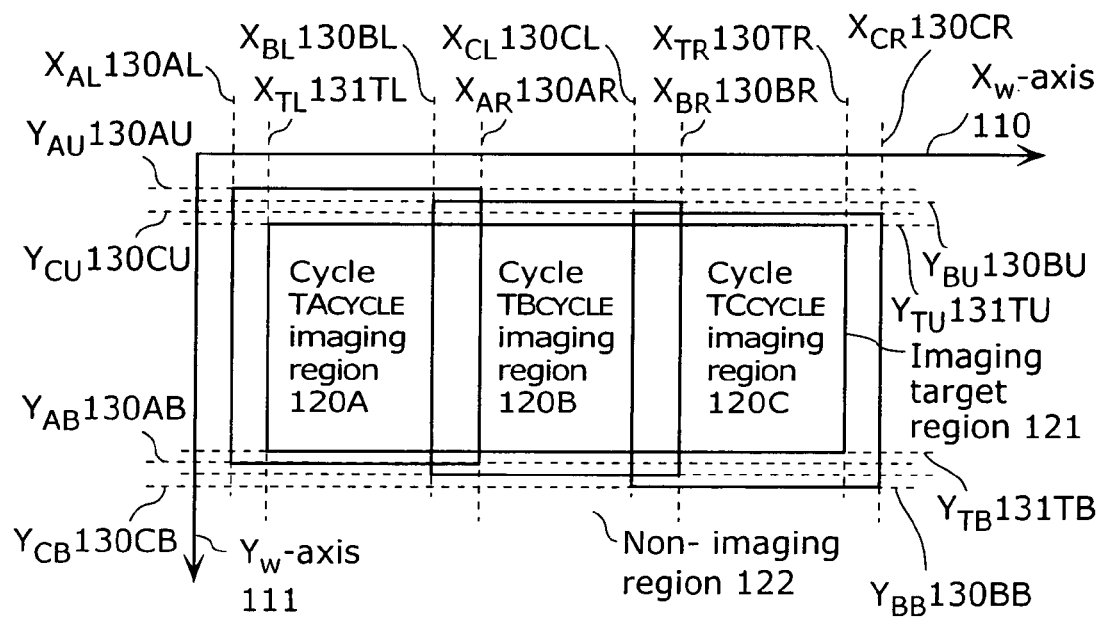

FIG. 24B is an illustration showing the imaging region positions on the real space plane 113 of the imaging region adjustment device in the embodiment shown in FIG. 24A in detail. An $X_W$-axis 110, a $Y_W$-axis 111, a cycle $TA_{CYCLE}$ imaging region 120A, a cycle $TB_{CYCLE}$ imaging region 120B, a cycle $TC_{CYCLE}$ imaging region 120C, an imaging target region 121, and a non-imaging region 122 in FIG. 24B are the same as those in FIG. 24A.

The numbers 130AL, 130AR, 130AU, and 130AB are the left end $X_{AL}$, right end $X_{AR}$, top end $Y_{AU}$, and bottom end $Y_{AB}$ in the position of the cycle $TA_{CYCLE}$ imaging region 120A. In other words, the cycle $TA_{CYCLE}$ imaging region 120A is a region enclosed by $X_{AL}$ 130AL, $X_{AR}$ 130AR, $Y_{AU}$ 130AU, and $Y_{AB}$ 130AB, and the position of the cycle $TA_{CYCLE}$ imaging region 120A is represented using these. The numbers 130BL, 130BR, 130BU, and 130BB are the left end $X_{BL}$, right end $X_{BR}$, top end $Y_{BU}$, and bottom end $Y_{BB}$ in the position of the cycle $TB_{CYCLE}$ imaging region 120B. In other words, the cycle $TB_{CYCLE}$ imaging region 120A is a region enclosed by $X_{BL}$ 130BL, $X_{BR}$ 130BR, $Y_{BU}$ 130BU, and $Y_{BB}$ 130BB, and the position of the cycle $TB_{CYCLE}$ imaging region 120B is represented using these. The numbers 130CL, 130CR, 130CU, and 130CB are the left end $X_{CL}$, right end $X_{CR}$, top end $Y_{CU}$, and bottom end $Y_{CB}$ in the position of the cycle $TC_{CYCLE}$ imaging region 120C. In other words, the cycle $TC_{CYCLE}$ imaging region 120A is a region enclosed by $X_{CL}$ 130CL, $X_{CR}$ 130CR, $Y_{CU}$ 130CU, and $Y_{CB}$ 130CB, and the position of the cycle $TC_{CYCLE}$ imaging region 120C is represented using these. The numbers 131TL, 131TR, 131TU, and 131TB are the left end $X_{TL}$, right end $X_{TR}$, top end $Y_{TU}$, and bottom end $Y_{TB}$ in the position of the imaging target region 121. In other words, the imaging target region 121 is a region enclosed by $X_{TL}$ 131TL, $X_{TR}$ 131TR, $Y_{TU}$ 131TU, and $Y_{TB}$ 131TB, and the non-imaging region 122 is a region other than the region enclosed by $X_{TL}$ 131TL, $X_{TR}$ 131TR, $Y_{TU}$ 131TU, and $Y_{TB}$ 131TB, by which the positions of the imaging target region 121 and non-imaging region 122 are represented.

A region enclosed by $X_{BL}$ 130BL, $X_{AR}$ 130AR, $Y_{BU}$ 130BU, and $Y_{AB}$ 130AB where the cycle $TA_{CYCLE}$ imaging region 120A and cycle $TB_{CYCLE}$ imaging region 120B are overlapped with each other is a region imaged by both of the camera terminals A101A and B101B. The region is referred to as an imaging overlap region AB. The region is referred to as an imaging overlap region AB. The region has a size of $X_{AR}-X_{BL}$ in the $X_W$-axis direction 110. A region enclosed by $X_{CL}$ 130CL, $X_{BR}$ 130BR, $Y_{CU}$ 130CU, and $Y_{BB}$ 130BB where the cycle $TB_{CYCLE}$ imaging region 120B and cycle $TC_{CYCLE}$ imaging region 120C are overlapped with each other is a region imaged by both of the camera terminals B101B and C101C. The region is referred to as an imaging overlap region BC. The region has a size of $X_{BR}-X_{CL}$ in the $X_W$-axis direction 110. A region enclosed by $X_{AL}$ 130AL, $X_{TL}$ 131TL, $Y_{AU}$ 130AU, and $Y_{AB}$ 130AB where the non-imaging region 122 and cycle $TA_{CYCLE}$ imaging region 120A are overlapped with each other is referred to as a non-imaging overlap region AL. The region has a measure of $X_{TL}-X_{AL}$ in the $X_W$-axis direction 110. A region enclosed by $X_{TR}$ 131TR, $X_{CR}$ 130CR, $Y_{CU}$ 130CU, and $Y_{CB}$ 130CB where the non-imaging region 122 and cycle $TC_{CYCLE}$ imaging region 120C are overlapped with each other is referred to as a non-imaging overlap region CR. The region has a size of $X_{CR}-X_{TR}$ in the $X_W$-axis direction 110. A region enclosed by $X_{AL}$ 130AL, $X_{AR}$ 130AR, $Y_{AU}$ 130AU, and $Y_{TU}$ 131TU where the non-imaging region 122 and cycle $TA_{CYCLE}$ imaging region 120A are overlapped with each other is referred to as a non-imaging overlap region AU. The region has a measure of $Y_{TU}-Y_{AU}$ in the $Y_W$-axis direction 111. A region enclosed by $X_{AL}$ 130AL, $X_{AR}$ 130AR, $Y_{TB}$ 131TB, and $Y_{AB}$ 130AB where the non-imaging region 122 and cycle $TA_{CYCLE}$ imaging region 120A are overlapped with each other is referred to as a non-imaging overlap region AB. The region has a measure of $Y_{AB}-Y_{TB}$ in the $Y_W$-axis direction 111. A region enclosed by $X_{BL}$ 130BL, $X_{BR}$ 130BR, $Y_{BU}$ 130BU, and $Y_{TU}$ 131TU where the non-imaging region 122 and cycle $TB_{CYCLE}$ imaging region 120B are overlapped with each other is referred to as a non-imaging overlap region BU. The region has a size of $Y_{TU}-Y_{BU}$ in the $Y_W$-axis direction 111. A region enclosed by $X_{BL}$ 130BL, $X_{BR}$ 130BR, $Y_{TB}$ 131TB, and $Y_{BB}$ 130BB where the non-imaging region 122 and cycle $TB_{CYCLE}$ imaging region 120B are overlapped with each other is referred to as a non-imaging overlap region BB. The region has a size of $Y_{BB}-Y_{TB}$ in the $Y_W$-axis direction 111. A region enclosed by $X_{CL}$ 130CL, $X_{CR}$ 130CR, $Y_{CU}$ 130CU, and $Y_{TU}$ 131TU where the non-imaging region 122 and cycle $TC_{CYCLE}$ imaging region 120C are overlapped with each other is referred to as a non-imaging overlap region CU. The region has a size of $X_{TU}-X_{CU}$ in the $Y_W$-axis direction 111. A region enclosed by $X_{CL}$ 130CL, $X_{CR}$ 130CR, $Y_{TB}$ 131TB, and $Y_{CB}$ 130CB where the non-imaging region 122 and cycle $TC_{CYCLE}$ imaging region 120C are overlapped with each other is referred to as a non-imaging overlap region CB. The region has a size of $X_{CB}-X_{TB}$ in the $Y_W$-axis direction 111.

Figure 25:
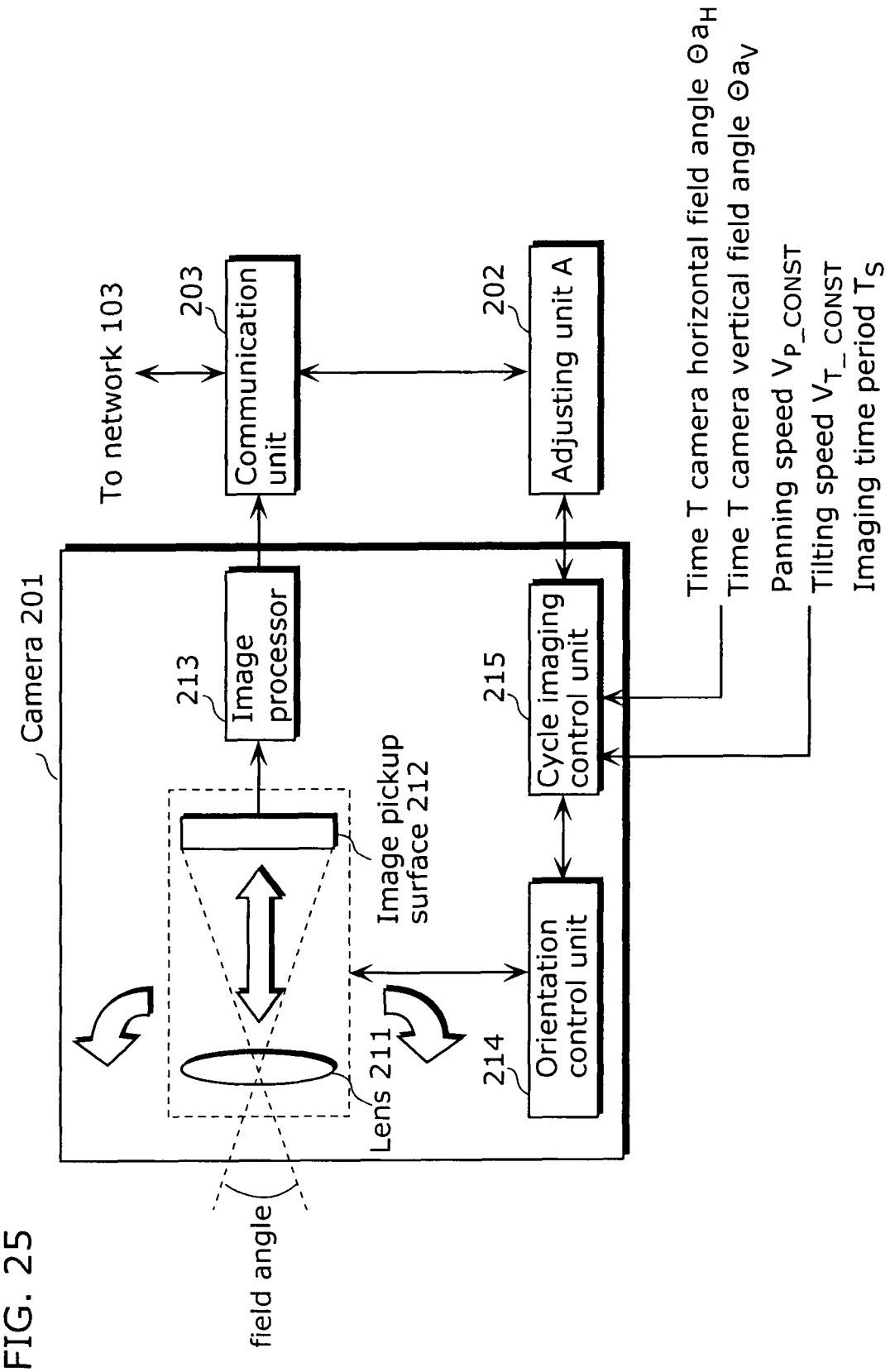
FIG. 25 is a block diagram showing the structure of a camera terminal in the first embodiment of the present invention.

FIG. 25 is a block diagram showing the structure of the camera terminals 101A to 101C in FIG. 24A. The camera terminals 101A to 101C each include a camera 201, an adjusting unit A202 which is a processor to adjust the imaging region position of the camera 201, and a communication unit 203 to transmit the position of an imaging region of the camera 201 via a network 103. The lens 211 is a lens forming images. The image pickup surface 212 is an image pickup surface of a CCD and the like that captures an image formed by the lens 211. The image processor 213 is a processor that processes images captured by the image pickup surface 212. The orientation control unit 214 is a processor that controls the orientation of the lens 211 and image pickup surface 212 and the distance between the lens 211 and image pickup surface 212. The cycle imaging control unit 215 is a processor that sends cyclical orientation control signals to the orientation control unit 214 so that the camera 201 images the cycle $T_{CYCLE}$ imaging region in a cycle $T_{CYCLE}$. The camera 201 is made up of the lens 211, the imaging surface 212, the image processor 213, the orientation control unit 214, and the cycle imaging control unit 215. The orientation control of the lens 211 and image pickup surface 212 conducted by the orientation control unit 214 is control generally called as panning and tilting. The lens 211 and image pickup surface 212 are rotated about a point or an axis in association with each other. The distance control between the lens 211 and image pickup surface 212 conducted by the orientation control unit 214 is control generally called as zooming. The distance between the lens 211 and image pickup surface 212 is increased or decreased to adjust the field angle of the camera 201.

More specifically, the camera 201 is intended for imaging a virtual imaging region obtained while changing the position of an imaging region within a specific region in a specific period of time.

The communication unit 203 is a communication interface to exchange virtual imaging region information indicating the virtual imaging region.

The adjusting unit A202 is a processor to adjust the imaging region position of one's own camera terminal based on the virtual imaging region of one's own camera terminal and the virtual imaging regions of other camera terminals indicated by the virtual imaging region information received by the communication unit 203 so that a combined region of the virtual imaging regions of camera terminals A to C completely covers the imaging target region.

Figure 26:
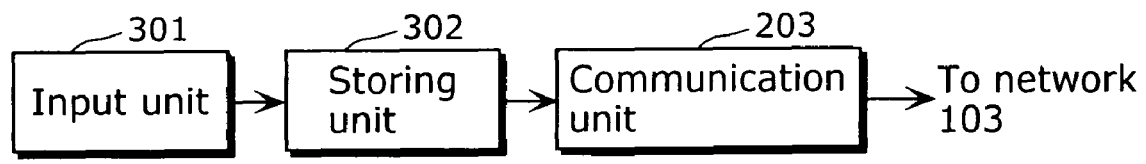
FIG. 26 is a block diagram showing the structure of the operation terminal in the first embodiment of the present invention.

FIG. 26 is a block diagram showing the structure of the operation terminal 102 in FIG. 24B. The operation terminal 102 includes an input unit 301 that receives $X_{TL}$ 131TL, $X_{TR}$ 131TR, $Y_{TU}$ 131TU, and $Y_{TB}$ 131TB or the position of the imaging target region 121, a storing unit 302 that stores the position of the imaging target region 121 received at the input unit 301, and a communication unit 203 that is similar to the communication unit 203 in FIG. 24 and transmits the position of the imaging target region 121 stored in storing unit 302 via a network 103. The input unit 301 is unnecessary when the position of the imaging target region 121 is pre-stored in the storing unit 302.

Next, operation of the imaging region adjustment device of in this embodiment is described. The camera 201 which is a structural element of the camera terminals 101A to 101C has an internal structure shown in FIG. 25. In the camera 201, an image formed by the lens 211 is converted to image signals at the image pickup surface 212. The image processor 213 detects a detection target and extracts information about the detection target from the image signals through a conventional image processing or image recognition technique. Thus, the camera 201 detects a detection target and extracts the information within the detecting region including one's own time T imaging region determined by the orientation of the lens 211 and image pickup surface 212 and the distance between them in the real space. The conventional image processing or image recognition techniques described above include well-known background subtraction and dynamic subtraction. The camera 201 images a cycle $T_{CYCLE}$ imaging region as a cycle $T_{CYCLE}$ using the cycle imaging control unit 215, which is described later. Therefore, the camera 201 detects a detection target and extracts the information within the detecting region including one's own cycle $T_{CYCLE}$ imaging region determined by the cycle imaging control unit 215 in the real space. The information of a detected detection target is sent to the communication unit 203.

Further, the orientation control unit 214 of the camera 201 controls the orientation of the lens 211 and image pickup surface 212 or the distance between the lens 211 and image pickup surface 212 so that the time T imaging region position of the camera 201 is moved to a time T imaging region position based on orientation control signals specified by the cycle imaging control unit 215. The orientation control unit 214 obtains positional information of the time T imaging region of the camera 201 determined by the orientation of the lens 211 and image pickup surface 212 or the distance between them at a time T and sends it to the cycle imaging control unit 215. Thus, the position of the time T imaging region of the camera 201 is controlled by the cycle imaging control unit 215 and the positional information of the time T imaging region of the camera 201 at a time T is sent to the cycle imaging control unit 215. The calculation method of the position of the time T imaging region of the camera 201 determined by the orientation of the lens 211 and image pickup surface 212 or the distance at a time T has been described above for the imaging region position of a camera. The orientation of the lens 211 and image pickup surface 212 and the distance can be changed using a stepping motor and the like, and the orientation and distance at a time T can be read out.

The cycle imaging control unit 215 sends orientation control signals such as the panning speed $V_P$ and tilting speed $V_T$ to the orientation control unit 214 based on the time T imaging region positional information sent from the orientation control unit 214 and a cycle $T_{CYCLE}$ camera panning angle $\Theta b_P$, cycle $T_{CYCLE}$ camera tilting angle $\Theta b_T$, a cycle $T_{CYCLE}$ camera horizontal field angle $\Theta b_H$ and a cycle $T_{CYCLE}$ camera vertical field angle $\Theta b_V$ specified by the adjusting unit A202 according to the above-described imaging method for imaging a cycle $T_{CYCLE}$ imaging region, so that the time T imaging region position of the camera 201 is controlled and the camera 201 operates as a cycle $T_{CYCLE}$ camera imaging the cycle $T_{CYCLE}$ imaging region. As described as the imaging method of a cycle $T_{CYCLE}$ imaging region, in order to image the cycle $T_{CYCLE}$ imaging region, the cycle $T_{CYCLE}$ camera panning angle $\Theta b_P$, cycle $T_{CYCLE}$ camera tilting angle $\Theta b_T$, a cycle $T_{CYCLE}$ camera horizontal field angle $\Theta b_H$ and a cycle $T_{CYCLE}$ camera vertical field angle $\Theta b_V$ specified by the adjusting unit A202 are required, and a time T camera horizontal filed angle $\Theta a_H$ and time T camera vertical field angle $\Theta a_V$ necessary for the calculation of the position of a time T imaging region, panning speed $V_{P\_CONST}$, tilting speed $V_{T\_CONST}$, and imaging interval $T_S$ are also required. It is assumed in the embodiment that the values are predetermined fixed values recorded in, for example, a storing unit, and sent to the cycle imaging control unit 215. Alternatively, the values can be specified through the operation terminal 102. The cycle imaging control unit 215 sends the positional information of the cycle $T_{CYCLE}$ imaging region of the camera 201 to the adjusting unit A202. The calculation method of a cycle $T_{CYCLE}$ imaging region position has been described above in the explanation of the imaging region position of a camera.

The adjusting unit A202 periodically sends the positional information of the cycle $T_{CYCLE}$ imaging region of the camera 201 sent from the cycle imaging control unit 215 to the adjusting unit A202 of the other camera terminals via the communication unit 203 and network 103. Further, the adjusting unit A202 receives the positional information of the cycle $T_{CYCLE}$ imaging region of the camera 201 of the other camera terminals that is periodically sent from the adjusting unit A202 of the other camera terminals. Further, the communication unit 203 of the operation terminal 102 periodically sends the positional information of the imaging target region 121 to the adjusting unit A202 of the camera terminals 101A to 101C via the network 103.

Therefore, the adjusting unit A202 of the camera terminals 101A to 101C periodically obtains the positional information of the cycle $T_{CYCLE}$ imaging region of one's own camera terminal and other camera terminals and the positional information of the imaging target region 121. In the embodiment, each adjusting unit A202 periodically obtains the following via the communication unit 203 and network 103: $X_{AL}$ 130AL, $X_{AR}$ 130AR, $Y_{AU}$ 130AU, and $Y_{AB}$ 130AB indicating the position of the cycle $TA_{CYCLE}$ imaging region 120A of the camera terminal 10A, $X_{BL}$ 130BL, $X_{BR}$ 130BR, $Y_{BU}$ 130BU, and $Y_{BB}$ 130BB indicating the position of the cycle $TB_{CYCLE}$ imaging region 120B of the camera terminal 101B, $X_{CL}$ 130CL, $X_{CR}$ 130CR, $Y_{CU}$ 130CU, and $Y_{CB}$ 130CB indicating the position of the cycle $TC_{CYCLE}$ imaging region 120C of the camera terminal 101C, and $X_{TL}$ 131TL, $X_{TR}$ 131TR, $Y_{TU}$ 131TU, and $Y_{TB}$ 131TB or the position of the imaging target region 121.

Further, the adjusting unit A202 executes the processing of the steps below and shown in FIG. 27 based on the obtained information of the positions of the cycle $T_{CYCLE}$ imaging regions and imaging target region 121 (the information also of the positional information of the non-imaging region 122).

First, in Step 401, the cycle $T_{CYCLE}$ imaging region of other camera terminals adjacent to the cycle $T_{CYCLE}$ imaging region of one's own camera terminal or the non-imaging region 122 is selected based on the positional information of the cycle $T_{CYCLE}$ imaging regions of the cameras 201 of one's own camera terminal and other camera terminals. The method for selecting the cycle $T_{CYCLE}$ imaging region of the other camera terminals adjacent to the cycle $T_{CYCLE}$ imaging region of one's own camera terminal has been described above in the explanation of the adjacent imaging region. In the case where no adjacent imaging region is found in the selection method described in the explanation of the adjacent imaging region, the non-imaging region 122 is selected as the adjacent imaging region. Therefore, the camera terminal A101A has: the non-imaging region 122 as leftward, upward and downward adjacent imaging regions; and the cycle $TB_{CYCLE}$ imaging region 120B as a rightward adjacent imaging region. The camera terminal B101B has: the cycle $TA_{CYCLE}$ imaging region 120A as a leftward adjacent imaging region; the non-imaging region 122 as upward and downward adjacent imaging regions; and the cycle $TC_{CYCLE}$ imaging region 120C as a rightward adjacent imaging region. The camera terminal C101C has: the cycle $TB_{CYCLE}$ imaging region 120B as a leftward adjacent imaging region; and the non-imaging region 122 as upward, downward and rightward adjacent imaging regions.

Subsequently, in Step 402, the amount indicating the size of the overlap region where the imaging region selected in Step 401 and the imaging region of one's own camera terminal overlap is calculated. This is easily calculated based on a size relationship between the positions of the selected imaging region and the imaging region of one's own camera terminal, as shown in FIG. 24B. Therefore, the followings are calculated for the camera terminal A101A: an amount of $X_{TL}-X_{AL}$ indicating the size of the non-imaging overlap region AL which is the leftward overlap region, an amount of $X_{AR}-X_{BL}$ indicating the size of the imaging overlap region AB which is the rightward overlap region, an amount of $Y_{TU}-Y_{AU}$ indicating the size of the non-imaging overlap region AU which is the upward overlap region, and an amount of $Y_{AB}-Y_{TB}$ indicating the size of the non-imaging overlap region AB which is the downward overlap region. The followings are calculated for the camera terminal B101B: an amount of $X_{AR}-X_{BL}$ indicating the size of the imaging overlap region AB which is the leftward overlap region, an amount of $X_{BR}-X_{CL}$ indicating the size of the imaging overlap region BC which is the rightward overlap region, an amount of $Y_{TU}-Y_{BU}$ indicating the size of the non-imaging overlap region BU which is the upward overlap region, and an amount of $Y_{BB}-Y_{TB}$ indicating the size of the non-imaging overlap region BB which is the downward overlap region. The followings are calculated for the camera terminal C101C: an amount of $X_{BR}-X_{CL}$ indicating the size of the imaging overlap region BC which is the leftward overlap region, an amount of $X_{CR}-X_{TR}$ indicating the size of the non-imaging overlap region CR which is the rightward overlap region, an amount of $Y_{TU}-Y_{CU}$ indicating the size of the non-imaging overlap region CR which is the upward overlap region, and an amount of $Y_{CB}-Y_{TB}$ indicating the size of the non-imaging overlap region CB which is the downward overlap region.

Next, in Step 403, the imaging region position of one's own camera terminal is adjusted so that the amounts indicating the sizes of the overlap regions calculated in Step 402 becomes close to a fixed amount $C_{OVERLAP}$. The adjustment method is described below. First, a function FA ( ) yielding an amount indicating the difference between the amount indicating the size of an overlap region and a fixed amount $C_{OVERLAP}$ equal to or greater than 0 is selected. In the embodiment, this function is represented as the Expressions 33 to 35.

[Math 33]

$$FA_{AL}(X_{AL}) = (X_{TL} - X_{AL} - C_{OVERLAP})^2 \\ FA_{AR}(X_{AR}) = (X_{AR} - X_{BL} - C_{OVERLAP})^2 \\ FA_{AU}(Y_{AU}) = (Y_{TU} - Y_{AU} - C_{OVERLAP})^2 \\ FA_{AB}(Y_{AB}) = (Y_{AB} - Y_{TB} - C_{OVERLAP})^2$$ (Expression 33)

[Math 34]

$$FA_{BL}(X_{BL}) = (X_{AR} - X_{BL} - C_{OVERLAP})^2 \\ FA_{BR}(X_{BR}) = (X_{BR} - X_{CL} - C_{OVERLAP})^2 \\ FA_{BU}(Y_{BU}) = (Y_{TU} - Y_{BU} - C_{OVERLAP})^2 \\ FA_{BB}(Y_{BB}) = (Y_{BB} - Y_{TB} - C_{OVERLAP})^2$$ (Expression 34)

[Math 35]

$$FA_{CL}(X_{CL}) = (X_{BR} - X_{CL} - C_{OVERLAP})^2 \\ FA_{CR}(X_{CR}) = (X_{CR} - X_{TR} - C_{OVERLAP})^2 \\ FA_{CU}(Y_{CU}) = (Y_{TU} - Y_{CU} - C_{OVERLAP})^2 \\ FA_{CB}(Y_{CB}) = (Y_{CB} - Y_{TB} - C_{OVERLAP})^2$$ (Expression 35)

The respective Expressions 33 to 35 correspond to the camera terminals A101A to C101C where each difference between the amount indicating the size of an overlap region and a fixed amount C is raised to the second power to yield an amount indicating the individual difference. Subsequently, the position of the next imaging region of one's own camera terminal is calculated by the generally known steepest descent method as indicated by the Expressions 36 to 38.

[Math 36]

$$X'_{AL} = X_{AL} - \alpha \frac{\partial FA_{AL}(X_{AL})}{\partial X_{AL}} \\ X'_{AR} = X_{AR} - \alpha \frac{\partial FA_{AR}(X_{AR})}{\partial X_{AR}} \\ Y'_{AU} = Y_{AU} - \alpha \frac{\partial FA_{AU}(Y_{AU})}{\partial Y_{AU}} \\ Y'_{AB} = Y_{AB} - \alpha \frac{\partial FA_{AB}(Y_{AB})}{\partial Y_{AB}}$$ (Expression 36)

[Math 37]

$$X'_{BL} = X_{BL} - \alpha \frac{\partial FA_{BL}(X_{BL})}{\partial X_{BL}} \\ X'_{BR} = X_{BR} - \alpha \frac{\partial FA_{BR}(X_{BR})}{\partial X_{BR}} \\ Y'_{BU} = Y_{BU} - \alpha \frac{\partial FA_{BU}(Y_{BU})}{\partial Y_{BU}} \\ Y'_{BB} = Y_{BB} - \alpha \frac{\partial FA_{BB}(Y_{BB})}{\partial Y_{BB}}$$ (Expression 37)

[Math 38]

$$X'_{CL} = X_{CL} - \alpha \frac{\partial FA_{CL}(X_{CL})}{\partial X_{CL}} \\ X'_{CR} = X_{CR} - \alpha \frac{\partial FA_{CR}(X_{CR})}{\partial X_{CR}} \\ Y'_{CU} = Y_{CU} - \alpha \frac{\partial FA_{CU}(Y_{CU})}{\partial Y_{CU}} \\ Y'_{CB} = Y_{CB} - \alpha \frac{\partial FA_{CB}(Y_{CB})}{\partial Y_{CB}}$$ (Expression 38)

In the Expressions 36 to 38, $X'_{AL}$, $X'_{AR}$, $Y'_{AU}$, $Y'_{AB}$, $X'_{BL}$, $X'_{BR}$, $Y'_{BU}$, $Y'_{BB}$, $X'_{CL}$, $X'_{CR}$, $Y'_{CU}$, $Y'_{CB}$ respectively show the positions of the next cycle $T_{CYCLE}$ imaging region of the camera terminals and $\alpha$ is a constant.

Finally, the positions of the cycle $T_{CYCLE}$ imaging regions of the camera terminals A101A to C101C are adjusted to the cycle $T_{CYCLE}$ imaging region positions. In the method, $X_{AL}$ 130AL, $X_{AR}$ 130AR, $X_{AU}$ 130AU, and $X_{AB}$ 130AB indicating the position of the cycle $TA_{CYCLE}$ imaging region 120A of the camera terminal A101A need to be adjusted independently. The same is applied to the camera terminals B101B and C101C. In the case where they cannot be adjusted independently, a function that linearly adds the function FA of the items that cannot be adjusted independently is defined, and this function may be subjected to the steepest descent method. For example, it is possible to perform adjustment similar to the above-described adjustment in the camera 201 of the embodiment assuming that a function G ( ) is represented by the Expression 39 to 41 and using the following Expressions 42 to 44 according to the steepest decent path. In the Expressions, $\Theta b_{PA}$ and $\Theta b_{TA}$, $\Theta b_{PB}$ and $\Theta b_{TB}$, and $\Theta b_{PC}$ and $\Theta b_{TC}$ are the cycle $T_{CYCLE}$ camera panning and tilting angles of the camera terminals A101A to C101C, respectively, and $\Theta b_{HA}$ and $\Theta b_{VA}$, $\Theta b_{HB}$ and $\Theta b_{VB}$, and $\Theta b_{HC}$ and $\Theta b_{VC}$ are the cycle $T_{CYCLE}$ camera horizontal and vertical field angles of the camera terminals A101A to C101C, respectively.

[Math 39]

$$\left.\begin{array}{l}FA_A(X_{AL}, X_{AR}, Y_{AU}, Y_{AB}) = FA_{AL}(X_{AL}) + FA_{AR}(X_{AR}) + \\ \qquad\qquad FA_{AU}(Y_{AU}) + FA_{AB}(Y_{AB}) \\ X_{AL} = G_{AL}(\theta b_{PA}, \theta b_{TA}, \theta b_{HA}, \theta b_{VA}) \\ X_{,AR} = G_{AR}(\theta b_{PA}, \theta b_{TA}, \theta b_{HA}, \theta b_{VA}) \\ Y_{AU} = G_{AU}(\theta b_{PA}, \theta b_{TA}, \theta b_{HA}, \theta b_{VA}) \\ Y_{AB} = G_{AB}(\theta b_{PA}, \theta b_{TA}, \theta b_{HA}, \theta b_{VA}) \\ FA_A(X_{AL}, X_{AR}, Y_{AU}, Y_{AB}) = FA_A(\theta b_{PA}, \theta b_{TA}, \theta b_{HA}, \theta b_{VA}) = \\ (X_{TL} - G_{AL}(\theta b_{PA}, \theta b_{TA}, \theta b_{HA}, \theta b_{VA}) - C_{OVERLAP})^2 + \\ (G_{AR}(\theta b_{PA}, \theta b_{TA}, \theta b_{HA}, \theta b_{VA}) - X_{BL} - C_{OVERLAP})^2 + \\ (Y_{TU} - G_{AU}(\theta b_{PA}, \theta b_{TA}, \theta b_{HA}, \theta b_{VA}) - C_{OVERLAP})^2 + \\ (G_{AB}(\theta b_{PA}, \theta b_{TA}, \theta b_{HA}, \theta b_{VA}) - Y_{TB} - C_{OVERLAP})^2 \end{array}\right\} \quad \text{(Expression 39)}$$

[Math 40]

$$\left.\begin{array}{l}FA_B(X_{BL}, X_{BR}, Y_{BU}, Y_{BB}) = FA_{BL}(X_{BL}) + FA_{BR}(X_{BR}) + \\ \qquad\qquad FA_{BU}(Y_{BU}) + FA_{BB}(Y_{BB}) \\ X_{BL} = G_{BL}(\theta b_{PB}, \theta b_{TB}, \theta b_{HB}, \theta b_{VB}) \\ X_{BR} = G_{BR}(\theta b_{PB}, \theta b_{TB}, \theta b_{HB}, \theta b_{VB}) \\ Y_{BU} = G_{BU}(\theta b_{PB}, \theta b_{TB}, \theta b_{HB}, \theta b_{VB}) \\ Y_{BB} = G_{BB}(\theta b_{PB}, \theta b_{TB}, \theta b_{HB}, \theta b_{VB}) \\ FA_B(X_{BL}, X_{BR}, Y_{BU}, Y_{BB}) = FA_B(\theta b_{PB}, \theta b_{TB}, \theta b_{HB}, \theta b_{VB}) = \\ (X_{AR} - G_{BL}(\theta b_{PB}, \theta b_{TB}, \theta b_{HB}, \theta b_{VB}) - C_{OVERLAP})^2 + \\ (G_{BR}(\theta b_{PB}, \theta b_{TB}, \theta b_{HB}, \theta b_{VB}) - X_{CL} - C_{OVERLAP})^2 + \\ (Y_{TU} - G_{BU}(\theta b_{PB}, \theta b_{TB}, \theta b_{HB}, \theta b_{VB}) - C_{OVERLAP})^2 + \\ (G_{BB}(\theta b_{PB}, \theta b_{TB}, \theta b_{HB}, \theta b_{VB}) - Y_{TB} - C_{OVERLAP})^2 \end{array}\right\} \quad \text{(Expression 40)}$$

[Math 41]

$$\left.\begin{array}{l}FA_C(X_{CL}, X_{CR}, Y_{CU}, Y_{CB}) = FA_{CL}(X_{CL}) + FA_{CR}(X_{CR}) + \\ \qquad\qquad FA_{CU}(Y_{CU}) + FA_{CB}(Y_{CB}) \\ X_{CL} = G_{CL}(\theta b_{PC}, \theta b_{TC}, \theta b_{HC}, \theta b_{VC}) \\ X_{CR} = G_{CR}(\theta b_{PC}, \theta b_{TC}, \theta b_{HC}, \theta b_{VC}) \\ Y_{CU} = G_{CU}(\theta b_{PC}, \theta b_{TC}, \theta b_{HC}, \theta b_{VC}) \\ Y_{CB} = G_{CB}(\theta b_{PC}, \theta b_{TC}, \theta b_{HC}, \theta b_{VC}) \\ FA_C(X_{CL}, X_{CR}, Y_{CU}, Y_{CB}) = FA_C(\theta b_{PC}, \theta b_{TC}, \theta b_{HC}, \theta b_{VC}) = \\ (X_{BR} - G_{CL}(\theta b_{PC}, \theta b_{TC}, \theta b_{HC}, \theta b_{VC}) - C_{OVERLAP})^2 + \\ (G_{CR}(\theta b_{PC}, \theta b_{TC}, \theta b_{HC}, \theta b_{VC}) - X_{TR} - C_{OVERLAP})^2 + \\ (Y_{TU} - G_{CU}(\theta b_{PC}, \theta b_{TC}, \theta b_{HC}, \theta b_{VC}) - C_{OVERLAP})^2 + \\ (G_{CB}(\theta b_{PC}, \theta b_{TC}, \theta b_{HC}, \theta b_{VC}) - Y_{TB} - C_{OVERLAP})^2 \end{array}\right\} \quad \text{(Expression 41)}$$

[Math 42]

$$\left.\begin{array}{l}\theta b'_{PA} = \theta b_{PA} - \alpha \dfrac{\partial FA_A(\theta b_{PA}, \theta b_{TA}, \theta b_{HA}, \theta b_{VA})}{\partial \theta b_{PA}} \\ \theta b'_{TA} = \theta b_{TA} - \alpha \dfrac{\partial FA_A(\theta b_{PA}, \theta b_{TA}, \theta b_{HA}, \theta b_{VA})}{\partial \theta b_{TA}} \\ \theta b'_{HA} = \theta b_{HA} - \alpha \dfrac{\partial FA_A(\theta b_{PA}, \theta b_{TA}, \theta b_{HA}, \theta b_{VA})}{\partial \theta b_{HA}} \\ \theta b'_{VA} = \theta b_{VA} - \alpha \dfrac{\partial FA_A(\theta b_{PA}, \theta b_{TA}, \theta b_{HA}, \theta b_{VA})}{\partial \theta b_{VA}} \end{array}\right\} \quad \text{(Expression 42)}$$

-continued

[Math 43]

$$\begin{aligned}
\theta b'_{PB} &= \theta b_{PB} - \alpha \frac{\partial FA_B(\theta b_{PB}, \theta b_{TB}, \theta b_{HB}, \theta b_{VB})}{\partial \theta b_{PA}} \\
\theta b'_{TB} &= \theta b_{TB} - \alpha \frac{\partial FA_B(\theta b_{PB}, \theta b_{TB}, \theta b_{HB}, \theta b_{VB})}{\partial \theta b_{TB}} \\
\theta b'_{HB} &= \theta b_{HB} - \alpha \frac{\partial FA_B(\theta b_{PB}, \theta b_{TB}, \theta b_{HB}, \theta b_{VB})}{\partial \theta b_{HA}} \\
\theta b'_{VB} &= \theta b_{VB} - \alpha \frac{\partial FA_B(\theta b_{PB}, \theta b_{TB}, \theta b_{HB}, \theta b_{VB})}{\partial \theta b_{VB}}
\end{aligned}$$

(Expression 43)

[Math 44]

$$\begin{aligned}
\theta b'_{PC} &= \theta b_{PC} - \alpha \frac{\partial FA_C(\theta b_{PC}, \theta b_{TC}, \theta b_{HC}, \theta b_{VC})}{\partial \theta b_{PC}} \\
\theta b'_{TC} &= \theta b_{TC} - \alpha \frac{\partial FA_C(\theta b_{PC}, \theta b_{TC}, \theta b_{HC}, \theta b_{VC})}{\partial \theta b_{TC}} \\
\theta b'_{HC} &= \theta b_{HC} - \alpha \frac{\partial FA_C(\theta b_{PC}, \theta b_{TC}, \theta b_{HC}, \theta b_{VC})}{\partial \theta b_{HC}} \\
\theta b'_{VC} &= \theta b_{VC} - \alpha \frac{\partial FA_C(\theta b_{PC}, \theta b_{TC}, \theta b_{HC}, \theta b_{VC})}{\partial \theta b_{VC}}
\end{aligned}$$

(Expression 44)

The adjusting unit A202 executes the processing of Steps 401, 402, and 403 in sequence and returns to the processing of Step 401 after completing the procedure of Step 403. The adjusting unit A202 constantly repeats the processing of Steps 401 to 403, and sends, to the cycle imaging control unit 215, the following updated values calculated using the above Expressions: the cycle $T_{CYCLE}$ camera panning angle $\Theta b'_{PA}$ (or $\Theta b'_{PB}$ or $\Theta b'_{PC}$), cycle $T_{CYCLE}$ camera tilting angle $\Theta b'_{TA}$ (or $\Theta b'_{TB}$ or $\Theta b'_{TC}$), cycle $T_{CYCLE}$ camera horizontal field angle $\Theta b'_{HA}$ (or $\Theta b'_{HB}$ or $\Theta b'_{HC}$), and cycle $T_{CYCLE}$ camera vertical field angle $\Theta b'_{VA}$ (or $\Theta b'_{VB}$ or $\Theta b'_{VC}$), so that the position of the cycle $T_{CYCLE}$ imaging region of the camera 201 is adjusted.

The operation of the imaging region adjustment device in this embodiment is as described above. In Step 403, the position of the next cycle $T_{CYCLE}$ imaging region of one's own camera terminal is calculated using the Expressions according to the steepest descent method in which the amount indicating the size of the overlap region becomes close to a fixed amount $C_{OVERLAP}$ equal to or greater than 0, and thus the position of the cycle $T_{CYCLE}$ imaging region of the camera 201 is adjusted to the next cycle $T_{CYCLE}$ imaging region position. Therefore, through the processing of Steps 401 to 403 being repeated, the cycle $TA_{CYCLE}$ imaging region 120A, cycle $TB_{CYCLE}$ imaging region 120B, and cycle $TC_{CYCLE}$ imaging region 120C, or the cycle $T_{CYCLE}$ imaging regions of the camera terminals 101A to 101C is overlapped with the non-imaging region 122 by a fixed amount $C_{OVERLAP}$ equal to or greater than 0. As shown in FIG. 24, when the cycle $T_{CYCLE}$ imaging regions of the camera terminals and the non-imaging region 122 overlap by a fixed amount $C_{OVERLAP}$ equal to or greater than 0, the imaging target region 121 is contained in a combined region of the cycle $T_{CYCLE}$ imaging regions of the camera terminals. Hence, the imaging region adjustment device of the present invention allows the camera terminals 101A to 101C to image the imaging target region 121 without blind spots.

With the adjusting unit A202 repeating the processing of Steps 401 to 403, the advantage that the imaging target region 121 is imaged without blind spots is obtained. The processing of Steps 402 and 403 are repeatedly executed on the cycle $T_{CYCLE}$ imaging regions of other cameras adjacent to the $T_{CYCLE}$ imaging region of one's own camera terminal selected in Step 401 and on the non-imaging region 122.

Therefore, even if any change occurs in the position of the cycle $T_{CYCLE}$ imaging region of another camera adjacent to the $T_{CYCLE}$ imaging region of one's own camera terminal or in the position of the non-imaging region 122 (the position is also the position of the imaging target region 121) at each time point, the advantage that the imaging target region 121 is imaged without blind spots can be obtained in accordance with the change. The position of the cycle $T_{CYCLE}$ imaging region or imaging target region 121 may be changed when:

(1) the cycle $T_{CYCLE}$ imaging region of a camera terminal is intentionally changed;
(2) an additional camera terminal is installed;
(3) some of the camera terminals are removed or become unserviceable; or
(4) the imaging target region position sent from the operation terminal is changed.

Even if the cycle $T_{CYCLE}$ imaging region position sent from each camera terminal or the imaging target region position sent from the operation terminal is changed or not sent, or a new cycle $T_{CYCLE}$ imaging region position is sent due to the changes, the imaging region adjustment device of the present invention allows the camera terminals to image the imaging target region without blind spots in accordance with changes in the cycle $T_{CYCLE}$ imaging region position or imaging target region position.

Figure 28:
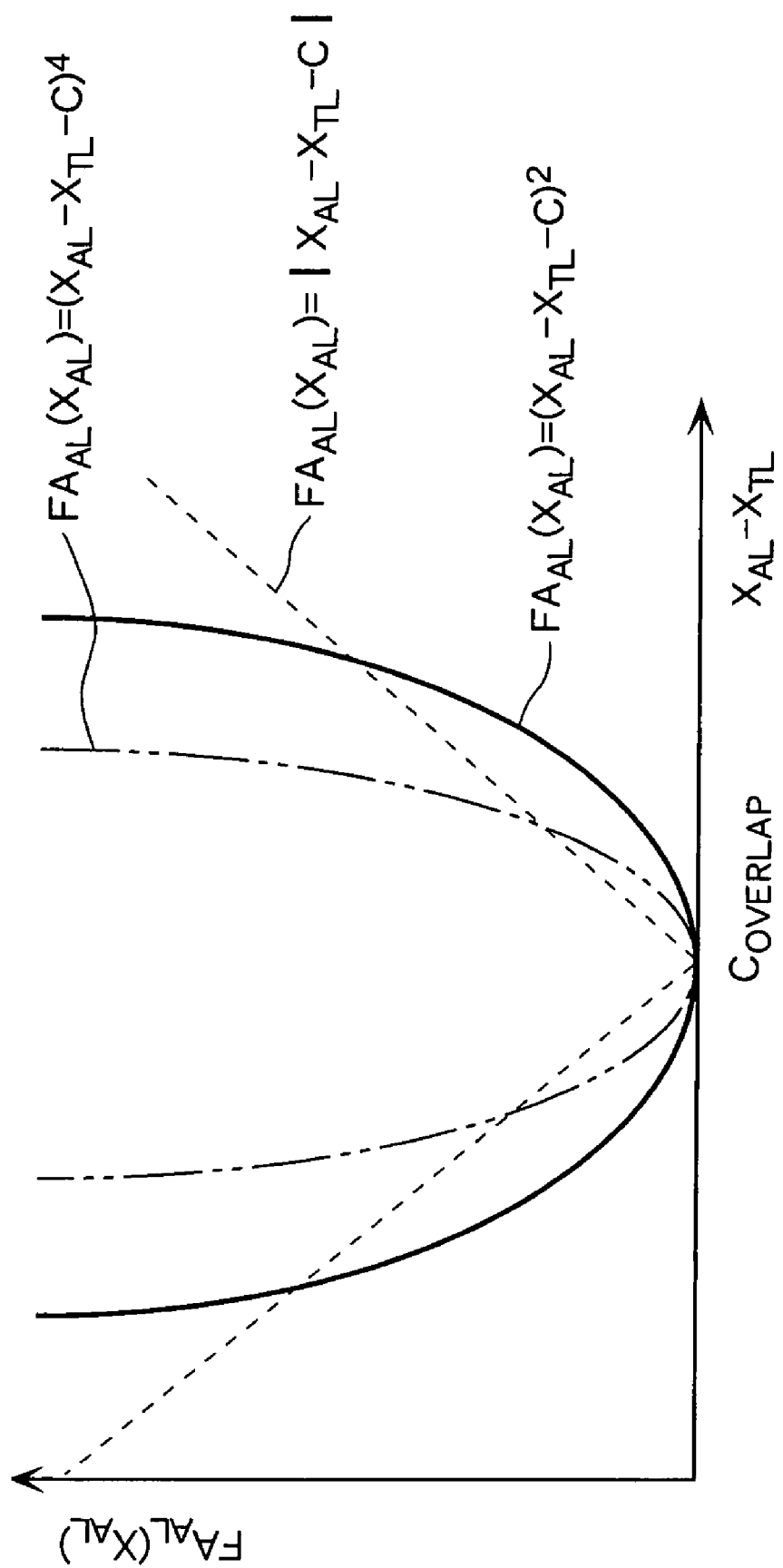
FIG. 28 is a drawing illustrating a function FA ( ) in the first embodiment of the present invention.

In the embodiment, the function FA ( ) representing the difference between an amount indicating the size of the overlap region and a fixed amount $C_{OVERLAP}$ equal to or greater than 0 is a function raising the difference between an amount indicating the size of the overlap region and a fixed amount $C_{OVERLAP}$ to the second power as indicated by the Expressions 33 to 35. However, as shown in FIG. 28, the function FA ( ) can be a function raising the difference between an amount indicating the size of the overlap region and a fixed amount $C_{OVERLAP}$ to an even-numbered power values such as the fourth, sixth, and tenth power values or a function yielding the absolute value of the difference between an amount indicating the size of the overlap region and a fixed amount $C_{OVERLAP}$. The functions have the minimum values when $X_{AL} - X_{TL} = C_{OVERLAP}$ and an amount indicating the size of the overlap region becomes close to a fixed amount $C_{OVERLAP}$ in the steepest descent method in Step 403. Therefore, the same advantage can be obviously obtained.

Figure 29:
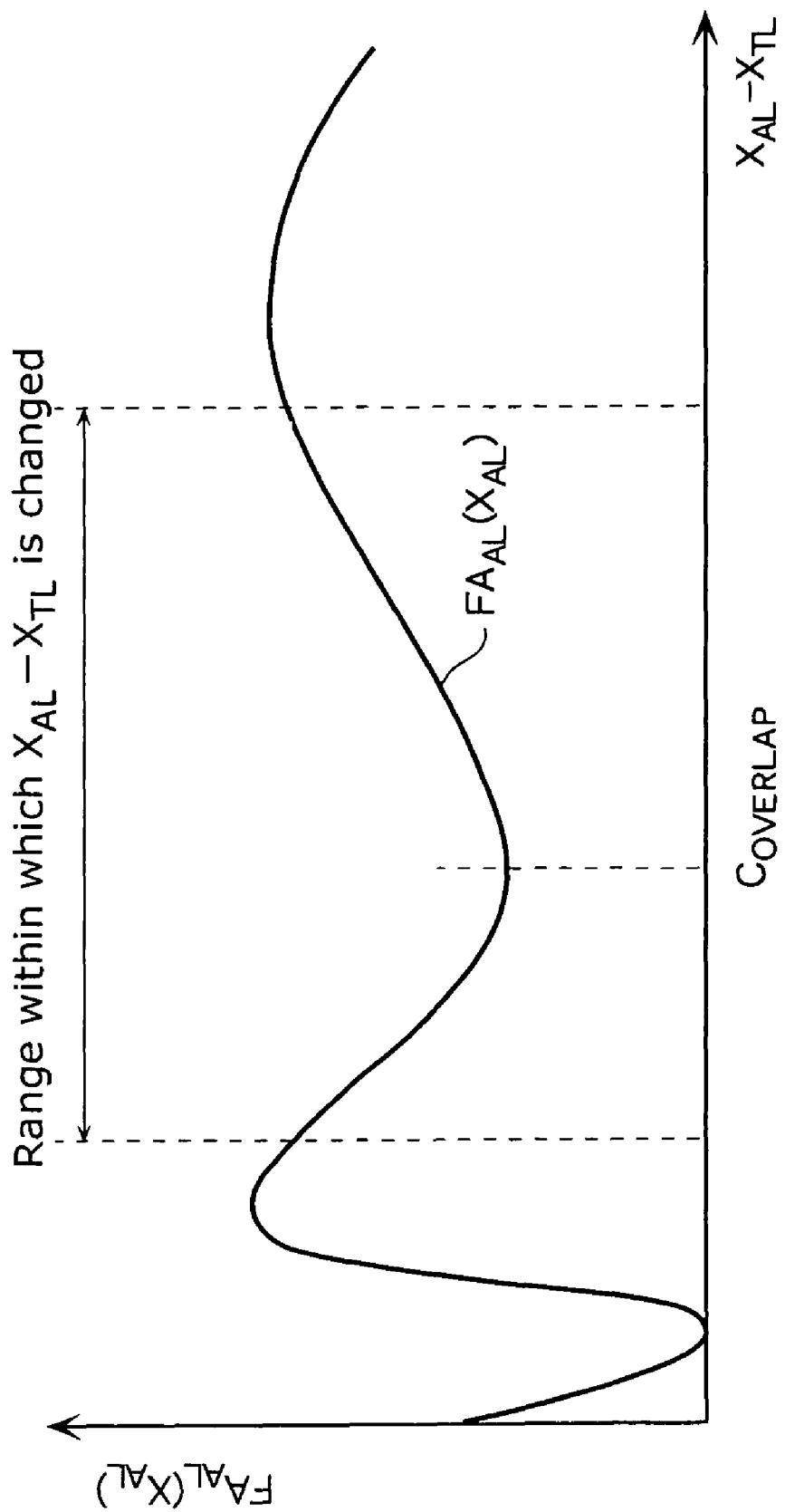
FIG. 29 is a drawing illustrating a function FA ( ) in the first embodiment of the present invention.

The same advantage can be obtained even if the function FA ( ) representing the difference between an amount indicating the size of the overlap region and a fixed amount $C_{OVERLAP}$ equal to or greater than 0 has a minimal value, not the minimum value, when $X_{AL}-X_{TL}=C_{OVERLAP}$ as shown in FIG. 29, as long as the function FA ( ) has the minimum value when $X_{AL}-X_{TL}=C_{OVERLAP}$ within a range in which $X_{AL}-X_{TL}$ is changed.

In this embodiment, as shown in FIG. 25, the adjusting units A202 are present in the respective camera terminals A101A to C101C. It is obvious that the same advantage can be obtained when there is only a single adjusting unit A202 which controls all the positions of the cycle $T_{CYCLE}$ imaging regions of the cameras in the camera terminals A101A to C101C.

In the embodiment, the network 103 is a network line used for general communication. It is obvious that the same advantage can be obtained irrespective of whether the network 103 is wired or wireless.

In the embodiment, the sizes of the overlap regions adjacent rightward, leftward, upward and downward are adjusted to a common fixed amount $C_{OVERLAP}$. However, the same advantage can be obtained even if they are adjusted to fixed amounts $C_{OVERLAP}$ different in each of the directions, furthermore, to fixed amounts $C_{OVERLAP}$ different for each of the camera terminals A101A to C101C, as long as each fixed amount $C_{OVERLAP}$ is 0 or more.

(Second Embodiment)

A second embodiment of the present invention is described hereafter with reference to FIGS. 30 to 37. This embodiment relates to an imaging region adjustment device: in which the positions of the cycle $T_{CYCLE}$ imaging regions of the cameras of the camera terminals are automatically adjusted so that a combined region of the cycle $T_{CYCLE}$ imaging regions of the cameras of the camera terminals completely covers a specific imaging target region; and furthermore which images the specific imaging target region with efficiency by reallocating the cycle $T_{CYCLE}$ imaging regions of the cameras of the camera terminals. In other words, this embodiment describes the imaging region adjustment device having characteristics of: an adjusting function for allowing the respective camera terminals constituting the imaging region adjustment device to adjust the positions of virtual imaging regions of one's own camera terminals so that a combined region of the virtual imaging regions of the camera terminals completely covers the specific imaging target region; and a region dividing function for dividing, into N regions, the region containing the virtual imaging regions of N ($\geqq 2$) camera terminals among the camera terminals and allocating the respective divided N regions to N camera terminals.

A concept of "aspect ratio" is used in the description in this embodiment. To begin with, "aspect ratio" is explained. An aspect ratio of an imaging region in this embodiment is the length-to-width ratio of a time T imaging region or cycle $T_{CYCLE}$ imaging region as same as the generally-called aspect ratio. Additionally, an aspect ratio can be represented as the horizontal field angle to vertical field angle ratio of a camera according to FIGS. 11A and 11B. Hence, in this second embodiment, the aspect ratio of the cycle $T_{CYCLE}$ imaging region is represented as the cycle $T_{CYCLE}$ camera horizontal field angle $\Theta b_H$/cycle $T_{CYCLE}$ camera vertical field angle $\Theta b_V$, and the aspect ratio of the time T imaging region is represented as the time T camera horizontal field angle $\Theta a_H$/time T camera vertical field angle $\Theta a_V$.

Next, as to efficient imaging of the specific imaging target region realized by reallocating the cycle $T_{CYCLE}$ imaging regions of the cameras of the respective camera terminals, description is given taking some examples with reference to FIGS. 30 and 31.

Figure 30A:
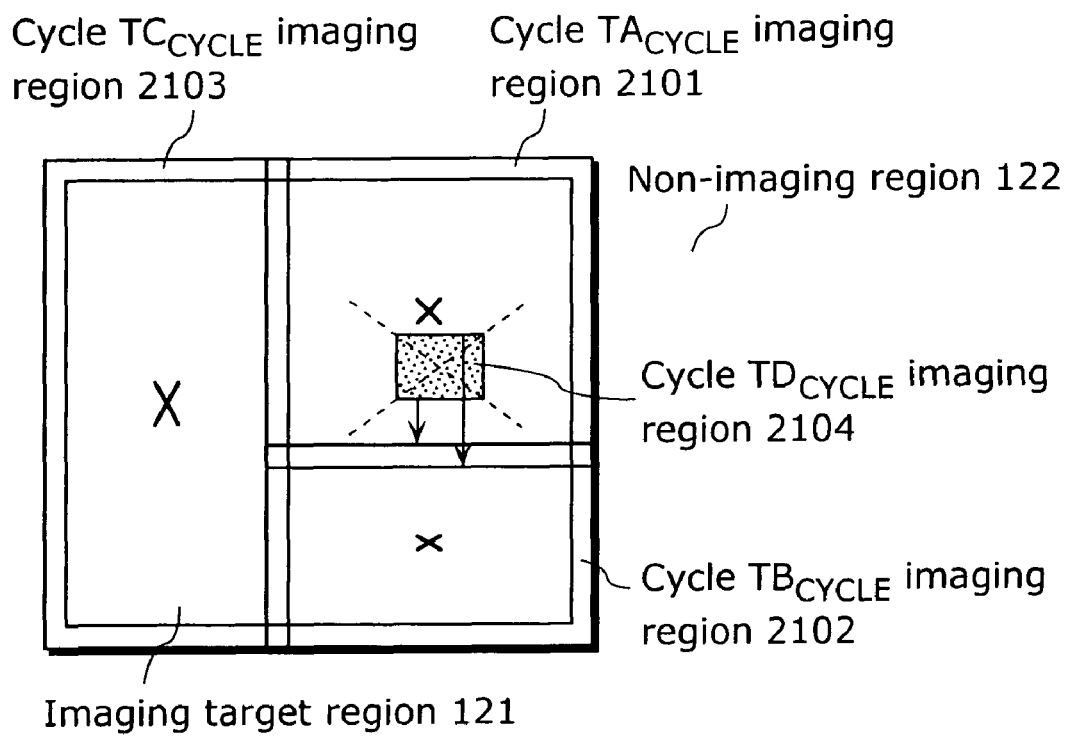
FIG. 30 is a drawing illustrating efficiency in imaging in a second embodiment of the present invention.
Figure 30B:
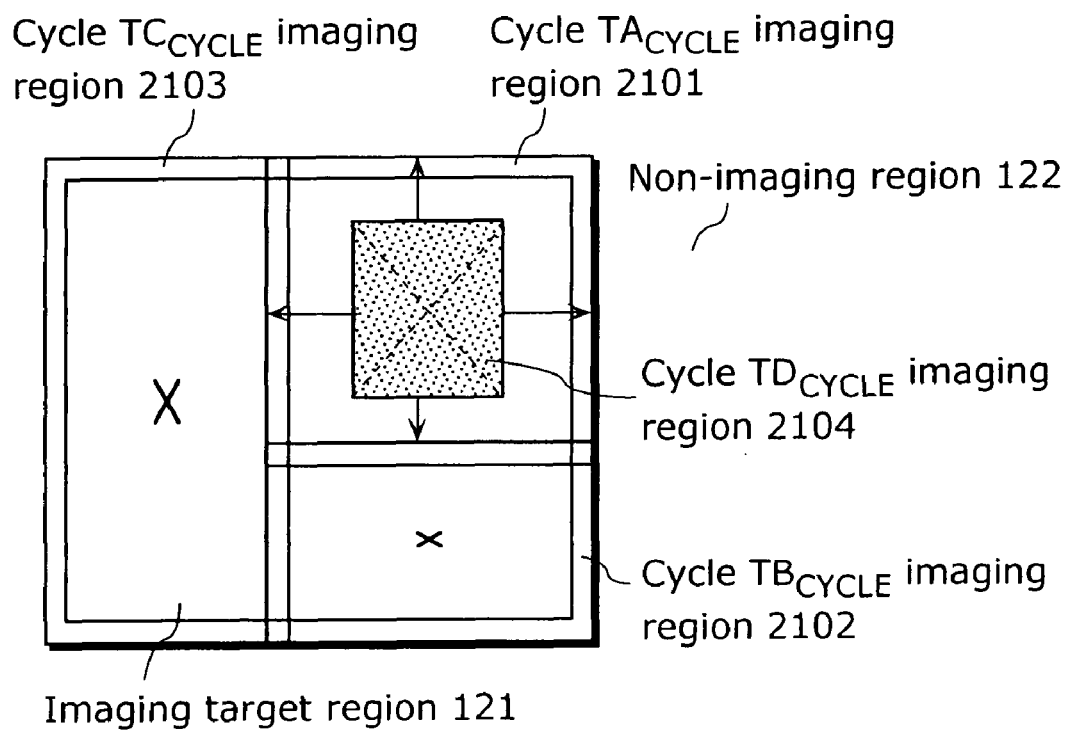

The examples of FIGS. 30A and 30B show a state where the imaging target region 121 is completely covered by the cycle $TA_{CYCLE}$ imaging region 2101, the cycle $TB_{CYCLE}$ imaging region 2102, and the cycle $TC_{CYCLE}$ imaging region 2103 which are being imaged by the respective camera terminals, and thus the entire imaging target region 121 is being imaged. In this state, the camera terminal which is imaging the cycle $TD_{CYCLE}$ imaging region 2104 adjusts the position of one's own cycle $T_{CYCLE}$ imaging region by performing the operation described in the first embodiment.

In the example shown in FIG. 30A, according to the method for selecting adjacent imaging regions described in the explanation of adjacent imaging regions, the camera terminal imaging the cycle $TD_{CYCLE}$ imaging region 2104 selects the cycle $TA_{CYCLE}$ imaging region 2101 as the cycle $T_{CYCLE}$ imaging region adjacent in the upward direction and the cycle $TB_{CYCLE}$ imaging region 2102 as the cycle $T_{CYCLE}$ imaging region adjacent in the downward direction. Subsequently, the camera terminal imaging the cycle $TD_{CYCLE}$ imaging region 2104 adjusts the position of the cycle $TD_{CYCLE}$ imaging region 2104 so that the cycle $TD_{CYCLE}$ imaging region 2104 is overlapped with the cycle $T_{CYCLE}$ imaging regions selected as being adjacent in a way that the top side of the cycle $TD_{CYCLE}$ imaging region 2104 is in the direction of the bottom side of the cycle $TA_{CYCLE}$ imaging region 2101 and the bottom side of the cycle $TD_{CYCLE}$ imaging region 2104 is in the direction of the top side of the cycle $TB_{CYCLE}$ imaging region 2101, as shown by the arrows in the figure. Consequently, the cycle $TD_{CYCLE}$ imaging region 2104 disappears in the example shown in FIG. 30A.

In addition, in the example shown in FIG. 30B, according to the method for selecting adjacent imaging regions described in the explanation of adjacent imaging regions, the camera terminal imaging the cycle $TD_{CYCLE}$ imaging region 2104 selects the same adjacent cycle $T_{CYCLE}$ imaging regions as those selected by the camera terminal imaging the cycle $TA_{CYCLE}$ imaging region 2101; that is, the non-imaging region 122 which is selected as cycle $T_{CYCLE}$ imaging region adjacent in the upward and rightward direction, the cycle $TB_{CYCLE}$ imaging region 2102 which is selected as the cycle $T_{CYCLE}$ imaging region adjacent in the downward direction, and the cycle $TC_{CYCLE}$ imaging region 2103 which is selected as the cycle $T_{CYCLE}$ imaging region adjacent in the leftward direction. Subsequently, the camera terminal imaging the cycle $TD_{CYCLE}$ imaging region 2104 adjusts the position of the cycle $TD_{CYCLE}$ imaging region 2104 so that the cycle $TD_{CYCLE}$ imaging region 2104 is overlapped with the cycle $T_{CYCLE}$ imaging regions selected as being adjacent. Consequently, in the example shown in FIG. 30B, the position of the cycle $TD_{CYCLE}$ imaging region 2104 is adjusted to the same position as the cycle $TA_{CYCLE}$ imaging region 2101, and thus the entire cycle $T_{CYCLE}$ imaging region is doubly imaged.

To prevent such a result as shown in FIGS. 30A and 30B, when the cycle $TD_{CYCLE}$ imaging region 2104 is contained in the cycle $TA_{CYCLE}$ imaging region 2101 shown in FIGS. 30A and 30B, the cycle $TA_{CYCLE}$ imaging region 2101 is divided into two regions and the divided regions are determined to be the cycle $TA_{CYCLE}$ imaging region 2101 and the cycle $TD_{CYCLE}$ imaging region 2104. This makes it possible to image the entire imaging target region 121 using the respective cycle $T_{CYCLE}$ imaging regions including the cycle $TD_{CYCLE}$ imaging region 2104. As a result, the size of each cycle $T_{CYCLE}$ imaging region is reduced, in other words, the imaging cycle of each cycle $T_{CYCLE}$ imaging region becomes shorter. Thus, it becomes possible to image the imaging target region 121 in a short time. It is ideal for the imaging region adjustment device of the present invention for surveillance use to be able to image the imaging target region 121 in a shorter time. Therefore, an imaging target region 121 can be efficiently imaged.

Figure 31A:
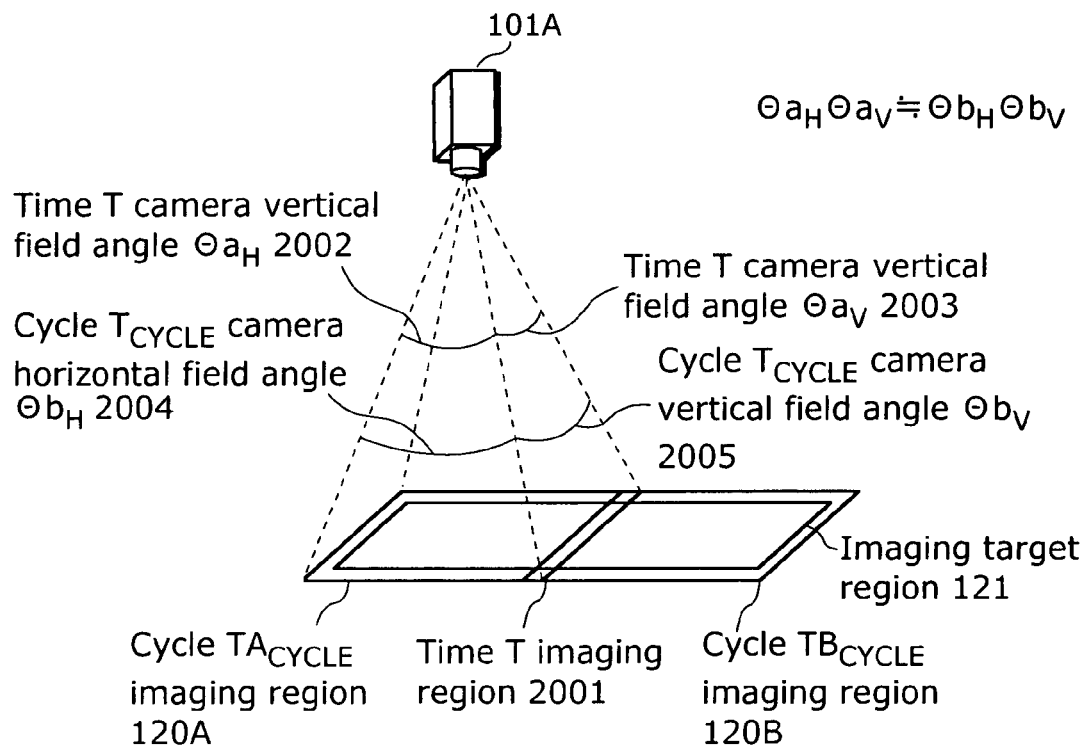
FIG. 31 is a drawing illustrating efficiency in imaging in a second embodiment of the present invention.
Figure 31B:
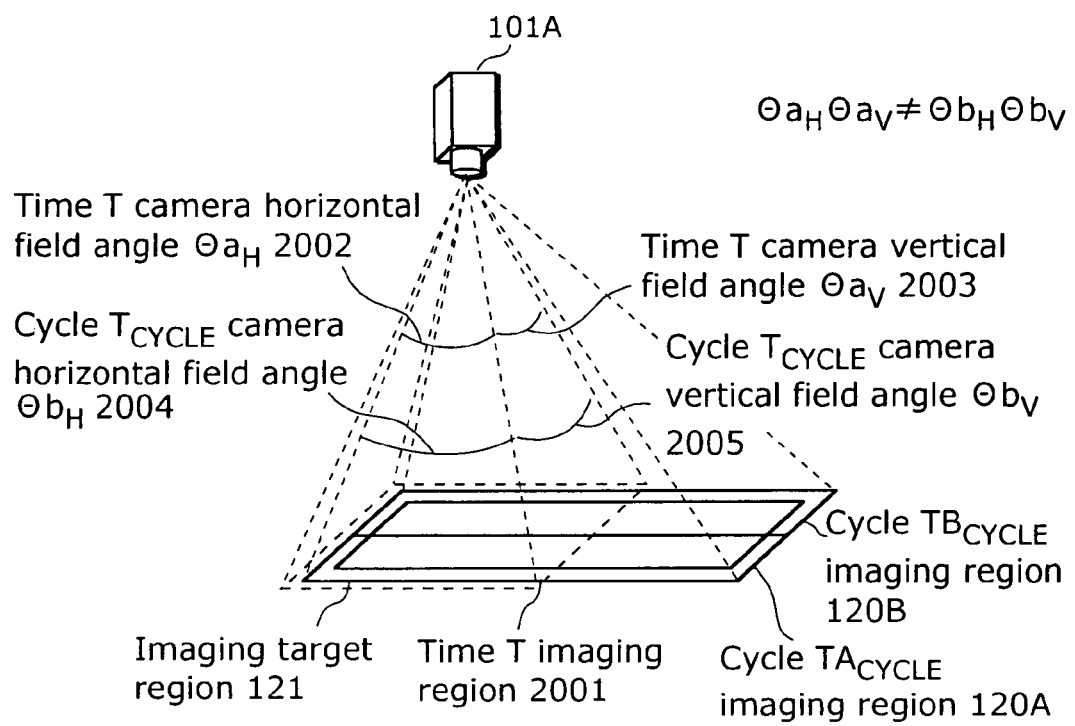

In addition, the examples of FIGS. 31A and 31B each shows a state where the imaging target region 121 is completely covered by the cycle $TA_{CYCLE}$ imaging region 120A and the cycle $TB_{CYCLE}$ imaging region 120B which are being imaged by the respective camera terminals, and thus the entire imaging target region 121 is being imaged. In the examples, the cycle $TA_{CYCLE}$ imaging region 120A among these is included in the time T imaging region 2001 and imaged. In the example shown in FIG. 31A in contrast to the example shown in FIG. 31B, the time T camera horizontal field angle $\Theta a_H$/the time T camera vertical field angle $\Theta a_V \approx$the cycle $T_{CYCLE}$ camera horizontal field angle $\Theta b_H$/the cycle $T_{CYCLE}$ camera vertical field angle $\Theta b_V$, in other words, the aspect ratio of the time T imaging region$\approx$the aspect ratio of the cycle $T_{CYCLE}$ imaging region. In the example shown in FIG. 31B in contrast to the example shown in FIG. 31A, the time T camera horizontal field angle $\Theta a_H$/the time T camera vertical field angle $\Theta a_V \neq$the cycle $T_{CYCLE}$ camera horizontal field angle $\Theta b_H$/the cycle $T_{CYCLE}$ camera vertical field angle $\Theta b_V$, in other words, the aspect ratio of the time T imaging region$\neq$the aspect ratio of the cycle $T_{CYCLE}$ imaging region.

In the example shown in FIG. 31A, according to the earlier-described method for imaging cycle $T_{CYCLE}$ imaging region, the camera terminal A101A images, as the time T imaging region, the entire cycle $TA_{CYCLE}$ imaging region 120A which is one's own cycle $T_{CYCLE}$ imaging region. Thus, the imaging cycle of the cycle $TA_{CYCLE}$ imaging region 120A is 0, and the cycle $TA_{CYCLE}$ imaging region 120A is continuously being imaged.

In addition, in the example shown in FIG. 31B, according to the earlier-described method for imaging cycle $T_{CYCLE}$ imaging region, the camera terminal A101A cannot image, as the time T imaging region, the entire cycle $TA_{CYCLE}$ imaging region 120A which is one's own cycle $T_{CYCLE}$ imaging region. Thus, the cycle $TA_{CYCLE}$ imaging region 120A is imaged in a certain imaging cycle. Furthermore, the camera terminal A101A images, as the time T imaging region, even the cycle $TB_{CYCLE}$ imaging region 120B which is not one's own cycle $T_{CYCLE}$ imaging region.

According to the examples shown in FIGS. 31A and 31B, efficiency in imaging is better in the case where the relationship between the time T imaging region and the cycle $T_{CYCLE}$ imaging regions by which the time T imaging region is imaged is represented as the aspect ratio of the time T imaging region$\approx$the aspect ratio of the cycle $T_{CYCLE}$ imaging region as shown in the example of FIG. 31A. However, in the case where the position of each cycle $T_{CYCLE}$ imaging region is adjusted to the position as shown in FIG. 31B through the operation described in the first embodiment, each cycle $T_{CYCLE}$ imaging region is already overlapped with the adjacent cycle $T_{CYCLE}$ imaging regions, and thereby the entire imaging target region 121 has already been imaged as each cycle $T_{CYCLE}$ imaging region. Thus, the effect of adjusting the position of each cycle $T_{CYCLE}$ imaging region according to the Expressions 42 to 44 executed by the adjusting unit A202 shown in FIG. 24 does not work. Therefore, in the case where the position of each cycle $T_{CYCLE}$ imaging region has been once adjusted to the position as shown in FIG. 31B, there is no possibility that the position of each cycle $T_{CYCLE}$ imaging region is adjusted to the position shown in FIG. 31A through the operation by the adjusting unit A202.

Here, it is assumed in the example shown in FIG. 31B that the region containing the cycle $TA_{CYCLE}$ imaging region 120A and the cycle $TB_{CYCLE}$ imaging region 120B is divided into two, and the respective divided regions are determined to be the cycle $TA_{CYCLE}$ imaging region 120A and the cycle $TB_{CYCLE}$ imaging region 120B. Further, the division of the region and allocation of the divided regions as the cycle $TA_{CYCLE}$ imaging region 120A and the cycle $TB_{CYCLE}$ imaging region 120B are executed so that the following relationship is satisfied: the aspect ratio of the time T imaging region$\approx$the aspect ratio of the cycle $T_{CYCLE}$ imaging region in each cycle $T_{CYCLE}$ imaging region. By doing so, it becomes possible to efficiently image the imaging target region 121 because the position of each cycle $T_{CYCLE}$ imaging region is adjusted to the position shown in FIG. 31A even in the case where each cycle $T_{CYCLE}$ imaging region has been once adjusted to the position shown in FIG. 31B.

Figure 32:
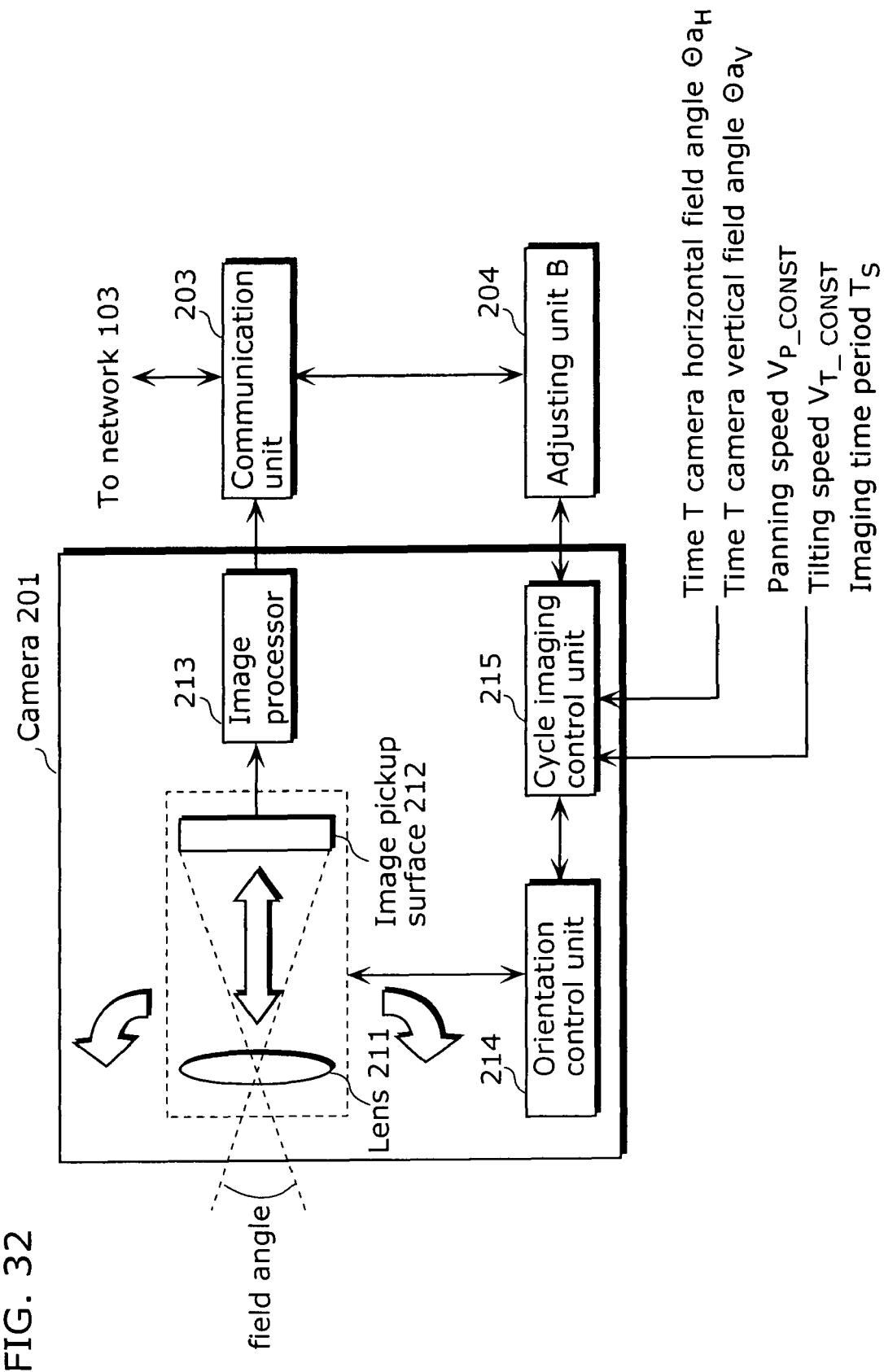
FIG. 32 is a block diagram showing the structure of a camera terminal in the second embodiment of the present invention.

The structural elements of the imaging region adjustment device in this embodiment are described hereafter. FIG. 32 is a block diagram showing the structure of the camera 201 in this embodiment in each of the camera terminals 101A to 101C in FIG. 24A. Each of the camera terminals 101A to 101C includes at least a camera 201, an adjusting unit B204, and a communication unit 203. The camera 201 includes a lens 211, an imaging surface 212, an image processor 213, an orientation control unit 214, and a cycle imaging control unit 215. In FIG. 32, the camera 201, the communication unit 203, the lens 211, the imaging surface 212, the imaging processor 213, the orientation control unit 214, and the cycle imaging control unit 215 are the same as those in FIG. 24 which is a block diagram showing the structure of each of the camera terminals 101A to 101C in the first embodiment. This embodiment includes a structural element different from that of the first embodiment; that is, the adjusting unit A in the first embodiment is changed to the adjusting unit B204 in this embodiment.

More specifically, the camera 201 is intended for imaging a virtual imaging region obtained while changing the position of an imaging region within a specific region in a specific period of time.

The communication unit 203 is a communication interface for receiving and sending virtual imaging region information indicating a virtual imaging region.

The adjusting unit B204 adjusts the position of the virtual imaging region for one's own camera terminal so that a combined region of virtual imaging regions for camera terminals A to C completely covers a specific imaging target region, based on the position of the virtual imaging region of one's own camera terminal and the positions of the virtual imaging regions of other camera terminals indicated by the virtual imaging region information received by the communication unit 203. In this embodiment, the adjusting unit B204 further divides, into N regions, the region containing the virtual imaging regions of N ($\geq 2$) camera terminals among the camera terminals A to C, allocates the respective divided N regions to N camera terminals, and executes the adjustment regarding the region allocated to one's own camera terminal as the virtual imaging region.

The operation of the imaging region adjustment device in this embodiment is described hereafter. Since this embodiment differs only in that the adjusting unit A202 in the first embodiment is changed to the adjusting unit B204, only the operation of the adjusting unit B204 is described below.

Likewise the adjusting unit A202, the adjusting unit B204 cyclically sends the positional information of the cycle $T_{CYCLE}$ imaging region of the camera 201 sent from the cycle imaging control unit 215 to the adjusting unit B204 of each of the other camera terminals via the communication unit 203 and the network 103. In addition, likewise the adjusting unit A202, the adjusting unit B204 receives the positional information of the cycle $T_{CYCLE}$ imaging region of the camera 201 in each of the other camera terminals which is cyclically sent from the adjusting unit B204 of each of other camera terminals. Thus, likewise the first embodiment, the adjusting unit B204 in each of the camera terminals 101A to 101C cyclically obtains the positional information of the cycle $T_{CYCLE}$ imaging region and the positional information of the imaging target region 121 of the camera 201 in each of the camera terminals including one's own camera terminal and the other camera terminals.

Figure 33:
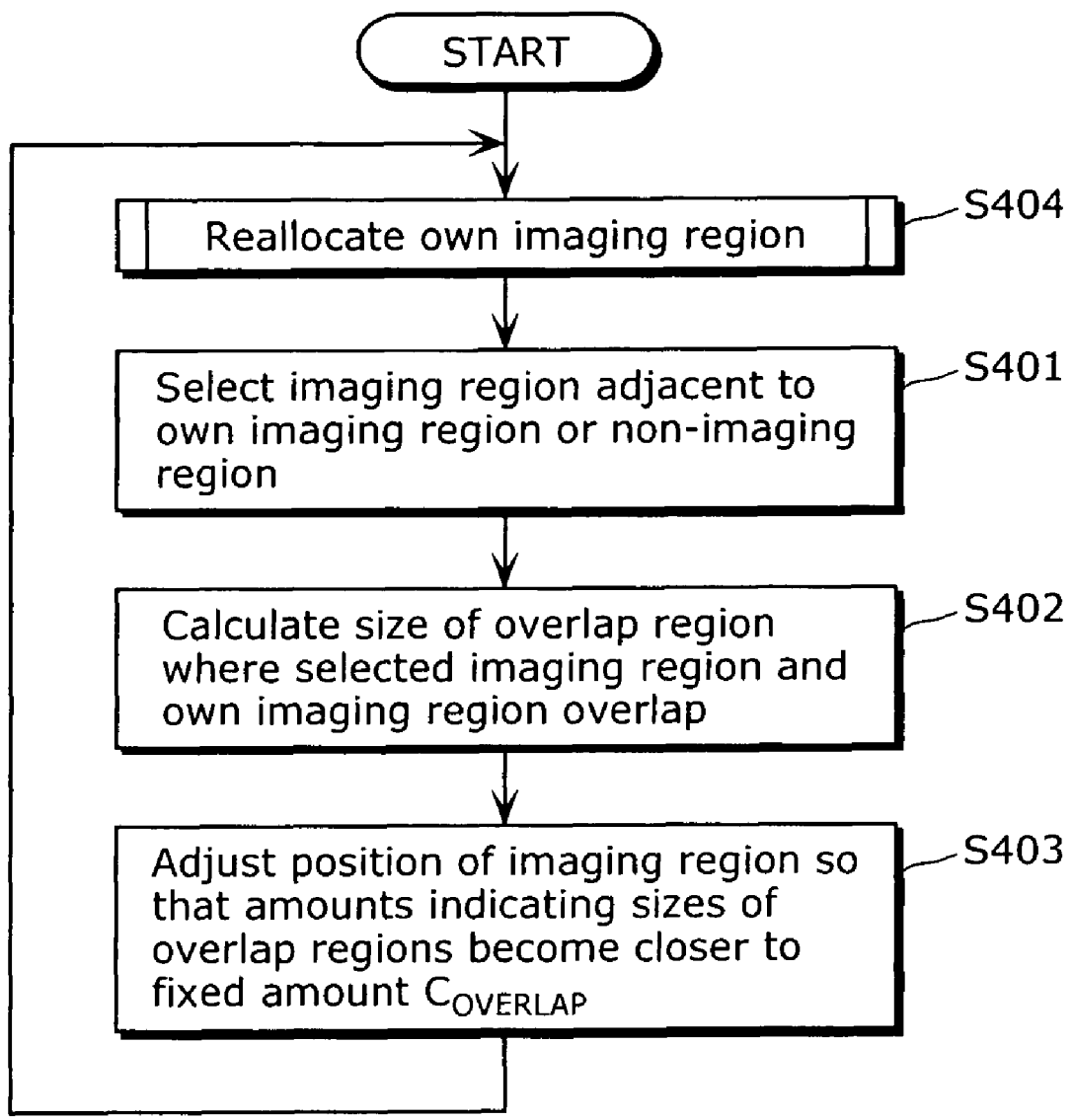
FIG. 33 is a flowchart indicating the processing executed by an adjusting unit B in the second embodiment of the present invention.

Further, likewise the first embodiment, the adjusting unit B204 executes the processing of the Steps shown in FIG. 33, based on the positional information of the cycle $T_{CYCLE}$ imaging region and the positional information of the imaging target region 121 (which corresponds to the positional information of the non-imaging region 122).

Figure 27:
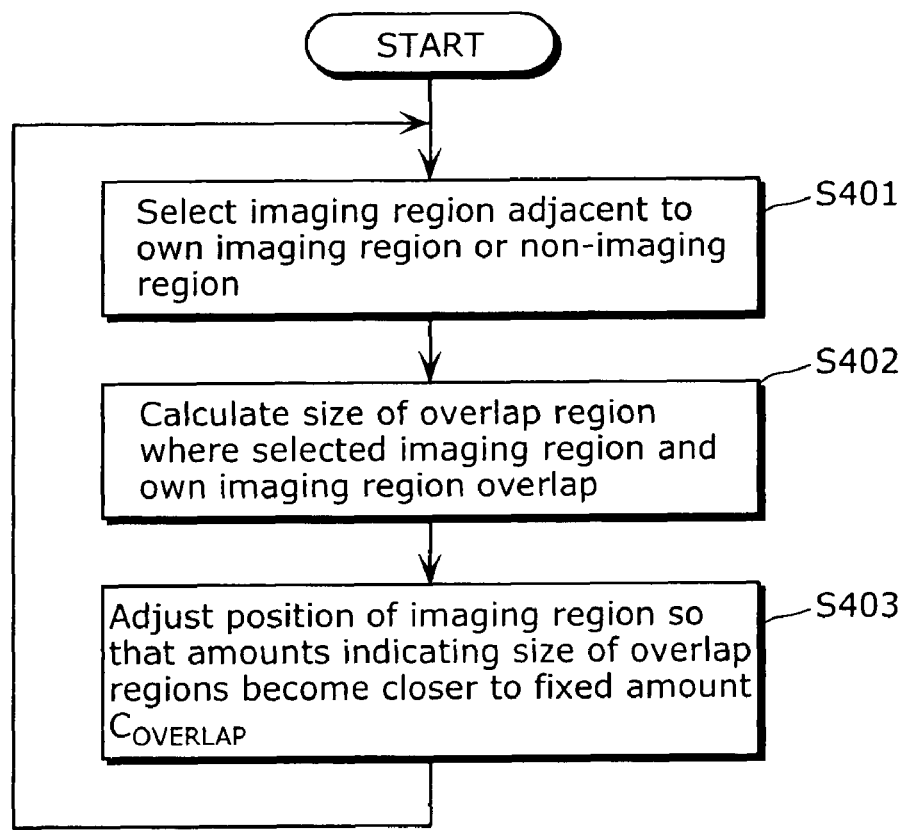
FIG. 27 is a flowchart indicating the processing performed by an adjusting unit A in the first embodiment of the present invention.

The processing of Steps 401 to 403, not including Step 404 is the same as Steps 401 to 403 of FIG. 27 in the first embodiment. The cycle $T_{CYCLE}$ imaging region of another camera terminal adjacent to the cycle $T_{CYCLE}$ imaging region of one's own camera terminal or the non-imaging region 122 is selected, the amount indicating the size of the overlap region where the selected imaging region and the imaging region of one's own camera terminal are overlapped with each other is calculated, and the position of the imaging region of one's own camera terminal is adjusted so that the amount showing the size of the calculated overlap region becomes closer to a fixed amount $C_{overlap}$. Subsequently, the adjusting unit B204 executes the processing of Step 401 to 403 in sequence, and after completing the processing of Step 403, returns to the processing of Step 401. Subsequently, the adjusting unit B204 constantly repeats the processing of Step 401 to 403 and sends, to the cycle imaging control unit 215, the following updated values calculated using the Expressions 42 to 44: the cycle $T_{CYCLE}$ camera panning angle $\Theta b'_{PA}$ (or $\Theta b'_{PB}$ or $\Theta b'_{PC}$), cycle $T_{CYCLE}$ camera tilting angle $\Theta'_{TA}$ (or $\Theta b'_{TB}$ or $\Theta b'_{TC}$), cycle $T_{CYCLE}$ camera horizontal field angle $\Theta'_{HA}$ (or $\Theta'_{HB}$ or $\Theta'_{HC}$), and cycle $T_{CYCLE}$ camera vertical field angle $\Theta b'_{VA}$ (or $\Theta b'_{VB}$ or $\Theta b'_{VC}$), so that the position of the cycle $T_{CYCLE}$ imaging region of the camera 201 is adjusted. Therefore, it is obvious that the imaging region adjustment device of this embodiment is capable of imaging the imaging target region 121 without blind spots using each of the camera terminals 101A to 101C likewise the imaging region adjustment device of the first embodiment.

Figure 34:
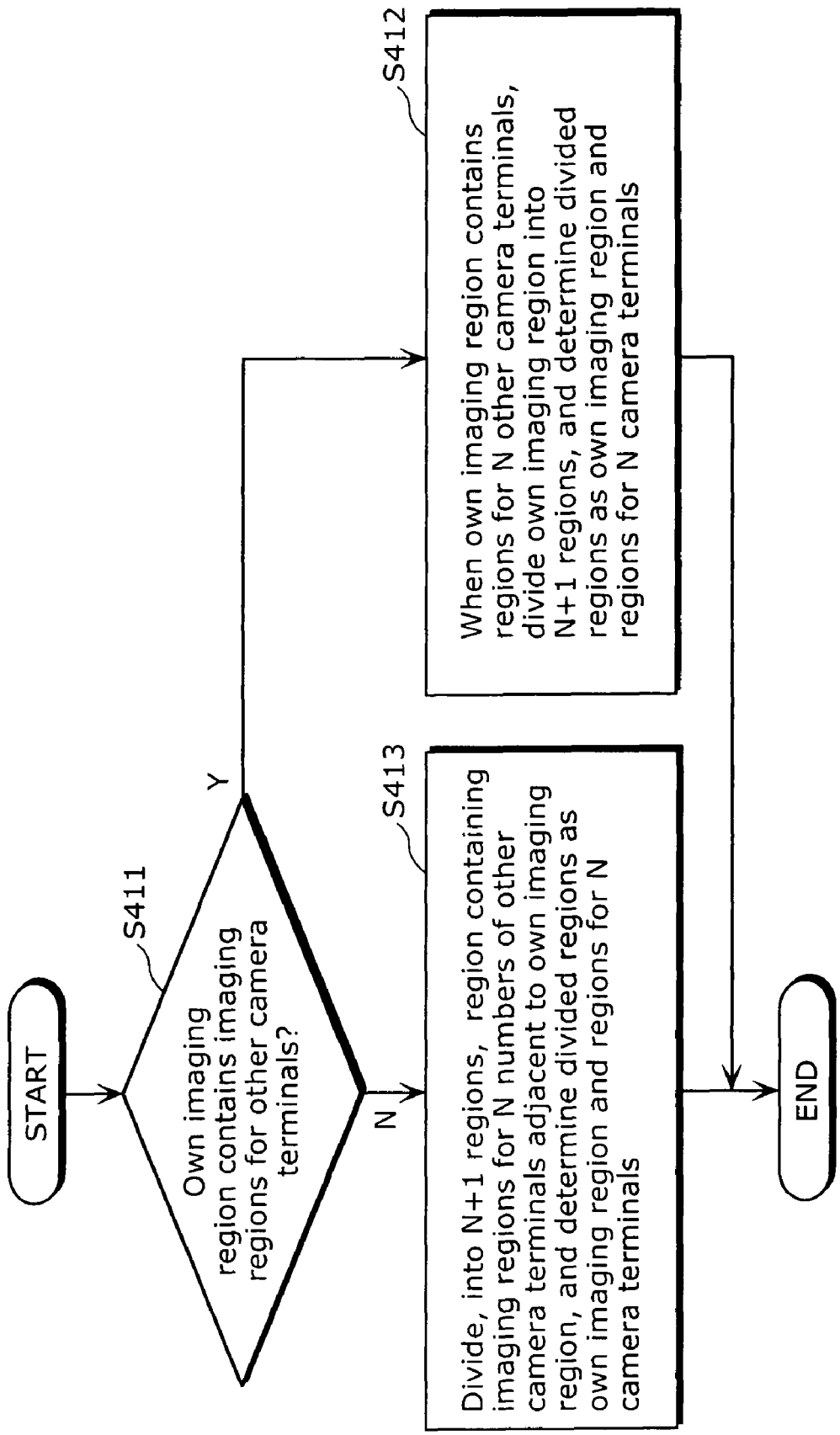
FIG. 34 is a flowchart indicating the processing executed by an adjusting unit B in the second embodiment of the present invention.

In addition, in Step 404, more specifically, the adjusting unit B204 executes reallocation of the cycle $T_{CYCLE}$ imaging region of one's own camera terminal through the Step indicated in FIG. 34. The processing of Step (that is, a detailed step of Step 404 in FIG. 33) indicated in FIG. 34 is described hereinafter.

First, in Step 411, the adjusting unit B204 evaluates whether or not the cycle $T_{CYCLE}$ imaging region of one's own camera terminal contains the cycle $T_{CYCLE}$ imaging regions of other camera terminals.

Subsequently, when the cycle $T_{CYCLE}$ imaging region of one's own camera terminal contains the cycle $T_{CYCLE}$ imaging regions of other camera terminals, in Step 412, the adjusting unit B204 divides, into N+1 regions, the cycle $T_{CYCLE}$ imaging region of one's own camera terminal which contains the cycle $T_{CYCLE}$ imaging regions of N other camera terminals, and determines the respective divided regions to be the cycle $T_{CYCLE}$ imaging region of one's own camera terminal and the cycle $T_{CYCLE}$ imaging regions of N other camera terminals. In other words, the adjusting unit B204 sets one of the divided regions as the cycle $T_{CYCLE}$ imaging region of one's own camera terminal and notifies N other camera terminals of the information identifying the divided regions via the communication unit 203. As the result, the adjusting units B204 of one's own camera terminal and N camera terminals start readjustment (readjusting the position of the cycle $T_{CYCLE}$ imaging region of one's own camera terminal so that a combined region of cycle $T_{CYCLE}$ imaging regions of camera terminals A to C completely covers the imaging target region) starting with the positions of the reallocated cycle $T_{CYCLE}$ imaging regions.

Figure 35A:
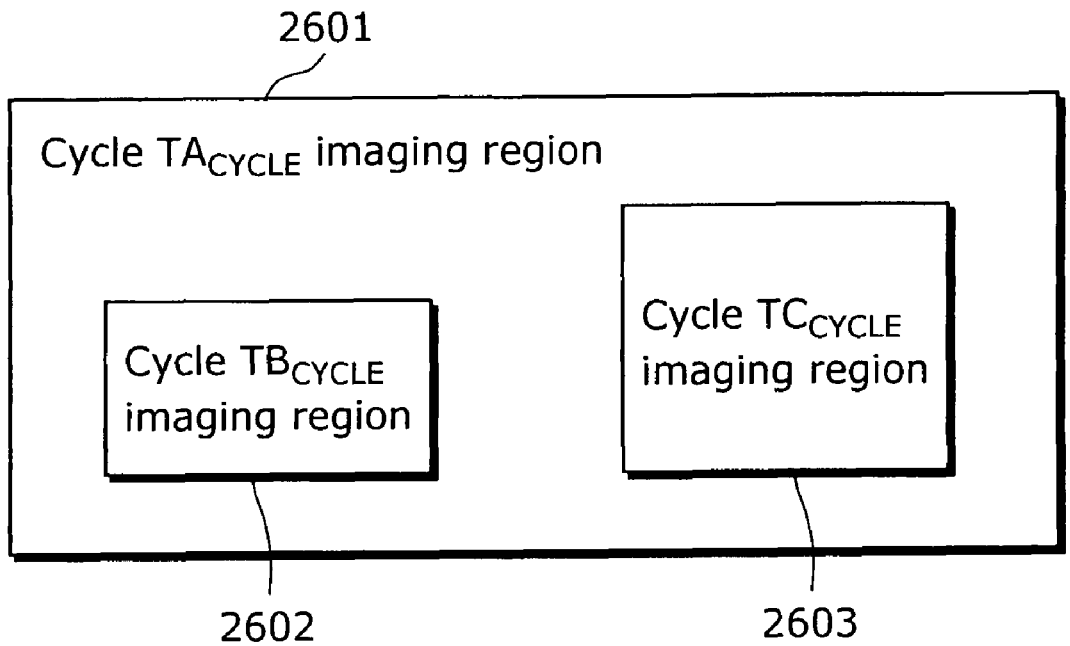
FIG. 35 is a diagram illustrating reallocation of imaging regions in the second embodiment of the present invention.
Figure 35B:
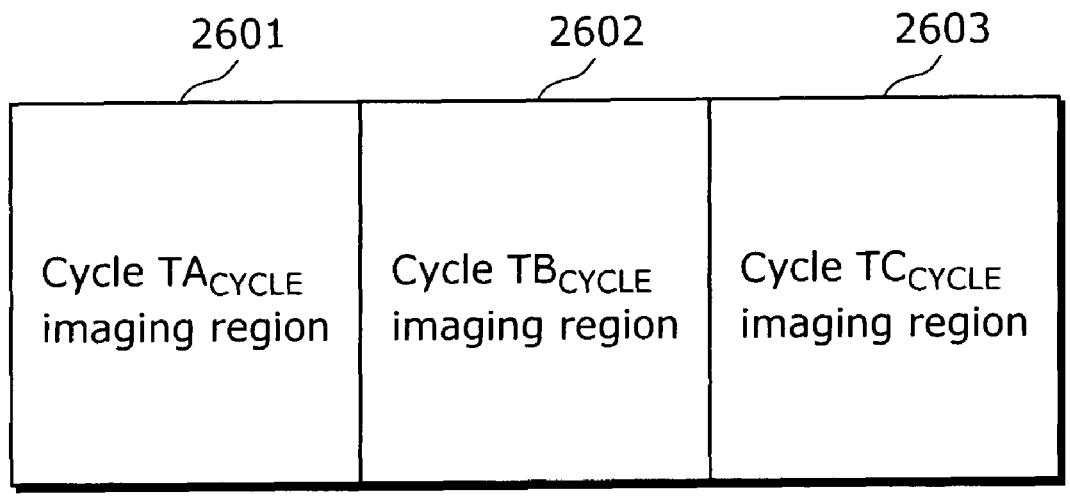
Figure 36A:
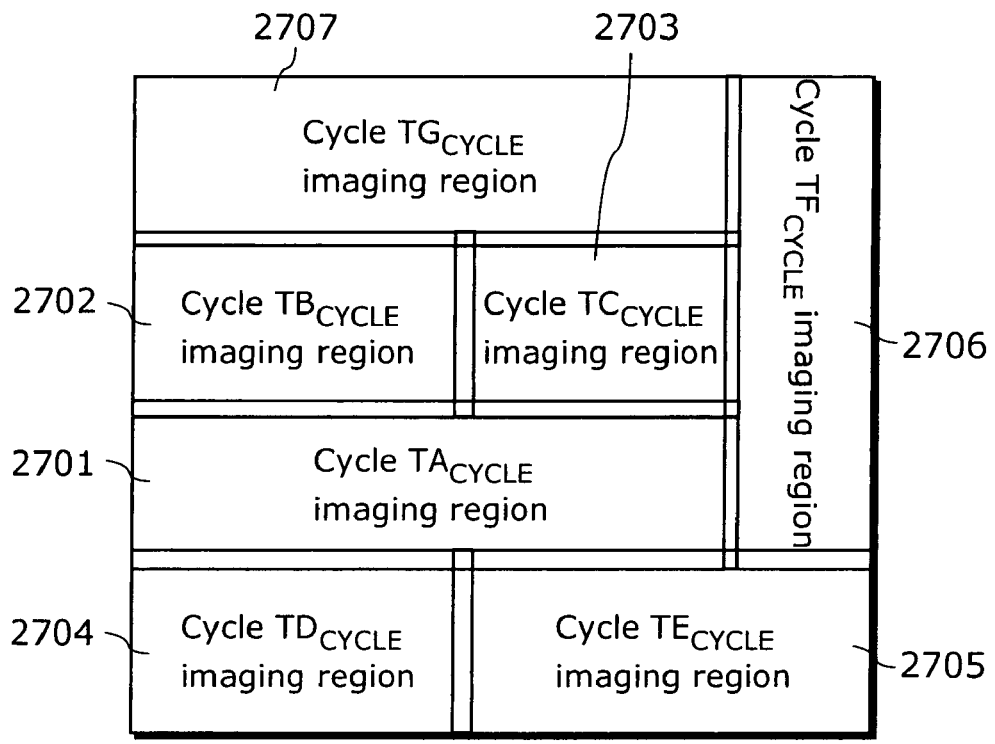
FIG. 36 is a diagram illustrating reallocation of imaging regions in the second embodiment of the present invention.
Figure 36B:
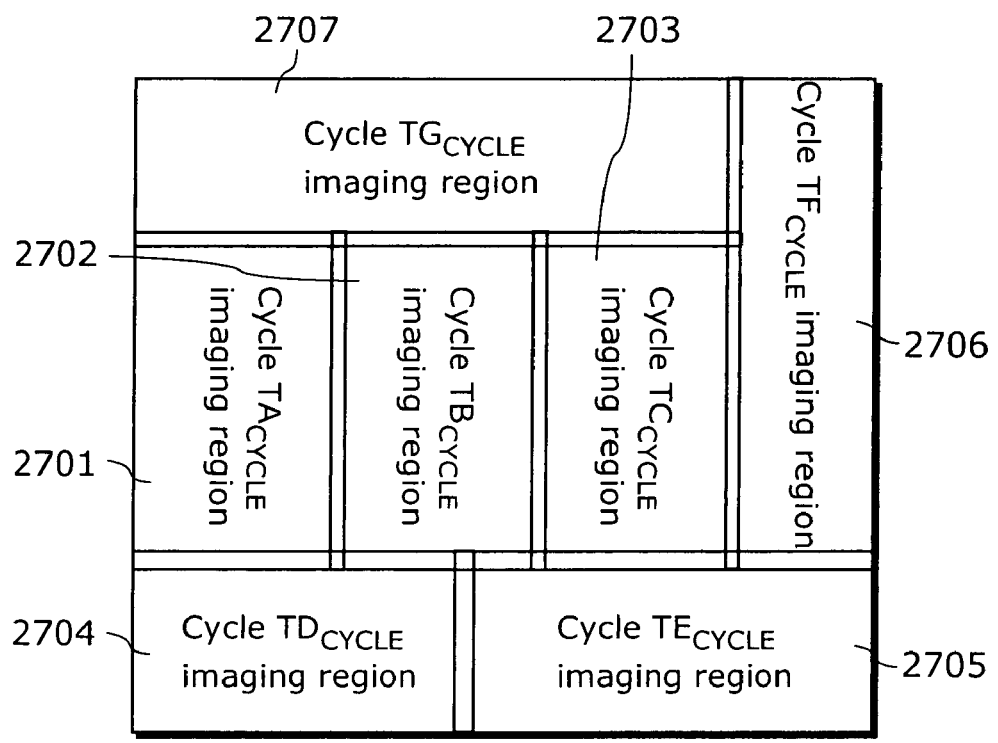

FIGS. 35A and 35B each shows an example of the operation of Step 412. In the example shown in FIG. 35A, assuming that the cycle $TA_{CYCLE}$ imaging region 2601 as the cycle $T_{CYCLE}$ imaging region of one's own camera terminal, the cycle $T_{CYCLE}$ imaging region of one's own camera terminal contains the other two camera terminals' cycle $T_{CYCLE}$ imaging regions; that is, the cycle $TB_{CYCLE}$ imaging region 2602 and the cycle $TC_{CYCLE}$ imaging region 2603. In the processing of Step 412, the adjusting unit B204 adjusts the ones shown in FIG. 35A to the ones shown in FIG. 35B. In other words, the adjusting unit B204 divides, into 2+1 regions, the cycle $TA_{CYCLE}$ imaging region 2603 which is the cycle $T_{CYCLE}$ imaging region of one's own camera terminal in the example shown in FIG. 35A, and determines the regions equally divided as shown in the example of FIG. 35B to be the cycle $TA_{CYCLE}$ imaging region 2603 of one's own camera terminal and the cycle $TB_{CYCLE}$ imaging region 2602 and the cycle $TC_{CYCLE}$ imaging region 2603 of the other camera terminals respectively.

In addition, when the cycle $T_{CYCLE}$ imaging region of one's own camera terminal does not contain the cycle $T_{CYCLE}$ imaging regions of other camera terminals, in Step 413, the adjusting unit B204 divides, into N+1 regions, the cycle $T_{CYCLE}$ imaging region of one's own camera terminal and the cycle $T_{CYCLE}$ imaging regions of N other camera terminals adjacent to the cycle $T_{CYCLE}$ imaging region of one's own camera terminal, and determines the respective divided regions to be the cycle $T_{CYCLE}$ imaging region of one's own camera terminal and the cycle $T_{CYCLE}$ imaging regions of N other camera terminals adjacent to the cycle $T_{CYCLE}$ imaging region of one's own camera terminal. In other words, the adjusting unit B204 sets one of the divided regions as the cycle $T_{CYCLE}$ imaging region of one's own camera terminal and notifies N other camera terminals of the information identifying the divided regions via the communication unit 203. As the result, the adjusting units B204 of one's own camera terminal and N camera terminals start readjustment (adjusting the position of the cycle $T_{CYCLE}$ imaging region of one's own camera terminal so that a combined region of cycle $T_{CYCLE}$ imaging regions of camera terminals A to C completely covers the imaging target region) starting with the positions of the reallocated cycle $T_{CYCLE}$ imaging regions.

FIGS. 35A and 35B each shows an example of the operation of Step 413. In the example shown in FIG. 36A, assuming that the cycle $TA_{CYCLE}$ imaging region 2701 as the cycle $T_{CYCLE}$ imaging region of one's own camera terminal and the cycle $TB_{CYCLE}$ imaging region 2702 and the cycle $TC_{CYCLE}$ imaging region 2703 as the cycle $T_{CYCLE}$ imaging regions of the other two camera terminals adjacent to the cycle $T_{CYCLE}$ imaging region of one's own camera terminal. In the processing of Step 413, the adjusting unit B204 adjusts the ones shown in FIG. 36A to the ones shown in FIG. 36B. In other words, the adjusting unit B204 divides, into 2+1 regions, the region enclosing the cycle $TA_{CYCLE}$ imaging region 2701, the cycle $TB_{CYCLE}$ imaging region 2702 and the cycle $TC_{CYCLE}$ imaging region 2703 which contain the cycle $T_{CYCLE}$ imaging region of one's own camera terminal and the cycle $T_{CYCLE}$ imaging regions of the other two camera terminals adjacent to the cycle $T_{CYCLE}$ imaging region of one's own camera terminal in the example shown in FIG. 36A, and determines the equally divided regions to be the cycle $TA_{CYCLE}$ imaging region 2601 which is the cycle $T_{CYCLE}$ imaging region of one's own camera terminal and the cycle $TB_{CYCLE}$ imaging region 2602 and the cycle $TC_{CYCLE}$ imaging region 2603 which are the cycle $T_{CYCLE}$ imaging regions of the other two camera terminals adjacent to the cycle $T_{CYCLE}$ imaging region of one's own camera terminal respectively.

Figure 37A:
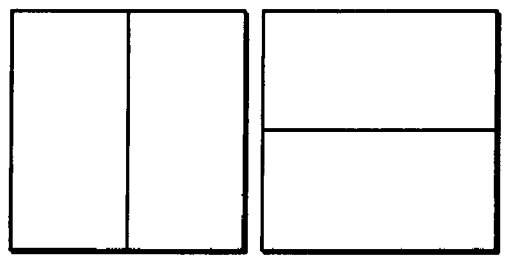
FIG. 37 is a diagram illustrating division patterns of imaging regions in the second embodiment of the present invention.
Figure 37B:
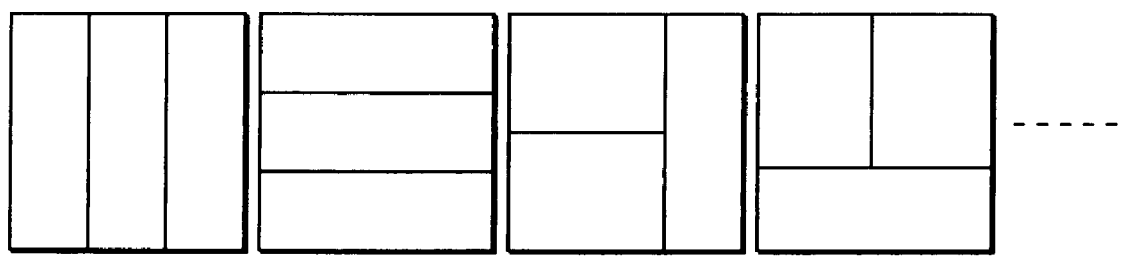
Figure 37C:
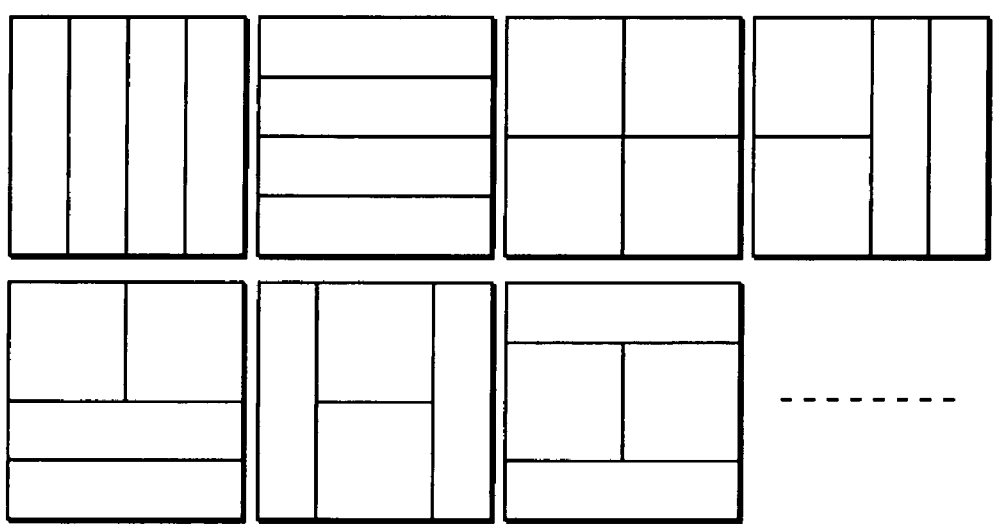

FIGS. 37A, 37B and 37C show a 2-division pattern, a 3-division pattern and a 4-division pattern respectively. The division in Steps 412 and 413 may be executed according to a prepared division pattern such as the examples shown in FIGS. 37A to 37C. More specifically, the adjusting unit B204 has a storing unit in which information identifying n division patterns as shown in FIGS. 37A to 37C is stored in advance and divides regions by selecting a division pattern in accordance with the number of resulting regions from among the division patterns stored in the storing unit and by referring to the division pattern information.

In addition, the selection of a division pattern shown in FIGS. 37A to 37C, the allocation of the divided regions as the cycle $T_{CYCLE}$ imaging regions and the selection of the $T_{CYCLE}$ imaging regions of N other camera terminals adjacent to the cycle $T_{CYCLE}$ imaging region of one's own camera terminal in Step 413 are executed so that the imaging cycle of the cycle $T_{CYCLE}$ imaging region of each camera terminal becomes shortest or the size of a region other than the virtual imaging region imaged as one's own imaging region by each camera terminal becomes smallest. In other words, the adjusting unit B204 executes division and allocation of a region for at least one camera terminal to be a target of the allocation so that the time required to image the cycle $T_{CYCLE}$ imaging region becomes shorter or the size of a region other than the cycle $T_{CYCLE}$ imaging region within the region to be actually imaged becomes smaller.

As for the evaluation of the selection and allocation, it is obvious that they are completely executable by the adjusting unit B204 which executes Step 404 because the adjusting unit B204 required for the evaluation cyclically obtains the positional information of the cycle $T_{CYCLE}$ imaging region of each of the camera terminals 101A to 101C and the positional information of the imaging target region 121. For example, "the time required to image the cycle $T_{CYCLE}$ imaging region" can be evaluated at cycle $T_{CYCLE}$, and "a region other than the cycle $T_{CYCLE}$ imaging region within the region to be actually imaged" can be evaluated by the size obtained by subtracting an allocated cycle $T_{CYCLE}$ imaging region from the entire region (outlined region) covered when the time T imaging region is moved at cycle $T_{CYCLE}$.

In addition, in the case where the regions divided in Steps 412 and 413 are allocated as the cycle $T_{CYCLE}$ imaging regions of the other camera terminals, the adjusting unit B204 notifies the adjusting unit B204 of each of the other camera terminals of the fact that the regions divided for the other camera terminals are determined as the cycle $T_{CYCLE}$ imaging region of one's own camera terminal via the communication network 103. Subsequently, the adjusting unit B204 receives the notification by an interrupt or polling, although neither of these is not shown in the flowcharts of FIGS. 33 and 34, and regards the notified divided regions as the cycle T CYCLE imaging region of one's own camera terminal. Note that the notification to the other camera terminals described up to this point is preferably a notification for confirming a request such as a handshake communication and the response to the request (allowance/rejection). This is because, in the case where plural notifications are made to the adjusting unit B204 of the identical camera terminal, the adjusting unit B204 is capable of changing the position of the cycle $T_{CYCLE}$ imaging region in response to only one of the notifications. Otherwise, this is because, when a notification is made to the adjusting unit B204 of a camera terminal, the adjusting unit B204 may have already changed the position of the cycle $T_{CYCLE}$ imaging region in response to another notification.

In addition, as to a method for preventing (arbitrating) a trouble (conflict) caused when each of plural camera terminals simultaneously divides a region, a method for previously giving priorities to the respective camera terminals may be used. At this time, only the camera terminal having the highest priority among N+1 camera terminals to be subjected to the division of the regions is allowed to divide the region and notify the other camera terminals of the divided regions.

The operation of the imaging region adjustment device in this embodiment is as described above. According to the above description, in Step 412, the adjusting unit B204 divides, into N+1 regions, the cycle $T_{CYCLE}$ imaging region of one's own camera terminal which contains the cycle $T_{CYCLE}$ imaging regions of N other camera terminals, and determines the respective divided regions to be the cycle $T_{CYCLE}$ imaging region of one's own camera terminal and the cycle $T_{CYCLE}$ imaging regions of N other camera terminals. In other words, in Step 413, the adjusting unit B204 divides, into N+1 regions, the region containing the cycle $T_{CYCLE}$ imaging region of one's own camera terminal and the cycle $T_{CYCLE}$ imaging regions of N other camera terminals adjacent to the cycle $T_{CYCLE}$ imaging region of one's own camera terminal, and determines the respective divided regions to be the cycle $T_{CYCLE}$ imaging region of one's own camera terminal and the cycle $T_{CYCLE}$ imaging regions of N other camera terminals adjacent to the cycle $T_{CYCLE}$ imaging region of one's own camera terminal. Subsequently, the selection of a division pattern, the allocation of the divided regions as the cycle $T_{CYCLE}$ imaging regions and the selection of the cycle $T_{CYCLE}$ imaging regions of N other camera terminals adjacent to the cycle $T_{CYCLE}$ imaging region of one's own camera terminal in Step 413 are executed so that the imaging cycle of the cycle $T_{CYCLE}$ imaging region becomes shortest in the cycle $T_{CYCLE}$ imaging region of each camera terminal or the size of a region other than the virtual imaging region imaged as one's own imaging region by each camera terminal becomes smallest. Therefore, according to the description given taking the examples of FIGS. 30 and 31, likewise the imaging region adjustment device of the first embodiment, the imaging region adjustment device of the present invention is capable of imaging the imaging target region 121 without blind spots using each of the camera terminals 101A to 10C, and further, imaging the imaging target region 121 with efficiency.

In other words, in the processing for searching the optimal solution for the problem regarding how to respectively allocate virtual imaging regions to camera terminals so that an imaging target region is covered completely and efficiently by the virtual imaging regions of the camera terminals, the possibility that the optimal solution from a broad view is searched for instead of sticking to the optimal solution from a local view increases. This makes it possible to prevent a trouble that, for example, plural camera terminals doubly image the same region, and long time is required for the camera terminals to image virtual imaging regions.

Note that it is assumed in the processing of Step 413 that the region containing the cycle $T_{CYCLE}$ imaging region of one's own camera terminal and the cycle $T_{CYCLE}$ imaging regions of the other camera terminals adjacent to the cycle $T_{CYCLE}$ imaging region of one's own camera terminal is divided. However, there is no need in particular to put a restriction that the cycle $T_{CYCLE}$ imaging regions of the other camera terminals must be the cycle $T_{CYCLE}$ imaging regions of the other camera terminals adjacent to the cycle $T_{CYCLE}$ imaging region of one's own camera terminal. A cycle $T_{CYCLE}$ imaging region of other camera terminal which is not adjacent to the cycle $T_{CYCLE}$ imaging region of one's own camera terminal may be used in combination. However, note that it is a requisite that the cycle $T_{CYCLE}$ imaging regions of one's own camera terminal and the other camera terminals covers a dividable region containing the cycle $T_{CYCLE}$ imaging regions of one's own camera terminal and the other camera terminals. For example, in the example of FIG. 36A, a region containing the cycle $TA_{CYCLE}$ imaging region 2701, the cycle $TB_{CYCLE}$ imaging region 2702, the cycle $TC_{CYCLE}$ imaging region 2703 and the cycle $TG_{CYCLE}$ imaging region 2707 which is not adjacent to the cycle $TA_{CYCLE}$ imaging region 2701 may be divided and the divided regions may be allocated as these cycle $T_{CYCLE}$ imaging regions. Even in this case, the imaging region adjustment device of the present invention is capable of providing the same advantage.

In addition, the processing of Step 413 may be executed only in a specific case. For example, according to the description given taking the examples of FIGS. 30 and 31, the processing of Step 413 is required when the entire imaging target region 121 has been imaged, in other words, each of the sides of the cycle $T_{CYCLE}$ imaging region of one's own camera terminal is overlapped with an adjacent cycle $T_{CYCLE}$ imaging region or a non-imaging region. Therefore, it is obvious that the same advantage can be obtained even in the case of executing the processing of Step 413 only in the specific case.

In addition, as for the selection of a division pattern, the allocation of the divided regions as the cycle $T_{CYCLE}$ imaging regions and the selection of the $T_{CYCLE}$ imaging regions of N other camera terminals adjacent to the cycle $T_{CYCLE}$ imaging region of one's own camera terminal in Step 413, there is no need to evaluate all the possible selections and allocations so as to make determinations in the selection and allocation. For example, the same advantage can be obtained even in the case where only limited possible selections and allocations are evaluated so as to make determinations in the selection and allocation, as long as the determined selections and allocation among the limited possible selections and allocations satisfy the requirement that the imaging cycle of the cycle $T_{CYCLE}$ imaging region of each camera terminal becomes shortest or the size of a region other than the virtual imaging region imaged as one's own imaging region by each camera terminal becomes smallest.

In addition, in the processing executed in Step 403, when the function indicated in Expression 45 is defined and Expressions 39 to 44 in the first embodiment are replaced with Expressions 46 to 49, each of the camera terminals adjusts the cycle $T_{CYCLE}$ imaging region of one's own camera terminal so as to be overlapped with adjacent cycle $T_{CYCLE}$ imaging regions and possibly a non-imaging region, and adjusts the aspect ratio of the cycle $T_{CYCLE}$ imaging region of one's own camera terminal so as to become closer to the aspect ratio of the time T imaging region.

[Math 45]

$$\left.\begin{aligned}FB_A(\theta b_{HA}, \theta b_{VA}) &= \left(\frac{\theta b_{HA}}{\theta b_{VA}} - C_{ASPECT}\right)^2 \\ FB_B(\theta b_{HB}, \theta b_{VB}) &= \left(\frac{\theta b_{HB}}{\theta b_{VB}} - C_{ASPECT}\right)^2 \\ FB_C(\theta b_{HC}, \theta b_{VC}) &= \left(\frac{\theta b_{HC}}{\theta b_{VC}} - C_{ASPECT}\right)^2\end{aligned}\right\} \quad \text{(Expression 45)}$$

[Math 46]

$$\left.\begin{aligned}FY_A(\theta b_{PA}, \theta b_{TA}, \theta b_{HA}, \theta b_{VA}) &= \\ \beta_A \times FA_A(\theta b_{PA}, \theta b_{TA}, \theta b_{HA}, \theta b_{VA}) &+ \\ \beta_B \times FB_A(\theta b_{HA}, \theta b_{VA}) & \\ FY_B(\theta b_{PB}, \theta b_{TB}, \theta b_{HB}, \theta b_{VB}) &= \\ \beta_A \times FA_B(\theta b_{PB}, \theta b_{TB}, \theta b_{HB}, \theta b_{VB}) &+ \\ \beta_B \times FB_B(\theta b_{HB}, \theta b_{VB}) & \\ FY_C(\theta b_{PC}, \theta b_{TC}, \theta b_{HC}, \theta b_{VC}) &= \\ \beta_A \times FA_C(\theta b_{PC}, \theta b_{TC}, \theta b_{HC}, \theta b_{VC}) &+ \\ \beta_B \times FB_C(\theta b_{HC}, \theta b_{VC}) &\end{aligned}\right\} \quad \text{(Expression 46)}$$

[Math 47]

$$\left.\begin{aligned}\theta b'_{PA} &= \theta b_{PA} - \alpha\frac{\partial FX_A(\theta b_{PA}, \theta b_{TA}, \theta b_{HA}, \theta b_{VA})}{\partial \theta b_{PA}} \\ \theta b'_{TA} &= \theta b_{TA} - \alpha\frac{\partial FX_A(\theta b_{PA}, \theta b_{TA}, \theta b_{HA}, \theta b_{VA})}{\partial \theta b_{TA}} \\ \theta b'_{HA} &= \theta b_{HA} - \alpha\frac{\partial FX_A(\theta b_{PA}, \theta b_{TA}, \theta b_{HA}, \theta b_{VA})}{\partial \theta b_{HA}} \\ \theta b'_{VA} &= \theta b_{VA} - \alpha\frac{\partial FX_A(\theta b_{PA}, \theta b_{TA}, \theta b_{HA}, \theta b_{VA})}{\partial \theta b_{VA}}\end{aligned}\right\} \quad \text{(Expression 47)}$$

[Math 48]

$$\left.\begin{aligned}\theta b'_{PB} &= \theta b_{PB} - \alpha\frac{\partial FX_B(\theta b_{PB}, \theta b_{TB}, \theta b_{HB}, \theta b_{VB})}{\partial \theta b_{PA}} \\ \theta b'_{TB} &= \theta b_{TB} - \alpha\frac{\partial FX_B(\theta b_{PB}, \theta b_{TB}, \theta b_{HB}, \theta b_{VB})}{\partial \theta b_{TB}} \\ \theta b'_{HB} &= \theta b_{HB} - \alpha\frac{\partial FX_B(\theta b_{PB}, \theta b_{TB}, \theta b_{HB}, \theta b_{VB})}{\partial \theta b_{HA}} \\ \theta b'_{VB} &= \theta b_{VB} - \alpha\frac{\partial FX_B(\theta b_{PB}, \theta b_{TB}, \theta b_{HB}, \theta b_{VB})}{\partial \theta b_{VB}}\end{aligned}\right\} \quad \text{(Expression 48)}$$

[Math 49]

$$\left.\begin{aligned}\theta b'_{PC} &= \theta b_{PC} - \alpha\frac{\partial FX_C(\theta b_{PC}, \theta b_{TC}, \theta b_{HC}, \theta b_{VC})}{\partial \theta b_{PC}} \\ \theta b'_{TC} &= \theta b_{TC} - \alpha\frac{\partial FX_C(\theta b_{PC}, \theta b_{TC}, \theta b_{HC}, \theta b_{VC})}{\partial \theta b_{TC}} \\ \theta b'_{HC} &= \theta b_{HC} - \alpha\frac{\partial FX_C(\theta b_{PC}, \theta b_{TC}, \theta b_{HC}, \theta b_{VC})}{\partial \theta b_{HC}} \\ \theta b'_{VC} &= \theta b_{VC} - \alpha\frac{\partial FX_C(\theta b_{PC}, \theta b_{TC}, \theta b_{HC}, \theta b_{VC})}{\partial \theta b_{VC}}\end{aligned}\right\} \quad \text{(Expression 49)}$$

Accordingly, the imaging region adjustment device of the present invention is capable of improving the efficiency in imaging the imaging target region 121 by reallocating the cycle $T_{CYCLE}$ imaging regions of camera terminals and adjusting the cycle $T_{CYCLE}$ imaging regions of the respective camera terminals so as to improve efficiency in imaging of the imaging target region 121.

In addition, in this embodiment, as shown in FIG. 32, the adjusting unit B204 are present in the respective camera terminals A101A to C101C. However, it is obvious that the same advantage can be obtained when there is only a single adjusting unit B204 which adjusts all the positions and aspect ratios of the cycle $T_{CYCLE}$ imaging regions of the cameras 201 in the camera terminals A101A to C101C.

In the embodiment, the network 103 is a network line used for general communication. It is obvious that the same advantage can be obtained irrespective of whether the network 103 is wired or wireless.

(Third Embodiment)

A third embodiment is described hereafter. In this embodiment, some additional points are described as to the imaging region adjustment devices of the present invention described in the first and second embodiments.

Figure 38:
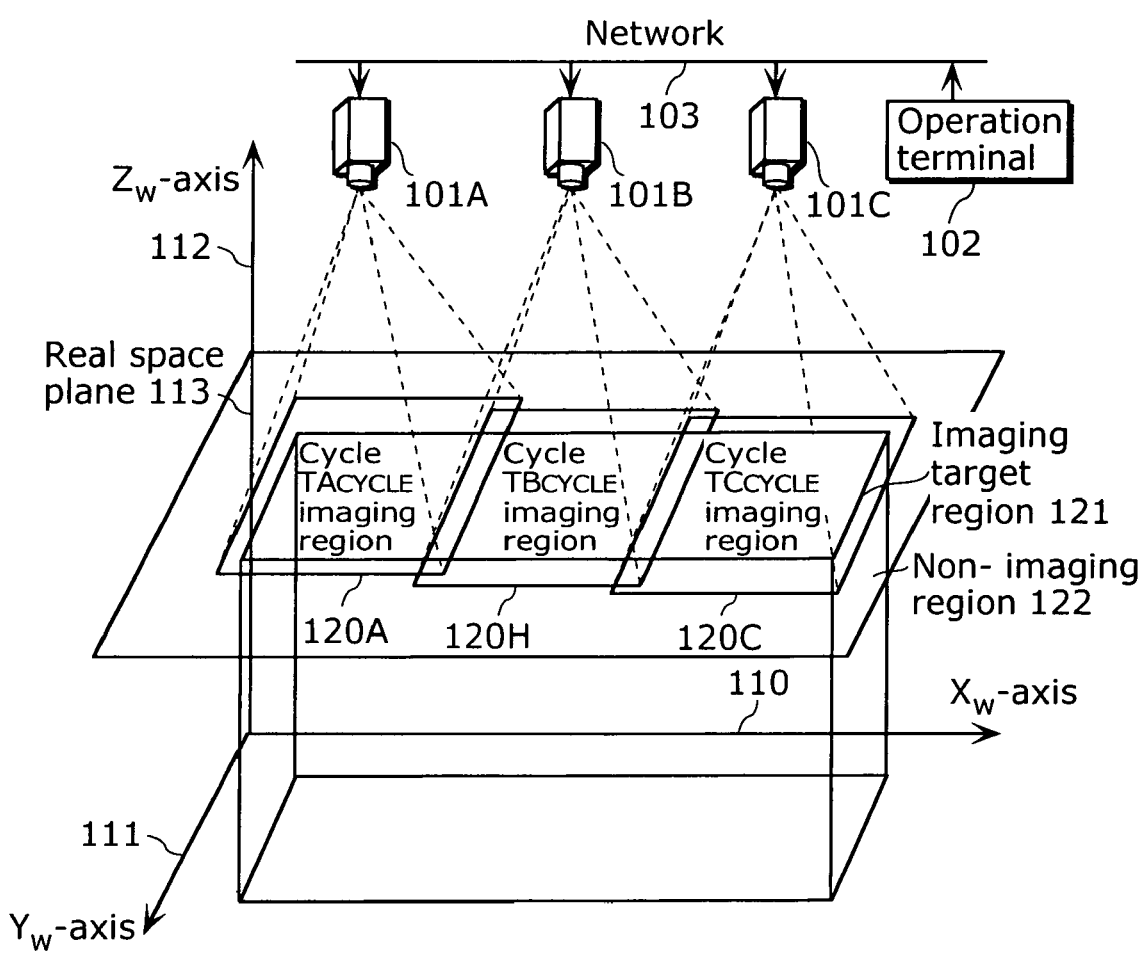
FIG. 38 is a block diagram showing the structure of an imaging region adjustment device in a third embodiment of the present invention.

Further, in the imaging region adjustment devices of the present invention described in the first and second embodiments, the real space plane 113 satisfies $Z_W=0$ as shown in FIG. 24. In is obvious that the same advantage can be obtained as described in the first and second embodiments even in the case where the real space plane 113 satisfies $Z_W=C$ as shown in FIG. 38 (the structural elements in FIG. 38 are the same as those in FIG. 24). Further, the cycle $T_{CYCLE}$ imaging regions imaged by the camera terminals are enlarged as they move to 0 on the $Z_W$-axis 112. Therefore, in the case of an imaging target region which is three-dimensional, it can be imaged without blind spots as a three-dimensional imaging target region 213 in FIG. 38.

Further, the camera 201 in the first and second embodiments is a conventional camera. However, it is obvious that the same advantage can be obtained even when the camera 201 is a camera detecting visible light or non-visible light such as infrared and ultraviolet rays. It is also obvious that the same advantage can be obtained even when the camera 201 is a conventional sensor having an imaging region (or detecting region) and the position of the imaging region (or detecting region) is changeable. The conventional sensor may be a micro-motion sensor, pressure sensor, temperature sensor, barometric pressure sensor, or acoustic sensors (microphones). It is obvious that the same advantage can be obtained even when conventional cameras and such sensors are used in combination.

Figure 39A:
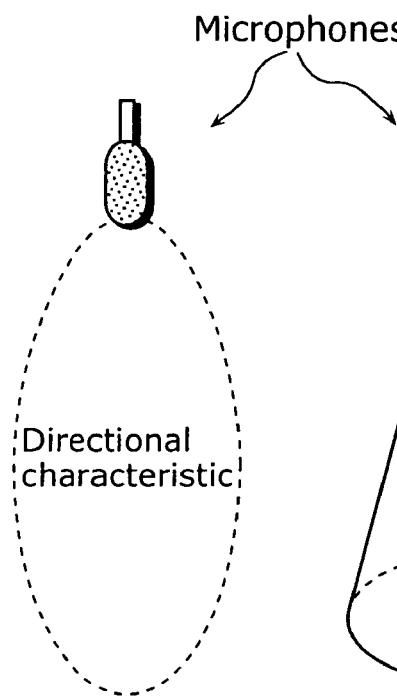
FIG. 39 is a drawing illustrating an example in which the present invention is applied to microphones.
Figure 39B:
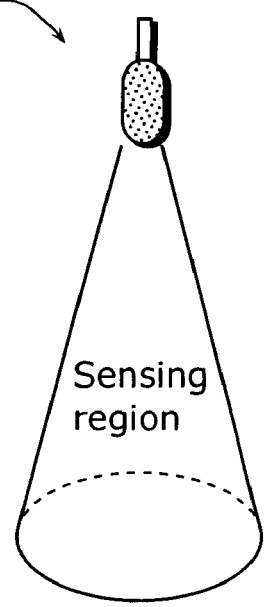
Figure 39C:
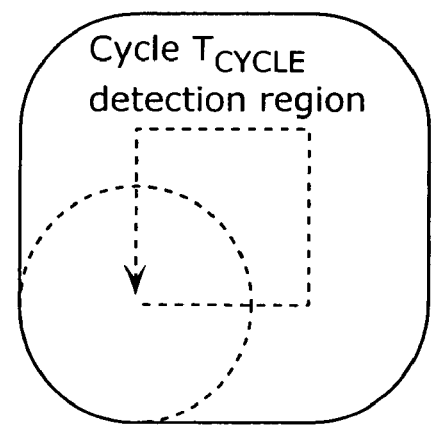

For example, as for a directional microphone as shown in FIG. 39A, a sensing region (detecting region) can be defined as a direction (region) in which sound is detected at or above a specific sensitivity as shown in FIG. 39B. Therefore, controlling the orientation of the microphone to execute scanning in a specific cycle in the similar manner to the panning and tilting of a camera in the embodiments makes it possible to define the cycle $T_{CYCLE}$ detecting region (in other words, "a virtual detecting region") which corresponds to the cycle $T_{CYCLE}$ imaging region for a camera terminal as shown in FIG. 39C. Hence, the present invention can be applied not only to cameras but also to various types of sensors. As shown in FIGS. 39B and 39C, when the sensing region (detecting region) which corresponds to the time T imaging region and the cycle $T_{CYCLE}$ detecting region which corresponds to the cycle $T_{CYCLE}$ imaging region are, for example, circular, not rectangular, the aspect ratio may be defined as the major-axis to minor-axis ratio of a circle (1 for a complete round) or the ratio of the length in the $X_W$-axis direction to the length in the $Y_W$-axis of a figure.

Figure 40:
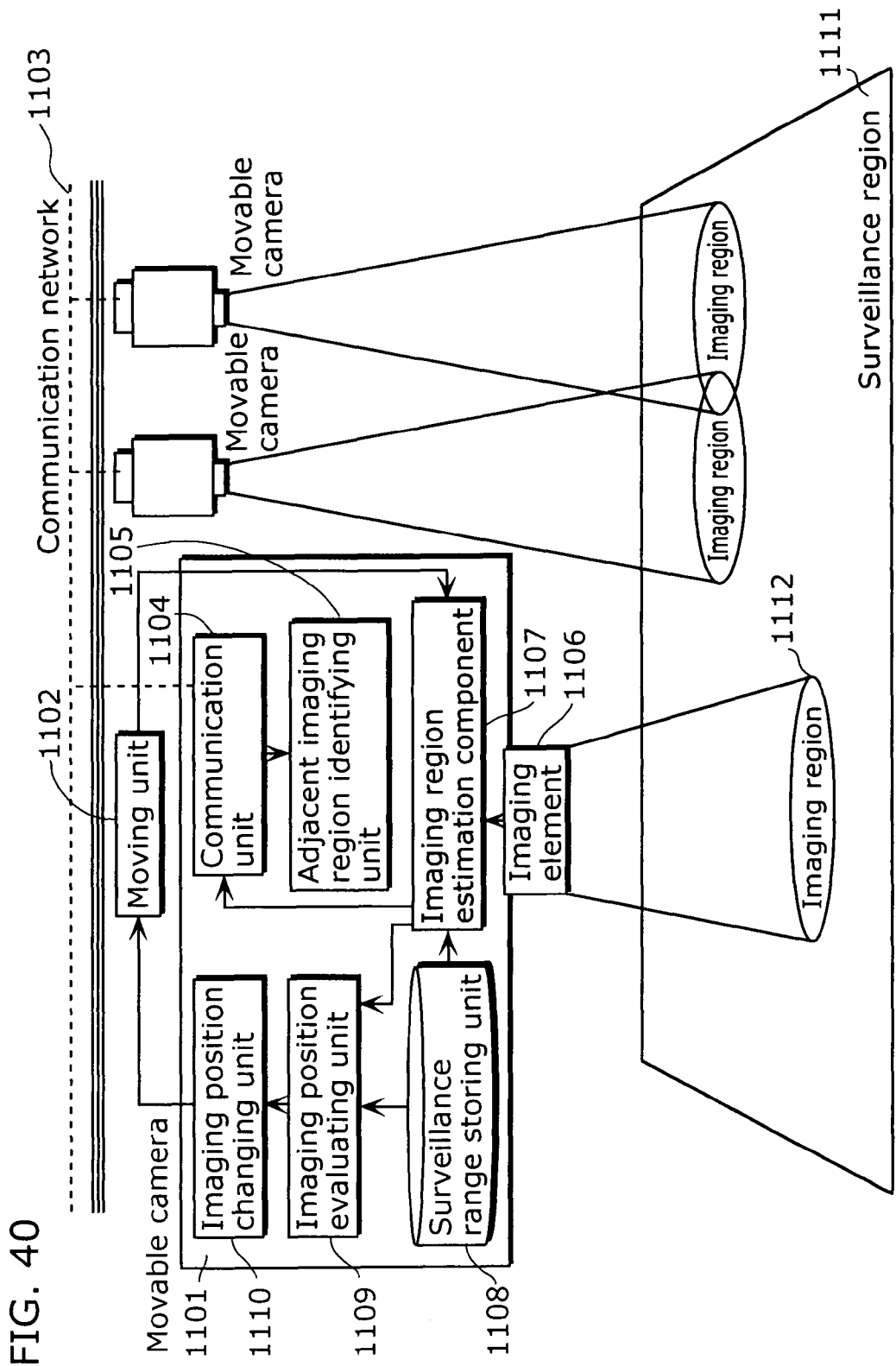
FIG. 40 is a block diagram showing the structure of a surveillance system made up of movable cameras.

Further, the cameras in the embodiments are fixed cameras; however, they may also be movable cameras. FIG. 40 is a block diagram showing the structure of a surveillance system in which the imaging region adjustment device according to the present invention is applied to a surveillance system including movable cameras. The surveillance system includes plural movable cameras 1101 connected to a communication network 1103, characterized by the fact that the movable cameras 1101 autonomously and cooperatively move in addition to panning and tilting so that surveillance of a surveillance region 1111 is completely performed. Each of the movable cameras 1101 is a camera device supported and moved by a moving unit 1102. The moving unit 1102 is a mechanism to change the imaging position of the movable camera 1101. The communication network 1103 is a transmission path connecting the movable cameras 1101. A communication unit 1104 is a communication interface allowing the movable cameras 1101 to exchange information with one another via the communication network 1103. An adjacent imaging region identifying unit 1105 is a processor to estimate which movable camera has an adjacent imaging region based on information from the other cameras notified to the communication unit 1104. An imaging element 1106 is a CCD camera and the like which images the surveillance region. An imaging region estimation component 1107 is a processor to estimate the imaging region of the movable camera 1101 from the characteristics of the imaging element 1106 and the position of the movable unit 1102. A surveillance range storing unit 1108 is a memory in which the range of a region of which the movable camera 1101 performs surveillance is stored. An imaging position evaluating unit 1109 is a processor to evaluate the overlap region where the imaging region of the movable camera 1101 and an adjacent imaging region are overlapped with each other or the distances to the boundaries of the surveillance region. An imaging position changing unit 1110 is a control unit to control the moving unit 1102 and change the imaging position of the movable camera 1101. A surveillance region 1111 is a region of which the movable camera 1101 performs surveillance. An imaging region 1112 is a region imaged by a movable camera 1101. With the surveillance system, the movable camera 1101 exchanges information regarding the imaging regions estimated based on the position of one's own imaging region and the characteristics of the imaging element 1106 with the neighboring movable cameras and changes the panning, tilting, and imaging position in cooperation with the neighboring movable cameras, so that the size of the overlap region between the adjacent imaging regions and the distances to the boundaries of the surveillance region becomes closer to specific states. Thus, the movable cameras 1101 can move to imaging positions at which the movable cameras 1101 can simultaneously image the surveillance region without blind spots.

Figure 41:
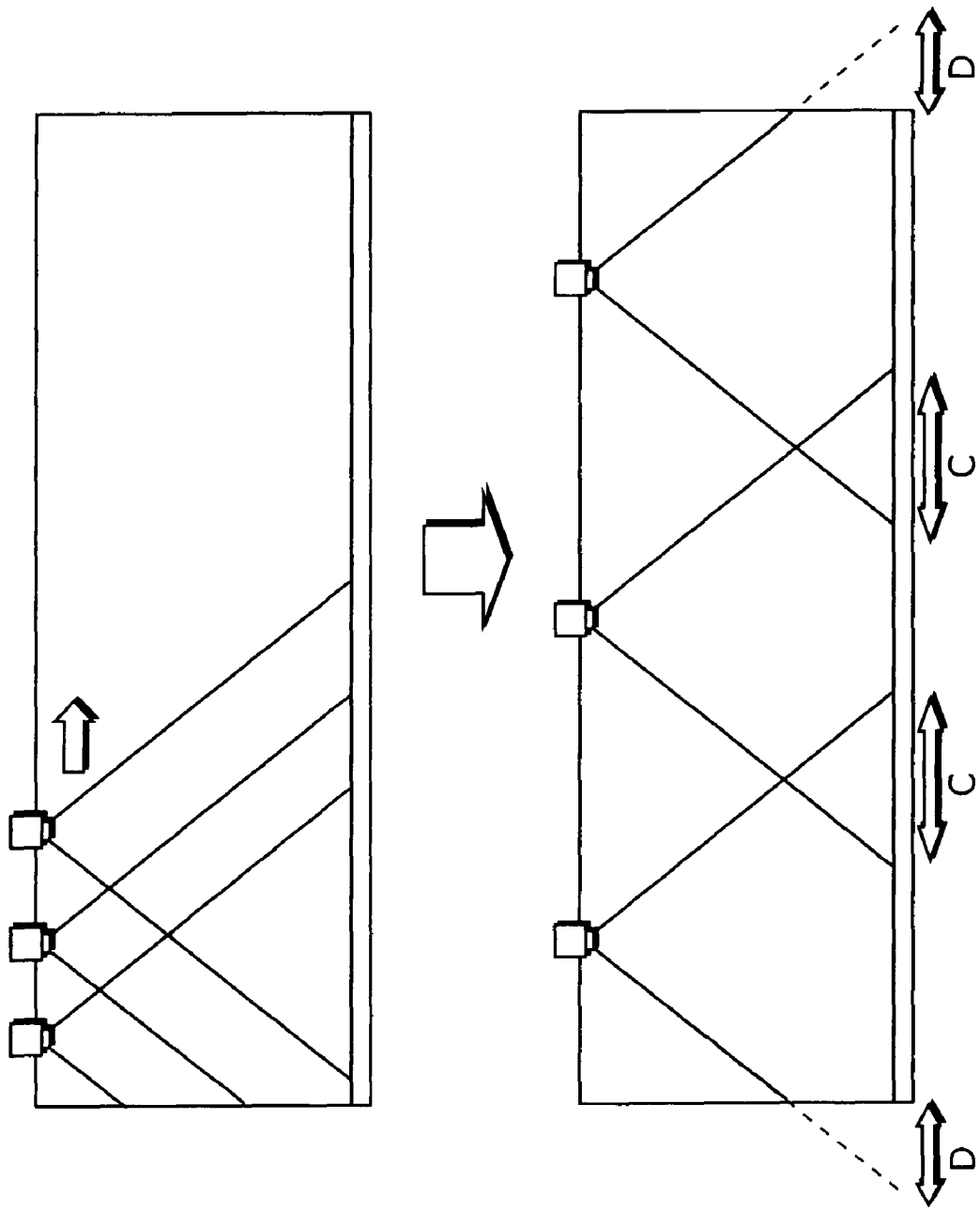
FIG. 41 is a drawing showing the operation of movable cameras in a surveillance system.
Figure 42:
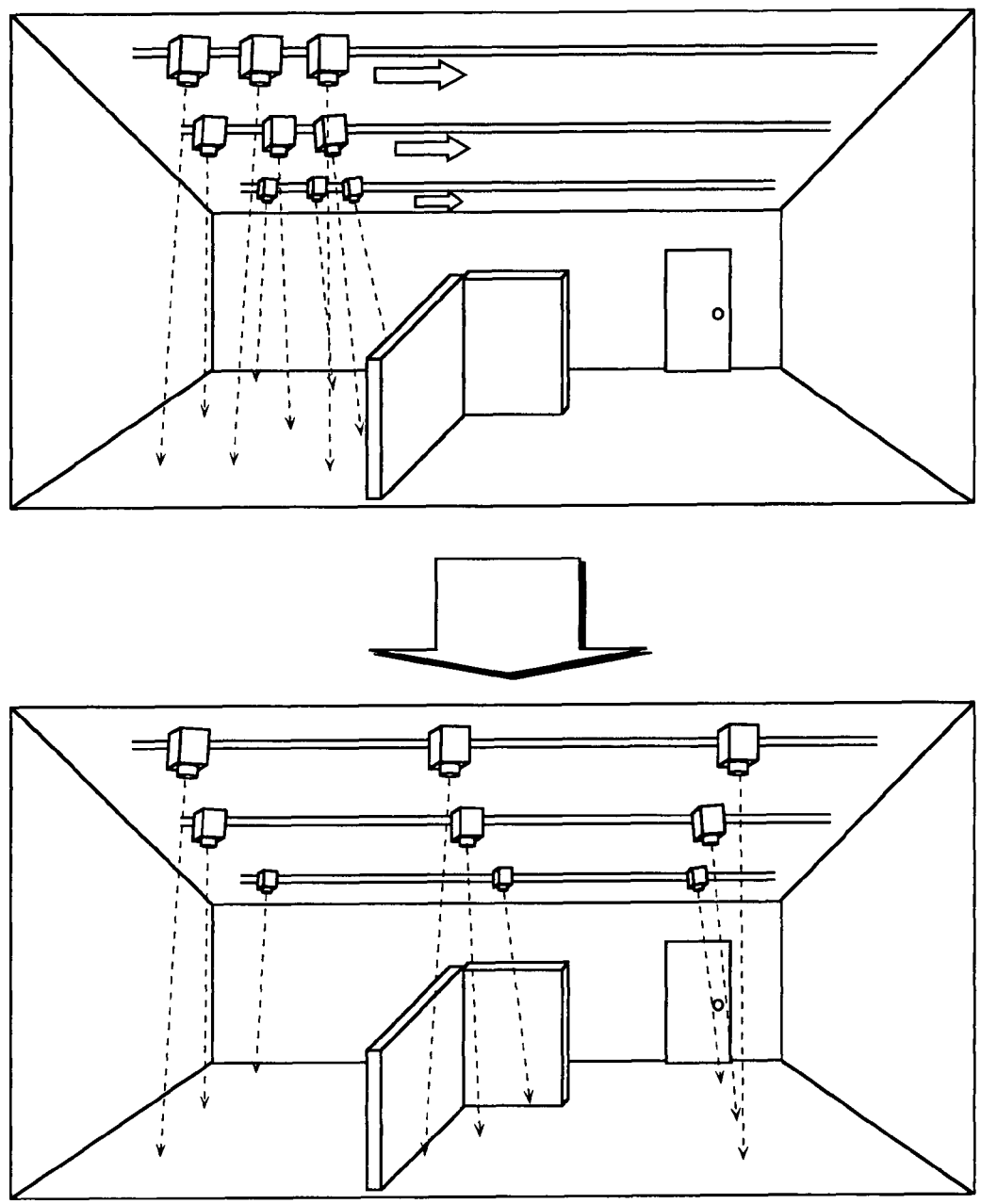
FIG. 42 is a drawing showing how movable cameras move on rail tracks provided in a surveillance region.

FIG. 41 illustrates the operation of the movable cameras 1101 in the surveillance system. For simplified explanation, the figure shows the case where the movable cameras 1101 which are movable in the horizontal (one-dimensional) direction are provided on the ceiling of a room having a constant height and caused to perform surveillance of the floor. As shown in the top figure, the movable cameras 1101 provided at proper positions on the ceiling change their imaging positions so that the width C of the overlap region of the imaging regions or the distance D to the boundaries of the surveillance region becomes closer to a specific value. Thus, as shown in the bottom figure, the movable cameras 1101 can automatically move to positions at which the movable cameras simultaneously image the entire surveillance region. Furthermore, even in the case where all of the movable cameras 1101 are set at a place at which the settings are difficult, for example, on a high ceiling, the movable cameras automatically move to positions at which the movable cameras simultaneously image the entire surveillance region without blind spots. Therefore, it becomes possible to reduce the workload for deciding the positions of the movable cameras and for and setting them. As an example of this implementation method, the system in which rails allowing movable cameras to move above a surveillance region are placed and the movable cameras move on the rail may be configured as shown in FIG. 42.

In addition, each of the imaging region adjustment devices in the above embodiments has a local control configuration in which each camera terminal constituting the imaging region adjustment device has an adjusting unit. However, the present invention is not limited to such a local control configuration, and may be realized as the imaging region adjustment device having a centralized control configuration in which a common adjusting unit adjusts the detecting regions of all camera terminals in a centralized way. For example, the present invention may be realized as an imaging region adjustment device including plural camera terminals and a single adjustment device connected to the camera terminals via a communication network. In the device, each of the camera terminals may have: a camera which images a virtual imaging region obtained while changing the position of an imaging region within a specific region in a specific period of time; and a communication unit which sends and receives virtual imaging region information indicating the virtual imaging region; and an adjusting unit which adjusts the position of the virtual imaging region of one's own camera terminal so that the combined region of the virtual imaging regions of the camera terminals completely covers a specific imaging target region, based on the virtual imaging region of one's own camera terminal and virtual imaging regions of the other camera terminals indicated by the virtual imaging region information received by the communication unit. The adjustment device may have a region dividing unit which divides, into N regions, the region containing the virtual imaging regions of N ($\geqq 2$) camera terminals among the camera terminals and which allocates the respective divided regions to N camera terminals. The adjusting unit of each of the camera terminals may be structured to execute the adjustment of the region that the adjustment device has allocated to one's own camera terminal as a new virtual imaging region. In other words, a region dividing function may be given to a single adjustment device connected via a communication network, instead of being given to each of the camera terminals. In addition, the present invention is not limited to the above-described embodiments and variations to the embodiments. Any imaging region adjustment device which is realized by arbitrarily combining the structural elements of these embodiments and variations is included in the present invention.

The imaging region adjustment device according to the present invention is useful as a device which adjusts the imaging region of an imaging device such as a camera, for example, as a surveillance device including plural cameras or an imaging system, and particularly as an imaging system required to efficiently cover a specific imaging target region without blind spots.

The invention claimed is:

1. An imaging region adjustment device comprising camera terminals, wherein each of the camera terminals includes:
a camera which images a virtual imaging region obtained while changing a position of an imaging region within a specific region in a specific period of time;
a communication unit operable to send and receive virtual imaging region information indicating the virtual imaging region; and
an adjusting unit operable to adjust a position of the virtual imaging region of one's own camera terminal so that a combined region of virtual imaging regions of the camera terminals completely covers a specific imaging target region, based on the virtual imaging region of one's own camera terminal and virtual imaging regions of other camera terminals indicated by the virtual imaging region information received by the communication unit, and wherein the imaging region adjustment device further comprises:
a region dividing unit operable to divide, into N regions, a region containing virtual imaging regions of N ($\geqq 2$) camera terminals among the camera terminals and allocate the respective N divided regions to the N camera terminals, and
the adjusting unit is operable to execute an adjustment of a region allocated to one's own camera terminal by the region dividing unit so as to assign the allocated region as a new virtual imaging region.

2. The imaging region adjustment device accordingly to claim 1, wherein the region dividing unit is operable to execute the division and allocation in a case where the virtual imaging regions of the N camera terminals are in a containment relationship in which one of the virtual imaging regions completely covers another of the virtual imaging areas.

3. The imaging region adjustment device according to claim 1,
wherein the region dividing unit is operable to execute the division and allocation in a case where the virtual imaging regions of the N camera terminals are adjacent to one another.

4. The imaging region adjustment device according to claim 1, wherein the region dividing unit is operable to execute the division and allocation for at least one camera terminal for which the allocation is executed so that a time required for the camera to image a virtual imaging region is reduced or a size of a region other than the virtual imaging regions within a region to be imaged by the camera is reduced.

5. The imaging region adjustment device according to claim 4, wherein the region dividing unit is operable to execute the division and allocation so that an aspect ratio of the virtual imaging region of the camera terminal becomes closer to an aspect ratio of an imaging region of the camera.

6. The imaging region adjustment device according to claim 1, wherein the region dividing unit is operable to execute the division by selecting a division pattern from among predetermined division patterns.

7. The imaging region adjustment device according to claim 1, wherein the camera repeatedly changes a position of an imaging region within a virtual imaging region at a fixed cycle.

8. The imaging region adjustment device according to claim 1, wherein the region dividing unit is incorporated in at least one camera terminal among the camera terminals.

9. A camera terminal constituting an imaging region adjustment device which adjusts an imaging region using camera terminals, the camera terminal comprising:
a camera which images a virtual imaging region obtained while changing a position of an imaging region within a specific region in a specific period of time;
a communication unit operable to send and receive virtual imaging region information indicating the virtual imaging region; and
an adjusting unit operable to adjust a position of the virtual imaging region of one's own camera terminal so that a combined region of virtual imaging regions of the camera terminals completely covers a specific imaging target region, based on the virtual imaging region of one's own camera terminal and virtual imaging regions of other camera terminals indicated by the virtual imaging region information received by the communication unit,
wherein the adjusting unit is further operable to divide, into N regions, a region containing the virtual imaging regions of N ($\geqq 2$) camera terminals among the camera terminals, allocate the respective N divided regions to the N camera terminals, and execute an adjustment of the region allocated to own camera terminal so as to assign the allocated region as a new virtual imaging region.

10. An imaging region adjusting method executed by a camera terminal constituting an imaging region adjustment device which adjusts an imaging region using camera terminals, the imaging region adjusting method comprising:
- an imaging step of imaging virtual imaging regions obtained while changing a position of an imaging region within a specific region in a specific period of time;
- a communication step of sending and receiving virtual imaging region information indicating the virtual imaging region; and
- an adjusting step of adjusting a position of the virtual imaging region of one's own camera terminal so that a combined region of virtual imaging regions of the camera terminals completely covers a specific imaging target region, based on the virtual imaging region of one's own camera terminal and virtual imaging regions of other camera terminals indicated by the virtual imaging region information received in the communication step,
- wherein, in the adjusting step, a region containing virtual imaging regions of N ($\geq 2$) camera terminals among the camera terminals are divided into N regions, the respective divided N regions are allocated to the N camera terminals, and the adjusting is executed so as to assign an allocated region as a new virtual imaging region.

11. A non-transitory computer-readable recording medium storing a program for a camera terminal constituting an imaging region adjustment device which adjusts an imaging region using camera terminals, the program causing a computer to execute the steps included in the imaging region adjusting method according to claim 10.

12. A detecting region adjustment device comprising sensor terminals, wherein each of the sensor terminals includes:
- a sensor which detects a virtual detecting region obtained while changing a position of a detecting region within a specific region in a specific period of time;
- a communication unit operable to send and receive virtual detecting region information indicating the virtual detecting region; and
- an adjusting unit operable to adjust a position of the virtual detecting region of one's own sensor terminal so that a combined region of the virtual detecting regions of the sensor terminals completely covers a specific detecting target region, based on the virtual detecting region of one's own sensor terminal and virtual detecting regions of other sensor terminals indicated by the virtual detecting region information received by the communication unit,
- wherein the detecting region adjustment device further comprises:
- a region dividing unit operable to divide, into N regions, a region containing virtual detecting regions of N ($\geq 2$) sensor terminals among the sensor terminals and allocate the respective divided regions to the N sensor terminals, and
- the adjusting unit is operable to execute an adjustment of a region allocated to the sensor terminal by the region dividing unit so as to assign the allocated region as a new virtual detecting region.

* * * * *